United States Patent [19]
Yamamoto et al.

[11] Patent Number: 5,610,897
[45] Date of Patent: Mar. 11, 1997

[54] OPTICAL INFORMATION REPRODUCING APPARATUS

[75] Inventors: Masakuni Yamamoto, Yamato; Susumu Matsumura, Kawaguchi; Hiroaki Hoshi, Yokohama; Eiji Yamaguchi, Zama, all of Japan

[73] Assignee: Canon Kabushiki Kaisha, Tokyo, Japan

[21] Appl. No.: 570,251

[22] Filed: Dec. 11, 1995

Related U.S. Application Data

[63] Continuation of Ser. No. 113,323, Aug. 30, 1993, abandoned.

[30] Foreign Application Priority Data

| Aug. 31, 1992 | [JP] | Japan | 4-253586 |
| Sep. 10, 1992 | [JP] | Japan | 4-266897 |
| Sep. 11, 1992 | [JP] | Japan | 4-267928 |
| Sep. 11, 1992 | [JP] | Japan | 4-267929 |
| Sep. 25, 1992 | [JP] | Japan | 4-279272 |

[51] Int. Cl.$^6$ .................................... G01B 11/02
[52] U.S. Cl. ............................. 369/124; 369/110
[58] Field of Search .................... 369/124, 110, 369/120, 54, 48, 59, 60, 64

[56] References Cited

U.S. PATENT DOCUMENTS

| 5,105,399 | 4/1992 | Shimonou | 369/124 |
| 5,251,198 | 10/1993 | Strickler | 369/100 |
| 5,270,794 | 12/1993 | Tsuji et al. | 356/371 |

FOREIGN PATENT DOCUMENTS

| 56-90744 | 7/1981 | Japan . |
| 59-207434 | 11/1984 | Japan . |
| 61-198458 | 9/1986 | Japan . |
| 62-188042 | 8/1987 | Japan . |
| 62-188047 | 8/1987 | Japan . |
| 246544 | 2/1990 | Japan . |
| 3120645 | 5/1991 | Japan . |
| 3268252 | 11/1991 | Japan . |
| 4155640 | 5/1992 | Japan . |

OTHER PUBLICATIONS

Masud Mansuripur, Detecting Transition Regions in Magneto-optical Disk Systems, "Applied Physics Letters", vol. 55, No. 8, Aug. 21, 1989, pp. 716–717.

Marc D. Levenson, et al., "Edge Detection for Magnetooptical Data Storage", vol. 30, No. 2, Jan. 10, 1991, pp. 232–252.

*Primary Examiner*—Don Wong
*Attorney, Agent, or Firm*—Fitzpatrick, Cella, Harper & Scinto

[57] ABSTRACT

In an optical information recording/reproducing apparatus, the reproduction of information is performed as following manner. A light spot is formed on a recording medium on which information is recorded so that a phase of light reflected by a small region as an information pit is different from a phase of light reflected by other regions. Upon scanning the recording medium with the light spot, a leading edge and a trailing edge of the information pit in the scanning direction are respectively detected. A detection signal for the leading edge of the information pit and a detection signal for the trailing edge of the information pit are synthesized to effect the reproduction of information.

28 Claims, 69 Drawing Sheets

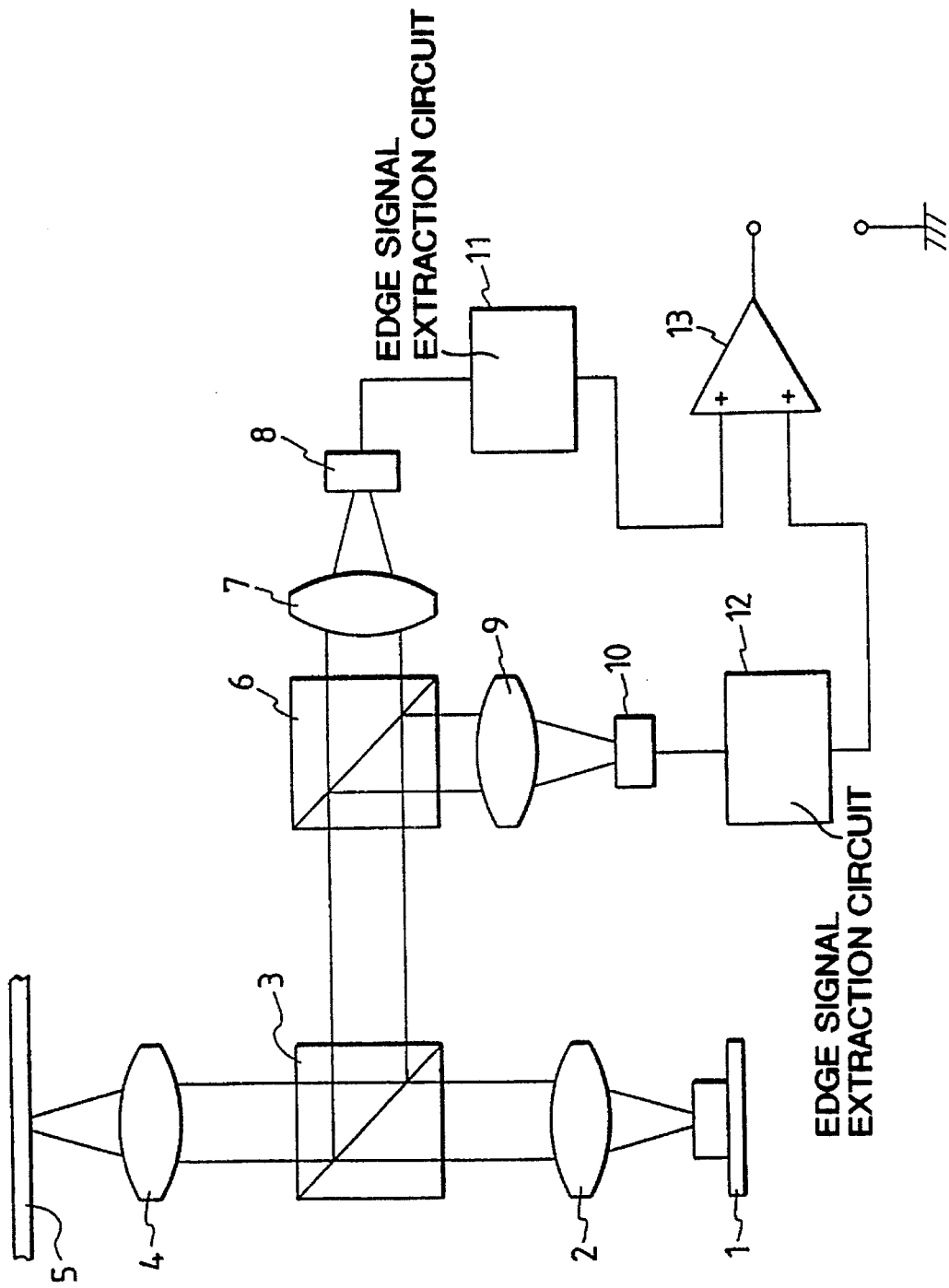

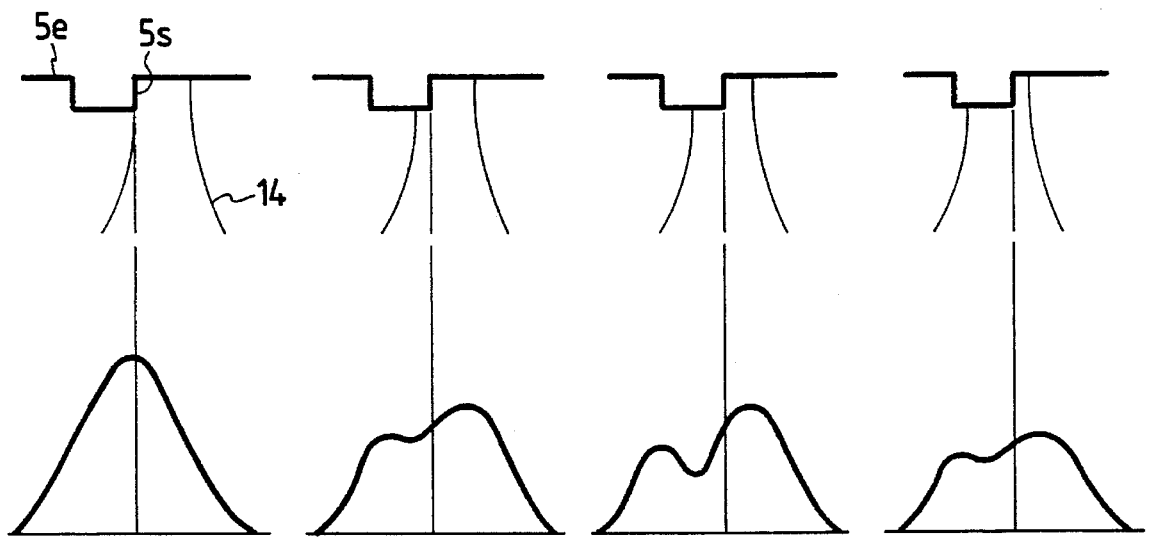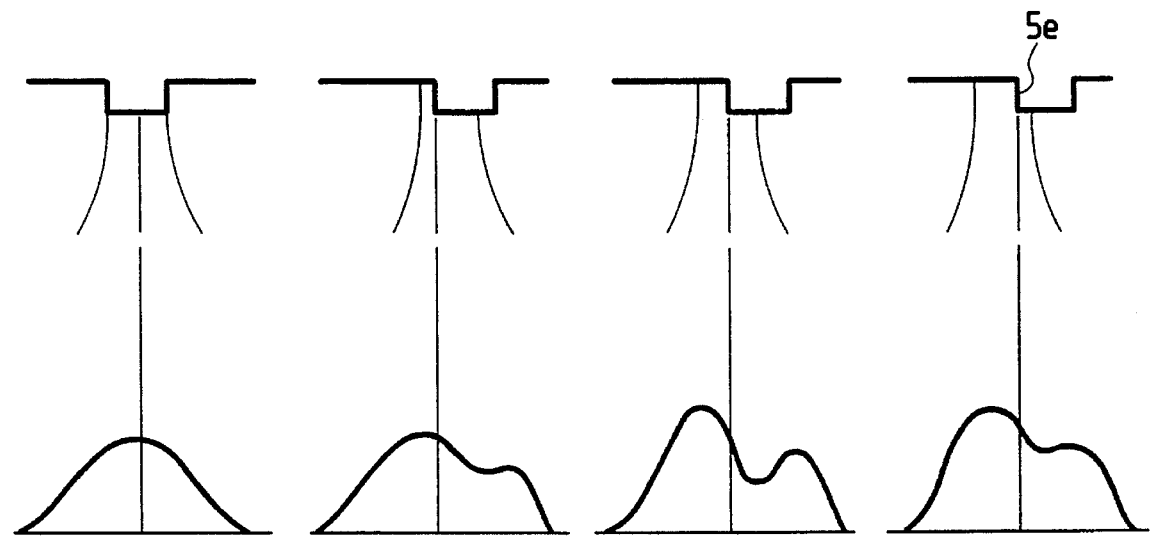

EDGE HEIGHT: 1/8 * λ

EDGE HEIGHT: 2/8 * λ

EDGE HEIGHT: 3/8 * λ

EDGE HEIGHT: 4/8 * λ

EDGE HEIGHT: 5/8*λ

EDGE HEIGHT: 6/8*λ

EDGE HEIGHT: 7/8*λ

EDGE HEIGHT: 8/8*λ

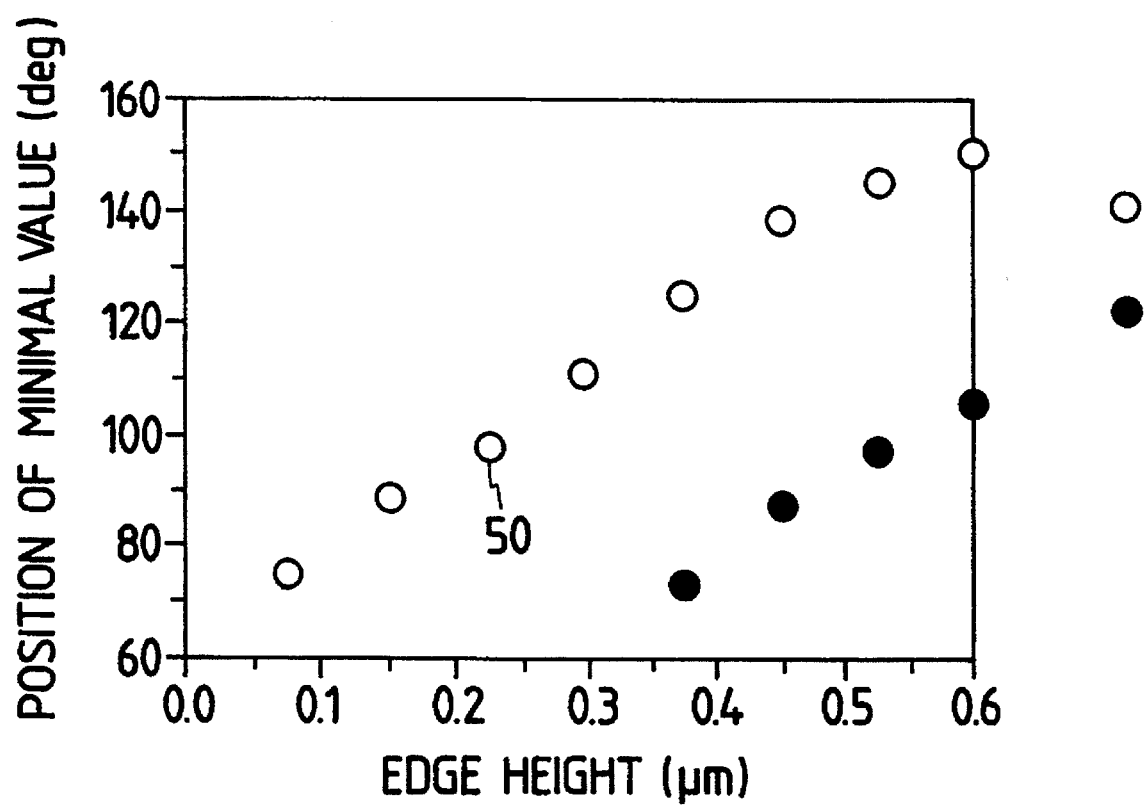

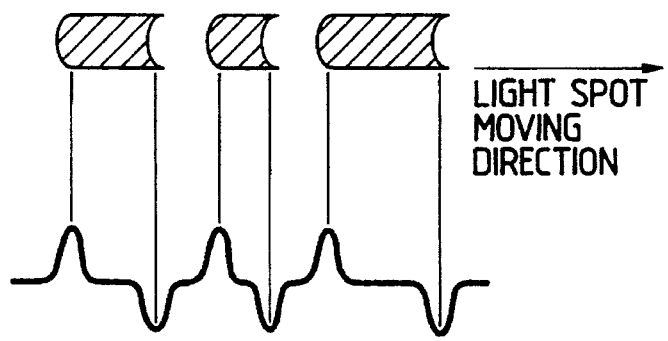
FIG. 26A INFORMATION PIT
FIG. 26B EDGE DETECTION SIGNAL

−1

−0.5

−0.1

0

+0.1

+0.5

+1

−1

−0.5

−0.1

0

+0.1

+0.5

+1

−1

−0.5

−0.2

0

+0.2

+0.5

+1

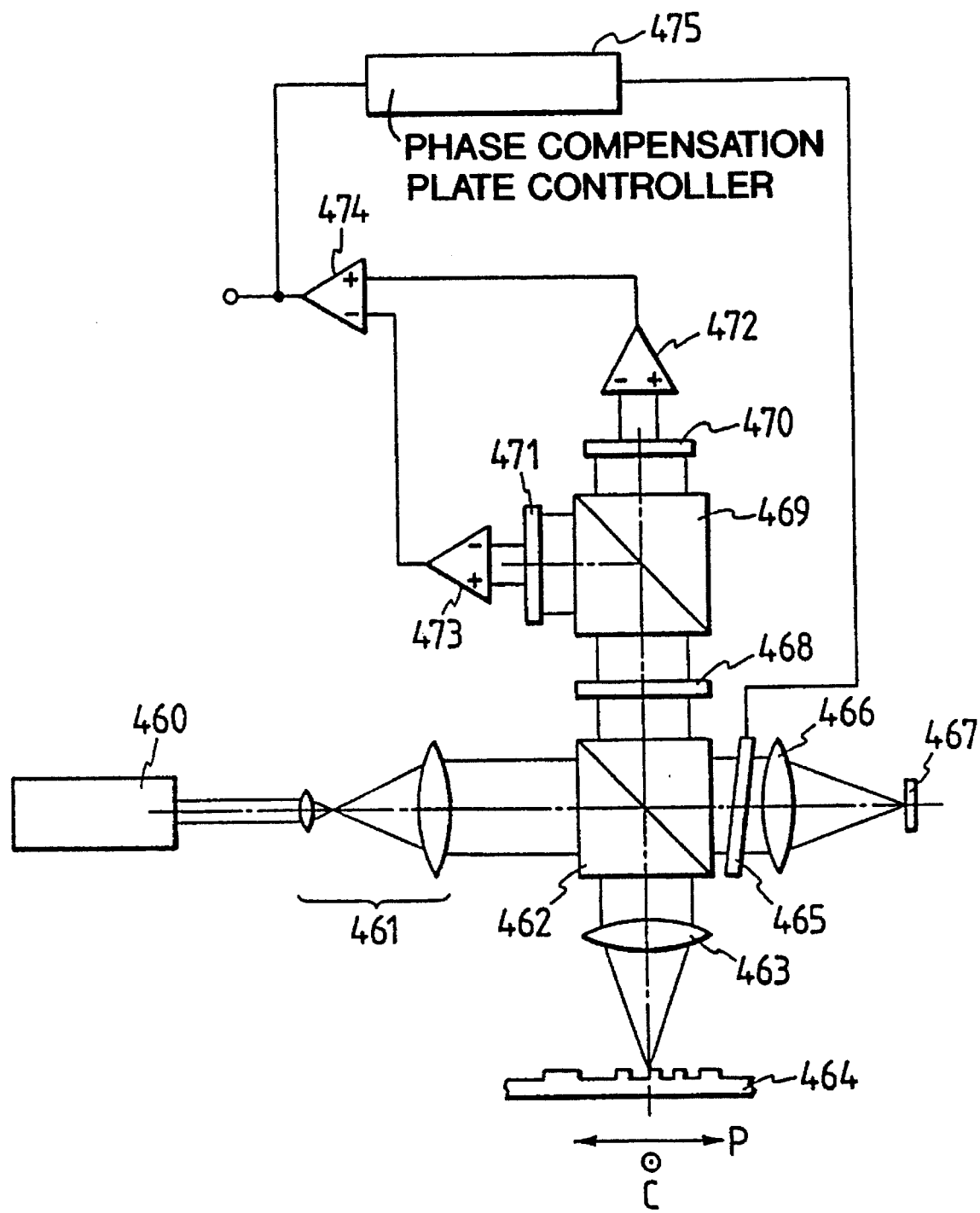

OPTICAL INFORMATION REPRODUCING APPARATUS

This application is a continuation application Ser. No. 08/113,323, filed Aug. 30, 1993, now abandoned.

BACKGROUND OF THE INVENTION

1. Field of the Invention

The present invention relates to an optical information recording/reproduction apparatus for recording and/or reproducing information on and/or from an optical information recording medium, on which information is stored in an optically detectable format.

2. Related Background Art

A conventional reproduction apparatus for an optical information recording medium normally has an arrangement, as shown in FIG. 1A. More specifically, light emitted from a semiconductor laser 1 is collimated by a collimator lens 2, and is then guided to an objective lens 4 via a beam splitter 3, thus forming a small spot on a disk 5. At the same time, the small spot is stably scanned along an information track by auto-focusing and auto-tracking control means (neither are shown). On the optical information recording medium used in this case, an information pit array having a predetermined thickness is formed. Normally, the thickness of each information pit is set, so that the phase difference between light beams reflected by an information pit formation area and a non-formation area becomes almost π. For this reason, when the small spot reaches a position above an information pit, the reflected light quantity considerably decreases due to diffraction. Therefore, an information detection system obtains a change in total reflected light quantity as a reproduction signal. More specifically, as shown in FIG. 1A, reflected light from an information storage medium 5 is received by the objective lens 4, and is guided by the beam splitter 3 to a detection system. Then, the light is received by a photodetector 16 via a condenser lens 15, and the photodetector 16 converts the received light into an electrical signal. FIGS. 2A and 2B show a reproduction signal obtained in this manner. When a small spot 14 moves on an information pit 5a, as shown in FIG. 2A, the reflected light quantity changes, as shown in FIG. 2B, and the light quantity sharply changes near the edge of the information pit 5a. When this signal is binarized with a threshold level $I_t$, an information signal can be obtained.

When the photodetector 16 has two light-receiving surfaces 16a and 16b, which are split by a split line passing the optical axis in a direction perpendicular to a track direction, as shown in FIG. 1B, a device for detecting an edge so that peak outputs are output at the leading and trailing edges of an information pit by calculating a difference between detection signals of the two light-receiving surfaces by a subtracter 17, is known (e.g., disclosed in Japanese Patent Application No. 58-83082).

However, when information is written on a storage medium at a high density so as to attain the object of increasing the storage capacity, a stable reproduction signal cannot be obtained since a change in reflected light quantity is very small with respect to an information pit sufficiently smaller than the size of the small spot 14, as shown in FIGS. 3A and 3B. Also, a signal obtained by calculating a difference between signals from the above-mentioned two-divided photodetector suffers from a shift in peak position of a reproduction signal between a case wherein the reproduction spot reaches the leading edge and a case wherein the spot reaches the trailing edge. Thus, the edges cannot be precisely reproduced.

SUMMARY OF THE INVENTION

The present invention has been made in consideration of the above situation, and has as its object to provide an optical information recording/reproduction apparatus, which allows reproduction of an information pit smaller than a light spot, and can remarkably increase the storage capacity of an information storage medium applied to this reproduction.

In order to achieve the above object, upon reproduction of information from an optical information recording medium, the present invention comprises means for detecting the leading and trailing edges, in a light spot scanning direction, of an information pit on an optical information recording medium using edge detection means for detecting some light components of reflected light at a position shifted from the reflected light optical axis in the light spot scanning direction, so that a reproduction signal is synthesized from two edge detection signals, thereby reproducing information.

BRIEF DESCRIPTION OF THE DRAWINGS

FIG. 4 is a diagram showing a reproduction optical system according to the first embodiment of the present invention;

FIGS. 7A to 7H are charts showing changes in reflected light when a light spot is scanned along an FIGS. 8A and 8B are views for explaining a information pit; photodetector;

FIG. 14 is a graph for explaining the intensity distribution characteristics of reflected light from the edge in respective directions;

FIGS. 26A and 26B are respectively a plan view showing a pit array to be reproduced by the reproduction optical system shown in FIG. 24, and a chart showing a corresponding pit edge detection signal;

FIG. 55 is a diagram showing an embodiment of a position detection apparatus;

DETAILED DESCRIPTION OF THE PREFERRED EMBODIMENTS

Figure 1A:
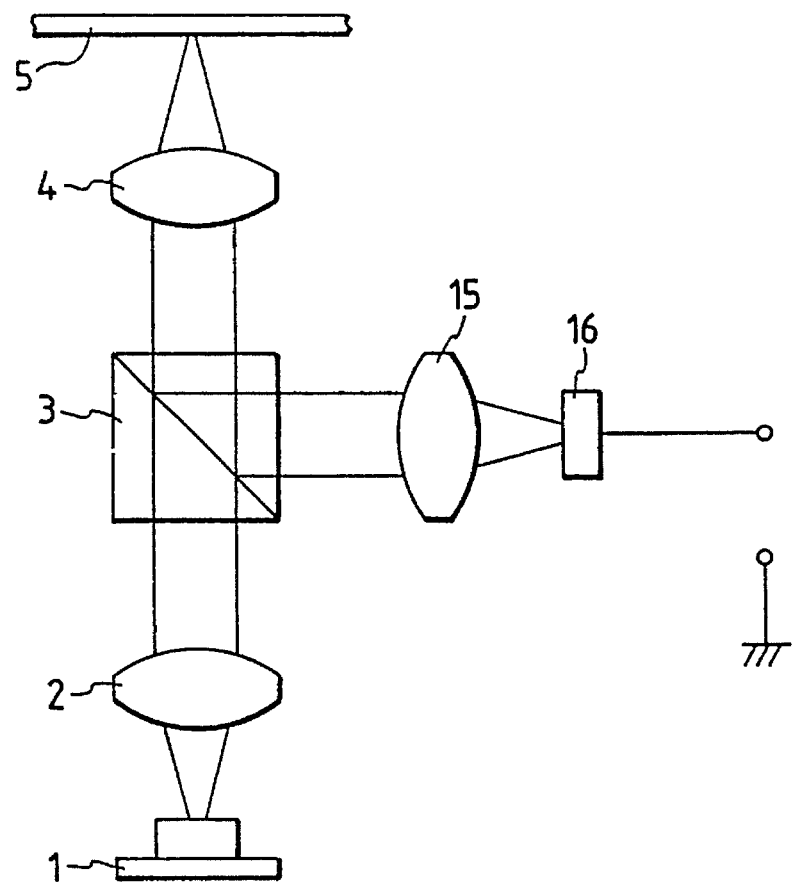
FIGS. 1A and 1B are diagrams a conventional reproduction optical system.
Figure 1B:
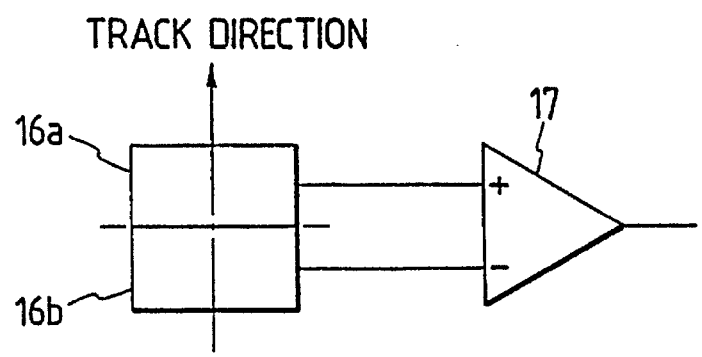
Figure 2A:
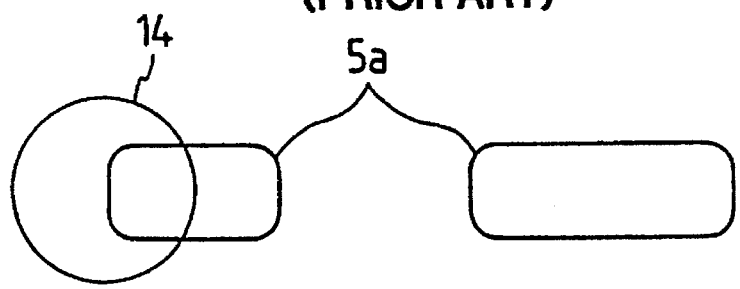
FIGS. 2A and 2B are respectively a plan view and a graph for explaining a reproduction signal of an information pit in a conventional reproduction apparatus.
Figure 2B:
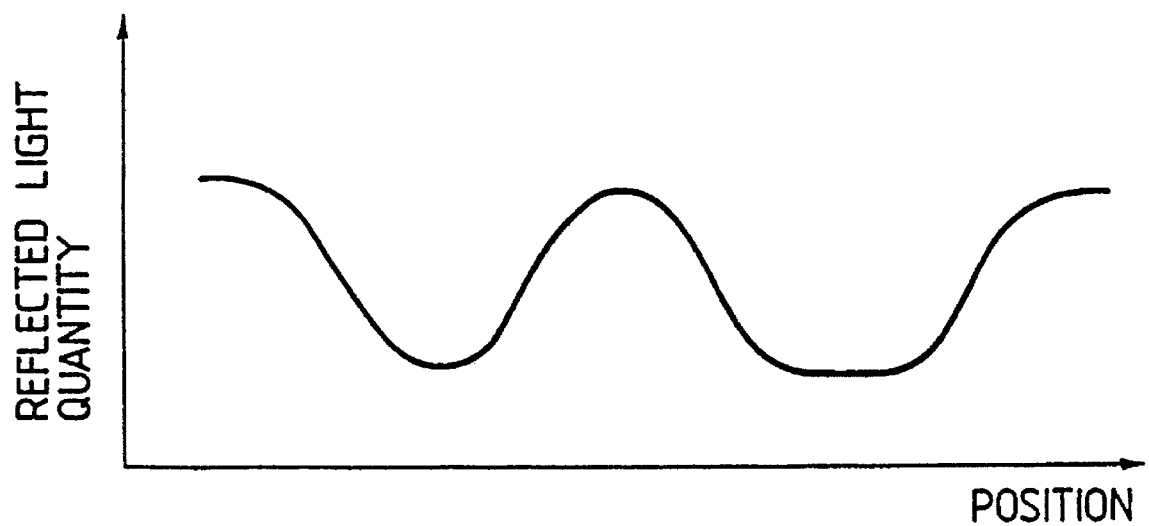
Figure 3A:
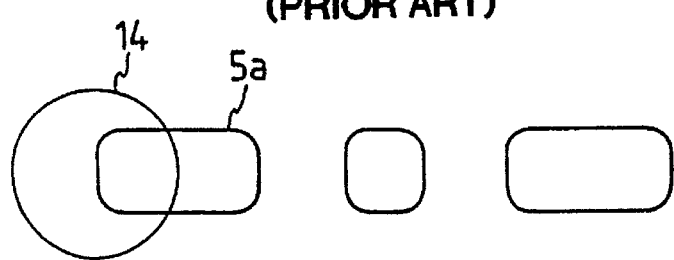
FIGS. 3A and 3B are respectively a plan view and a graph for explaining a reproduction signal of an information pit in a conventional reproduction apparatus.
Figure 3B:
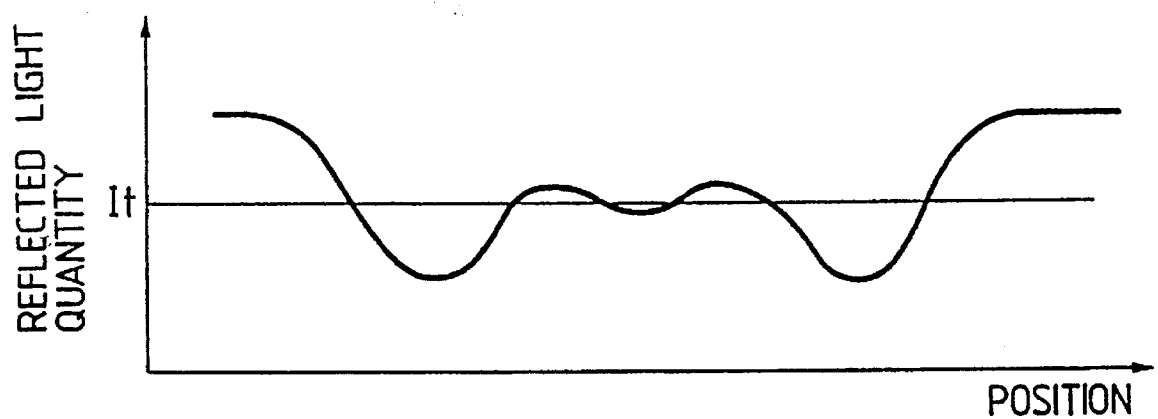

FIG. 4 best illustrates the characteristic feature of an optical information recording/reproduction apparatus of the present invention. Referring to FIG. 4, light emitted from a semiconductor laser 1 as a light source is collimated by a collimator lens 2, and is then focused by an objective lens 4 via a beam splitter 3, thus forming a small spot on an information storage (or recording) medium 5. Reflected light of the small spot by the information storage medium 5 is fetched by an optical system via the objective lens 4, and is then incident on the beam splitter 3. The light is reflected by the beam splitter 3 toward a detection optical system. In this case, the light beam guided to the detection optical system is split into two beams by a beam splitter 6, and the two beams are guided to two edge detection optical systems. The edge detection optical systems comprise condenser lenses 7 and 9, photodetectors 8 and 10, and edge signal extraction circuits 11 and 12, and their operations will be described in detail later. Edge extraction signals from the two edge detection optical systems are synthesized by an adder 13, thereby obtaining an information reproduction signal.

Figure 5A:
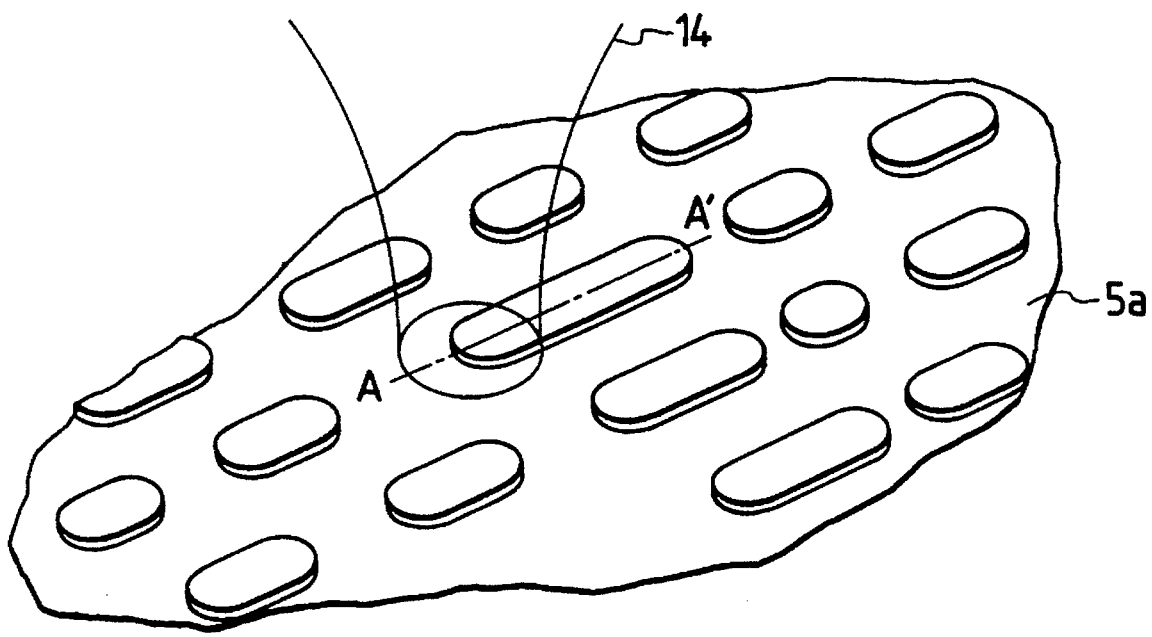
FIGS. 5A and 5B are respectively a perspective view and a sectional view for explaining a state wherein a light spot is radiated on an information pit.
Figure 5B:
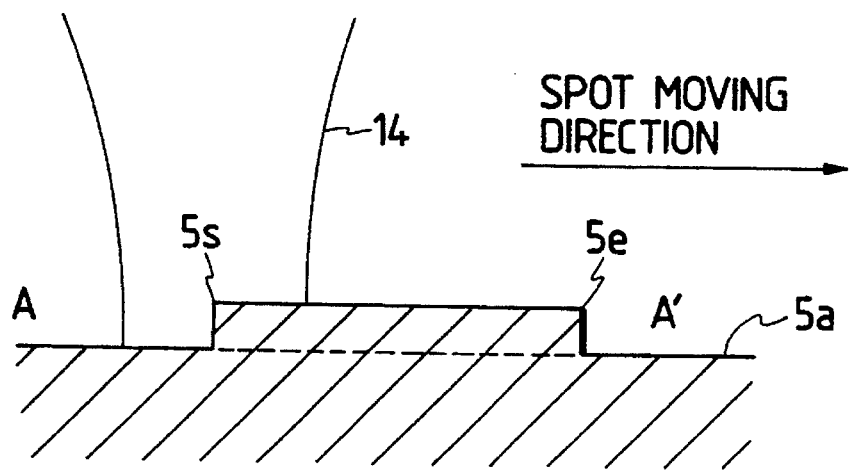

An operation executed when an edge detection method disclosed in Japanese Patent Application No. 3-195864 (filed on Jul. 9, 1991) [corresponding U.S. patent application Ser. No. 905,409 filed on Jun. 29, 1992 now U.S. Pat. No. 5,270,794] is applied to the above-mentioned edge detection optical systems will be described in detail below with reference to FIGS. 5A to 7H. FIG. 5A illustrates a state wherein a light spot 14 is radiated onto an information pit surface 5a on the information recording medium 5, and FIG. 5B illustrates a section taken along a line A–A' of a specific information pit in FIG. 5A. This information pit has a projecting structure toward the incident light side with respect to a surrounding region. For the sake of convenience, a leading edge (a boundary of an information pit) in the scanning direction of the light spot 14 will be defined as 5s hereinafter, and a trailing edge will be defined as 5e hereinafter.

Figure 6A:
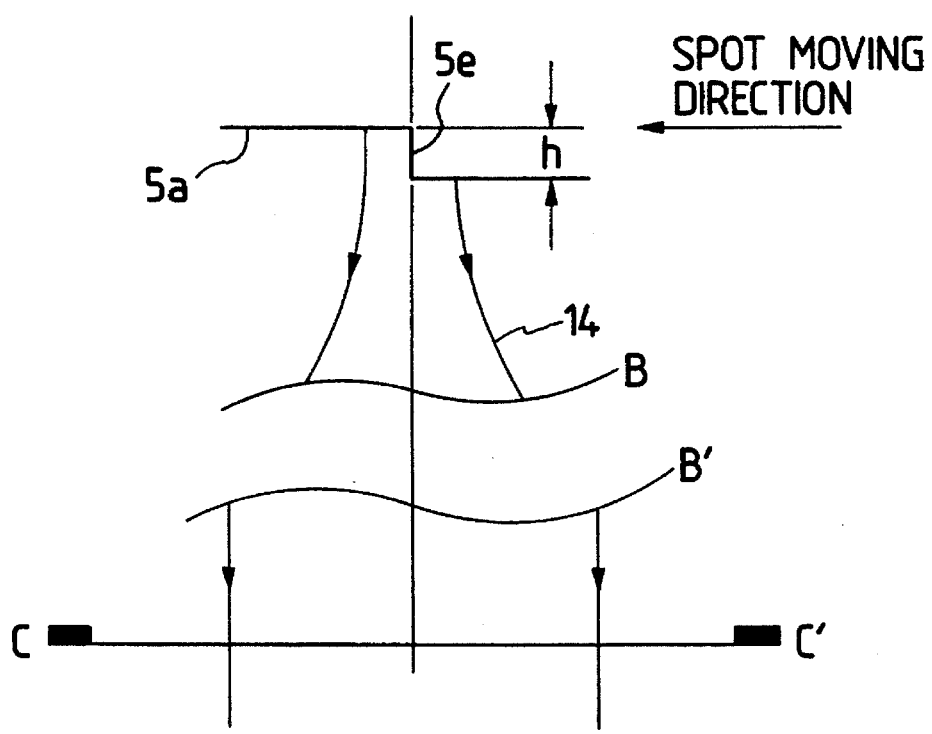
FIGS. 6A and 6B are charts for explaining reflected light from the edges of an information pit.

FIG. 6A illustrates a state wherein the light spot 14 is located on the trailing edge 5e of the information pit. Assume that the edge 5e of the information pit is sufficiently larger than the light spot in a direction perpendicular to the plane of drawing of FIG. 6A, and has a height h given by h≈λ/4n where n is the refractive index of a transparent substrate of the information storage medium 5, and λ is the wavelength of the semiconductor laser 1. The phase difference of reflected light at two sides of the edge is 180 deg. A condenser lens corresponding to the objective lens 4 is arranged between B–B', and the reflected light is collimated into a parallel beam.

Figure 6B:
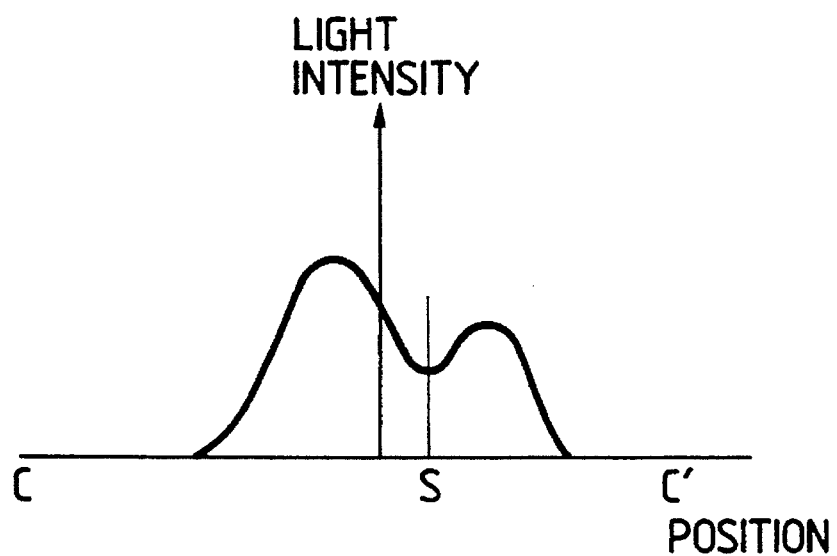

FIG. 6B shows a normal intensity distribution of reflected light after the reflected light is transmitted through the condenser lens 4 and is collimated into a parallel beam, along a line C–C' passing the optical axis. Numerical values used in a calculation will be exemplified below. If n=1.5, λ=780 nm, h=0.13 μm, the focal length of the objective lens is 5 mm, and the numerical aperture is 0.5, the beam size of the reflected light becomes about 5 mm. The intensity distribution of the reflected light along the line C–C' has two peak positions having different heights, and a dip region as a valley of the light quantity distribution, which drops sharply, is present between the two peak positions. The position of the dip region is indicated by a position S shifted from the optical axis toward the smaller peak side by about 0.5 mm. The intensity distribution is calculated by solving the Helmholtz's wave equation, and as a numerical analysis method, a boundary element method (see Journal of the Institute of Electronics and Communication Engineers, Jun. 6, 1986: vol. J69-C: No. 6: 740–746) is used.

FIGS. 7A to 7H show a change in intensity distribution of reflected light obtained when the light spot 14 is scanned along an information pit. In FIG. 7A, the light spot 14 has not reached an information pit at all. In FIGS. 7B to 7D, the light spot 14 reaches the leading edge 5s. In FIG. 7E, the light spot 14 does not extend over either edge, again. In FIGS. 7F to 7H, the light spot 14 reaches the trailing edge 5e. As shown in FIGS. 7A to 7H, when the light spot 14 reaches the leading edge 5s or the trailing edge 5e, the dip region as a valley of the light quantity distribution (FIGS. 7B to 7D: FIGS. 7F to 7H) becomes conspicuous, and the shift direction of the dip region with respect to the optical axis is reversed depending on whether the light spot reaches the leading or trailing edge. When the light spot is scanned, a change in light intensity is largest in the dip region. Therefore, when a light-receiving element, which receives a light component corresponding to the dip region, is used, an edge detection signal can be extracted.

Figure 8A:
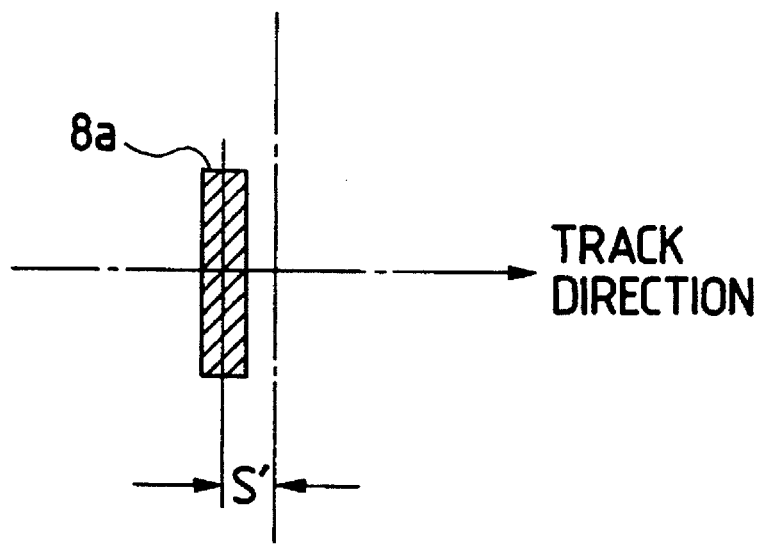
Figure 8B:
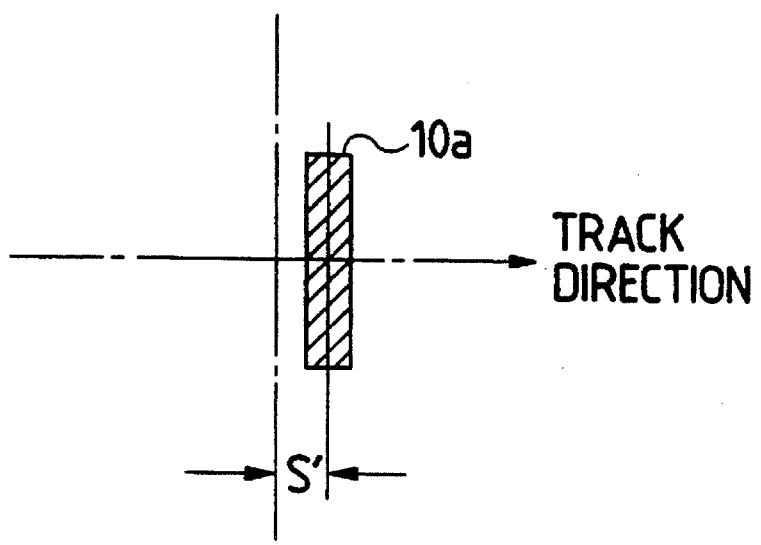

The extraction operation of the edge detection signal will be described in detail below with reference to FIGS. 8A to 10. FIGS. 8A and 8B are views for explaining light-receiving surfaces 8a and 10a of the photodetectors 8 and 10 for detecting the dip region. Each of the photodetectors 8 and 10 detects some light components at a position shifted from the optical axis in the scanning direction (tracking direction) of the light spot. As shown in FIG. 4, the beam splitter 6 splits the reflected light into two beams, and these two beams are respectively focused by the condenser lenses 7 and 9 to become incident on the photodetectors 8 and 10. Therefore, a substantially reduced-scale pattern of the light intensity distribution shown in FIG. 6B is radiated onto each light-receiving element as incident light. At this time, a shift amount S of the dip region from the optical axis in the parallel beam is converted into an amount S' on the light-receiving element. Therefore, the light-receiving surface of each of the photodetectors 8 and 10 has a split line at a position shifted by S' from the optical axis in the scanning direction (tracking direction). Note that the split line is arranged in a direction perpendicular to the tracking direction.

Figure 9A:
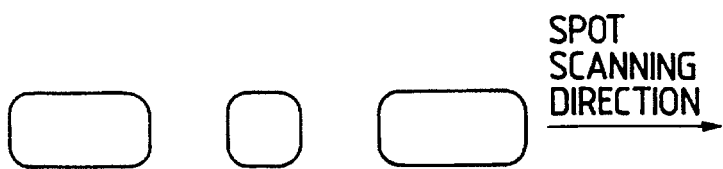
FIGS. 9A to 9F are charts for explaining edge detection.
Figure 9B:
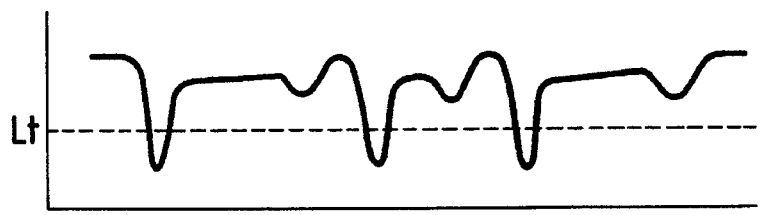
Figure 9C:
Figure 9D:
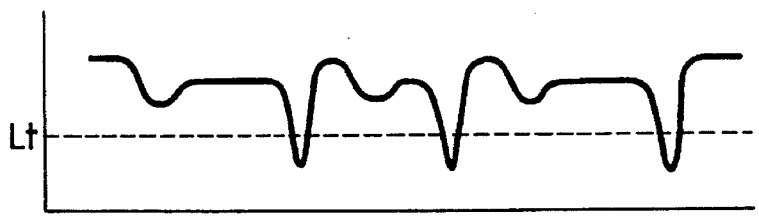
Figure 9E:

Since the shift directions of the dip region from the optical axis corresponding to the leading edge 5s and the trailing edge 5e are opposite to each other, the light-receiving surfaces 8a and 10a are formed in correspondence with detections of the leading edge 5s and the trailing edge 5e. FIGS. 9A to 9F are used for explaining detection signals from the photodetectors 8 and 10 having these light-receiving surfaces. FIG. 9A shows a pattern of the information pit, and FIG. 9B shows an output signal from the photodetector 8, which includes sharp dip-shaped signals in correspondence with the leading edges. FIG. 9D shows an output signal from the photodetector 10, which includes sharp dip-shaped signals in correspondence with the trailing edges. The detection signals from the two photodetectors 8 and 10 are respectively binarized with respect to a reference voltage $L_t$ by comparators 11a and 12a in an edge signal extraction circuit shown in FIG. 10. FIGS. 9C and 9E show the binarized signals. FIG. 9C shows an output signal 11c from the comparator 11a in FIG. 10, and FIG. 9E shows an output signal 12c from the comparator 12a in FIG. 10. These comparators can respectively output a detection signal of only the leading edges, and a detection signal of only the trailing edges.

Figure 9F:
Figure 10:
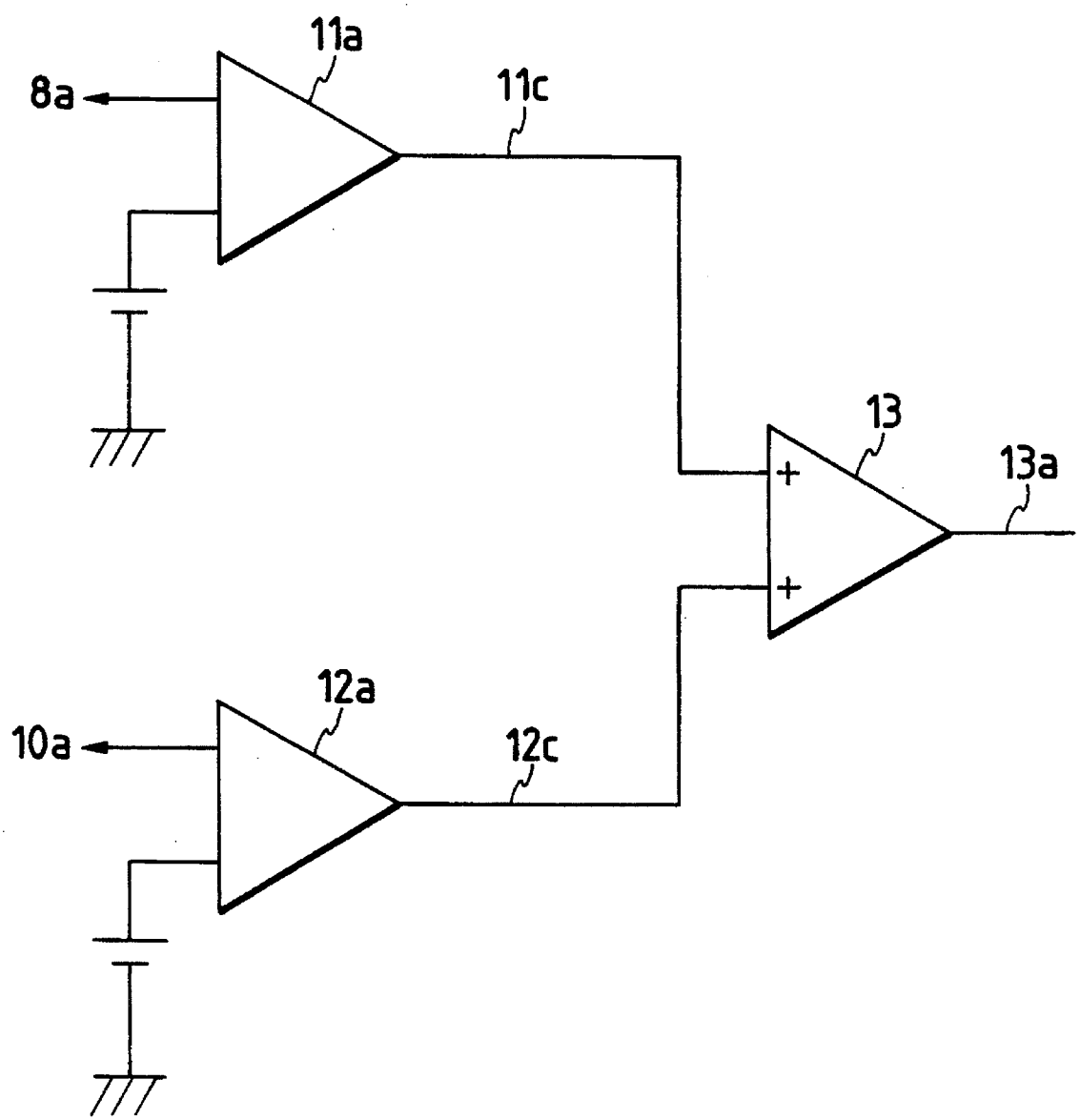
FIG. 10 is a circuit diagram showing an edge signal extraction circuit.

FIG. 9F shows a signal 13a as a result of adding the signals shown in FIGS. 9C and 9E by an adder 13 shown in FIG. 10. The signal 13a corresponds to an edge extraction signal including both the edge signals of the leading and trailing edges. In order to convert the edge extraction signal into an information reproduction signal, the edge extraction signal must be processed via a differential circuit and a zero-crossing point detection circuit (neither are shown). When edge detection is performed via the above-mentioned operations, an information pit smaller than the light spot can be reproduced.

In the above embodiment, the height of the information pit is almost equal to $\lambda/4n$. However, the present invention can be applied to various other heights. More specifically, as disclosed in Japanese Patent Application No. 3-195864 by the present applicant, the dip position can be calculated in accordance with the height of an edge portion.

Figure 11:
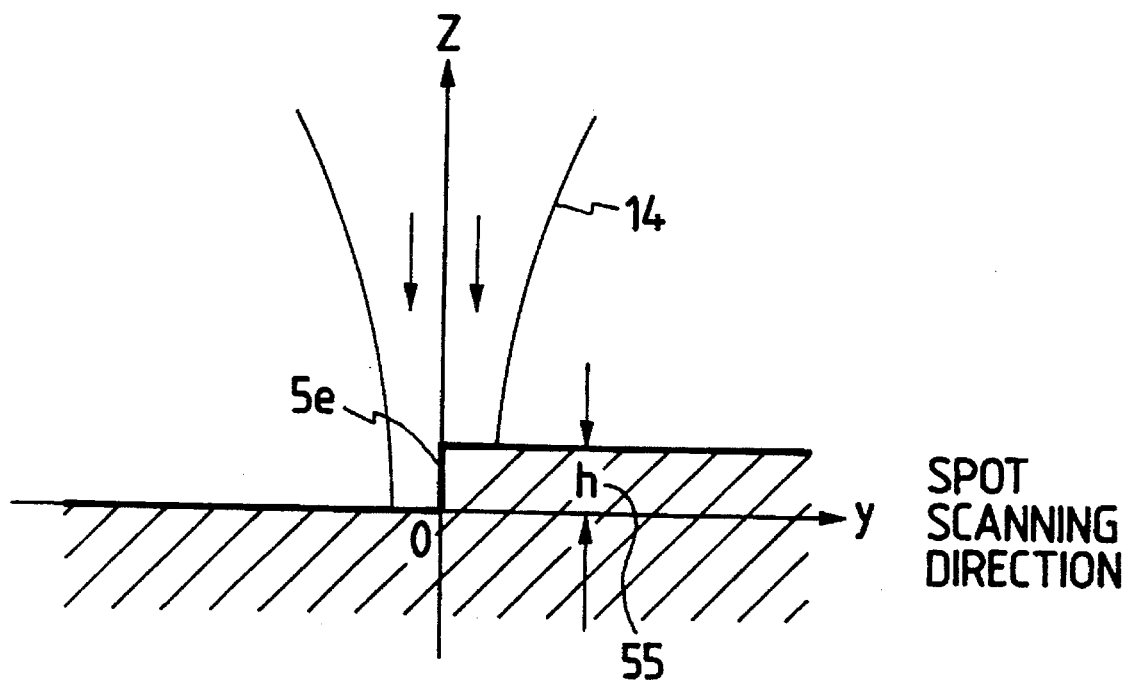
FIG. 11 is a sectional view for explaining a state wherein a light spot is radiated on an edge having a predetermined level.
Figure 12A:
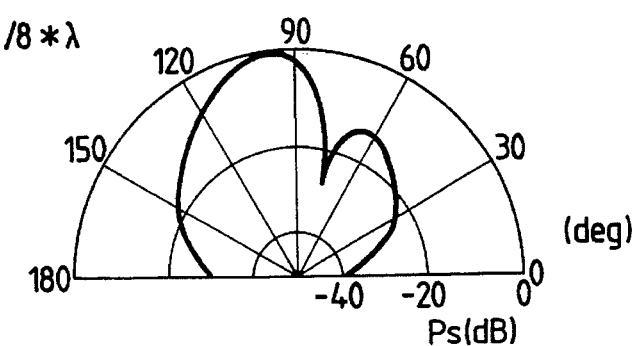
FIGS. 12A to 12D are charts for explaining the intensity distribution characteristics of reflected light from the edge in respective directions.
Figure 12B:
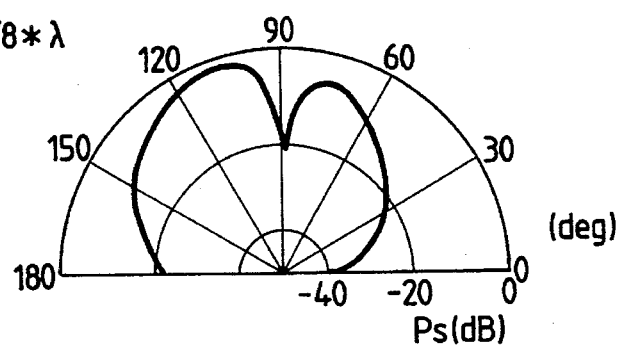
Figure 12C:
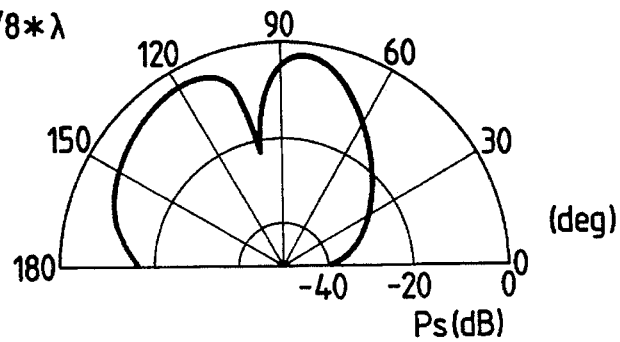
Figure 12D:
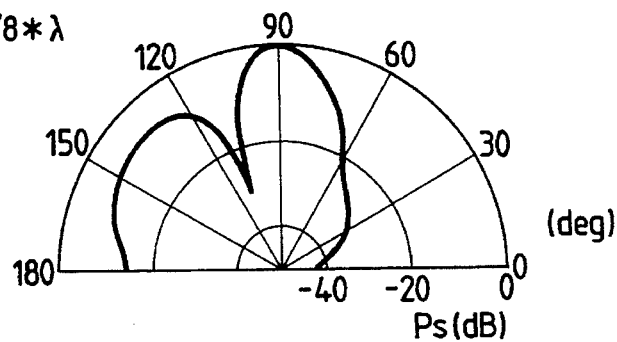
Figure 13A:
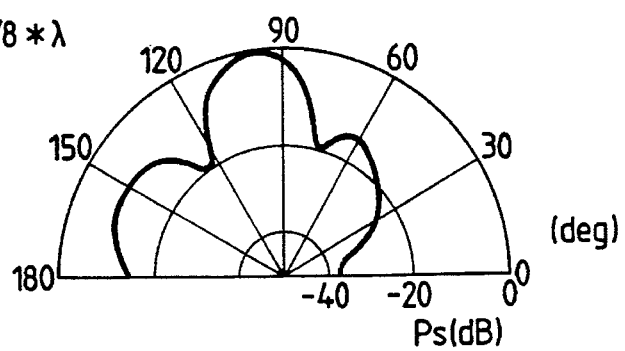
FIGS. 13A to 13D are charts for explaining the intensity distribution characteristics of reflected light from the edge in respective directions.
Figure 13B:
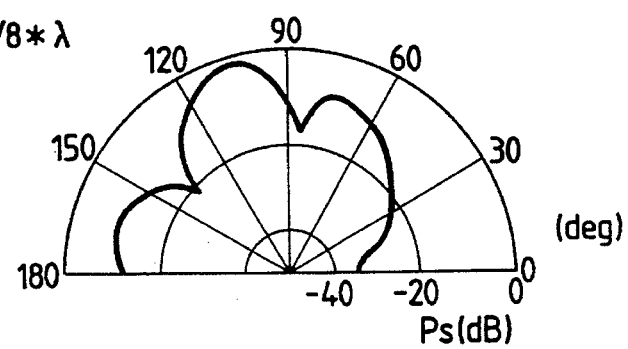
Figure 13C:
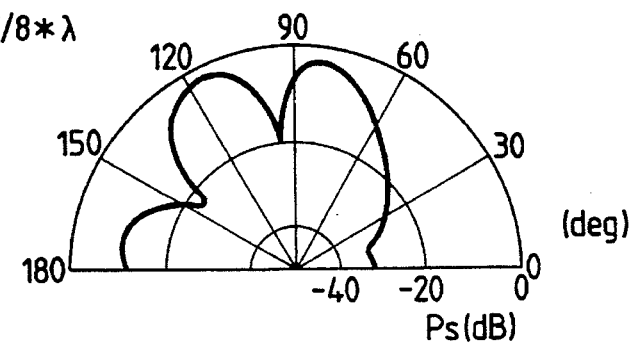
Figure 13D:
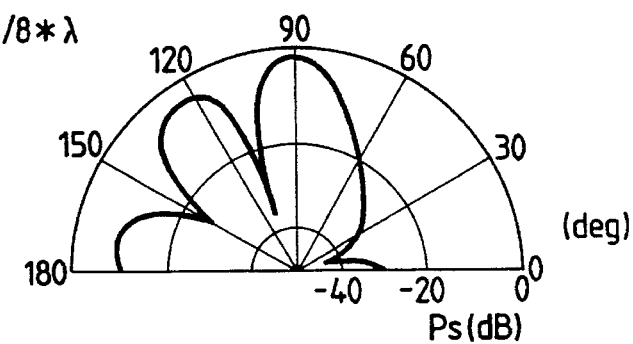

FIGS. 11 to 14 show an example of a calculation of the dip position. FIG. 11 illustrates a state wherein the light spot 14 is radiated so that the center of its optical axis coincides with the edge portion 5e as in FIG. 6A. In FIG. 11, a height 55 of the edge is represented by h. FIGS. 12A to 12D, and FIGS. 13A to 13D show calculation results of the light intensity distribution with respect to the reflection angle of light reflected by the edge in correspondence with various heights h. When the height h is changed from $\frac{1}{8}\lambda$ to $\frac{5}{8}\lambda$ ($\lambda$ is the wavelength used at that time), the dip appearance angle changes. FIG. 14 summarizes these results. The above embodiment corresponds to a white dot 50 in FIG. 14. In FIG. 14, since the position of a minimal value is plotted in units of angles, if the focal length of the objective lens is represented by f, and the angular direction of the minimal value is represented by θ, a shift S of the parallel beam from the center of optical axis is given by:

$$S = f \sin(\theta - 90)$$

When this value is applied to various edge heights h, the shift amount S' of each of the light-receiving surfaces from the optical axis shown in FIGS. 8A and 8B can be calculated.

Figure 15A:
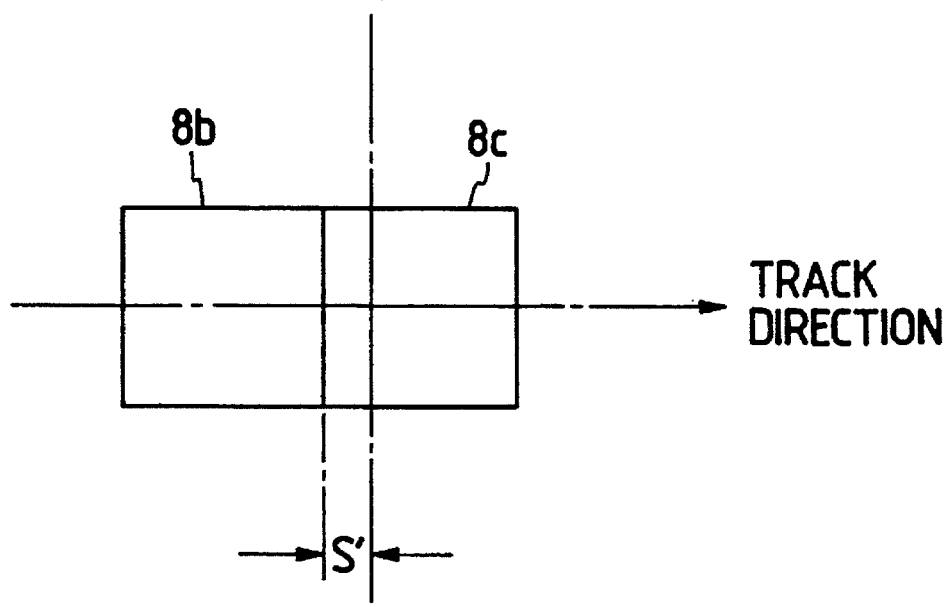
FIGS. 15A and 15B are views for explaining a photodetector in the second embodiment.
Figure 15B:
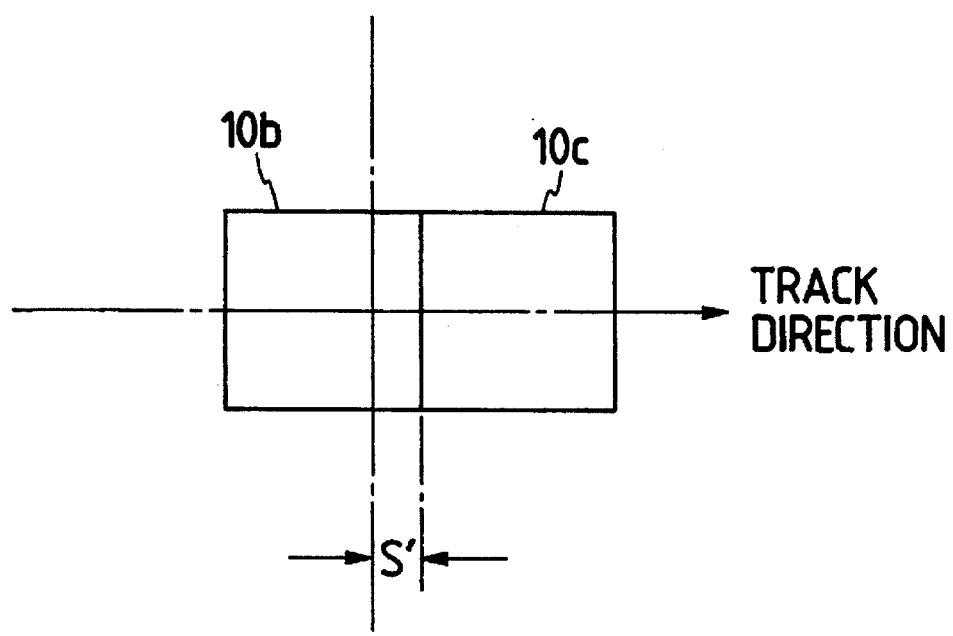
Figure 16:
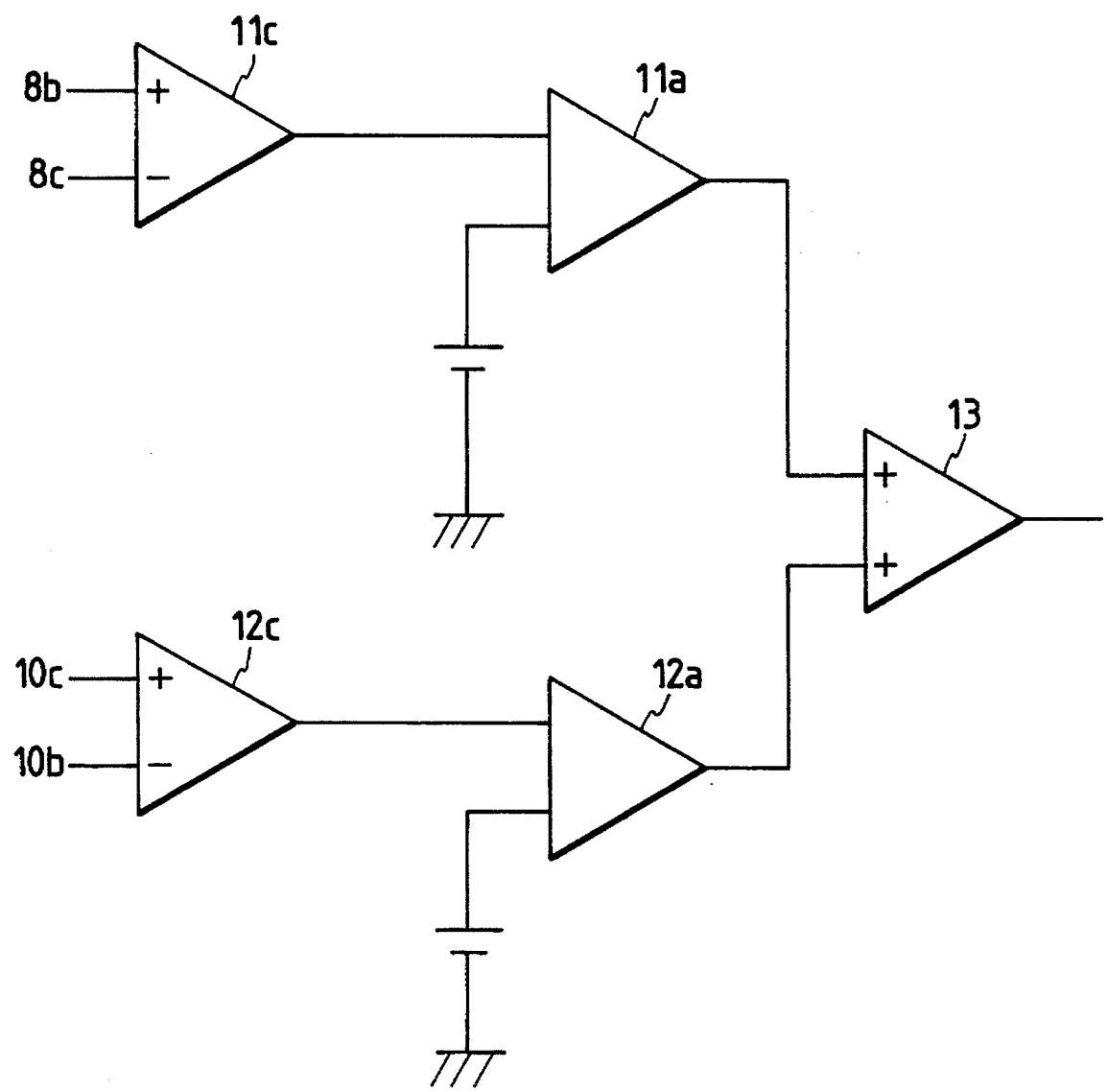
FIG. 16 is a circuit diagram showing an edge signal extraction circuit in the second embodiment.

FIGS. 15A to 16 are views for explaining the second embodiment of the present invention. As has been described above with reference to FIGS. 7A to 7H, when the light spot 14 reaches an edge, a sharpest dip is formed. At the same time, as can be seen from FIGS. 7A to 7H, the light quantity difference on the two sides of the dip position axis as a boundary becomes largest. Therefore, as shown in FIGS. 15A and 15B, when the photodetectors 8 and 10 respectively having two-split light-receiving surfaces 8b and 8c, and two-split light-receiving surfaces 10b and 10c, which have a split line at a position shifted from the optical axis by S', are used, two-split signals are obtained from these light-receiving surfaces, and a difference therebetween is calculated by a corresponding subtracter 11c or 12c (FIG. 16), thereby obtaining signals corresponding to FIG. 9B or 9D. Therefore, an edge extraction signal can be obtained by an edge signal extraction circuit comprising the comparators 11a and 12a, and the adder 13 shown in FIG. 16.

When the split line is arranged on the optical axis, since the light quantity distribution does not have symmetricity about a line perpendicular to the tracking direction passing the optical axis, it is apparent that a differential signal does not exhibit a peak value on the edge.

Figure 17:
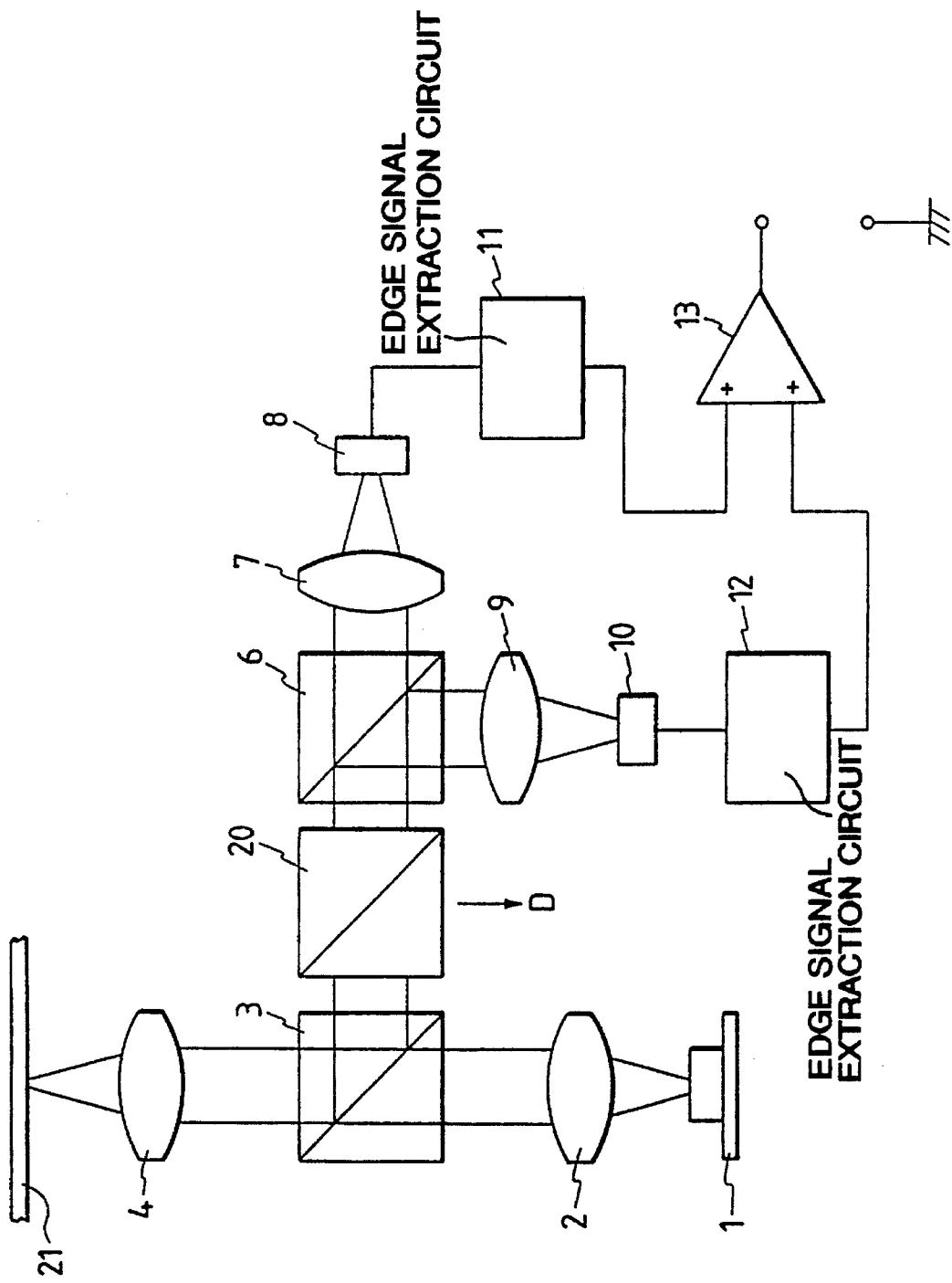
FIG. 17 is a diagram showing a reproduction optical system in the third embodiment.

FIG. 17 shows an arrangement of an optical system to which the third embodiment of the present invention is applied. In this embodiment, a magnetooptical medium 21 is used as an information storage medium. For this purpose, a polarization beam splitter 20 as an analyzer is used in a detection optical system. The polarization beam splitter 20 allows only p-polarized light as a magnetooptical component to pass therethrough, and reflects s-polarized light as linearly polarized light incident on the magnetooptical medium 21. The beam splitter 20 guides the reflected light toward an error detection optical system (not shown) for a light spot position servo, which system is arranged at a position D in FIG. 17. As for other optical systems, the same reference numerals in FIG. 17 denote the same optical elements as in FIG. 4, and a detailed description thereof will be omitted.

Figure 18A:
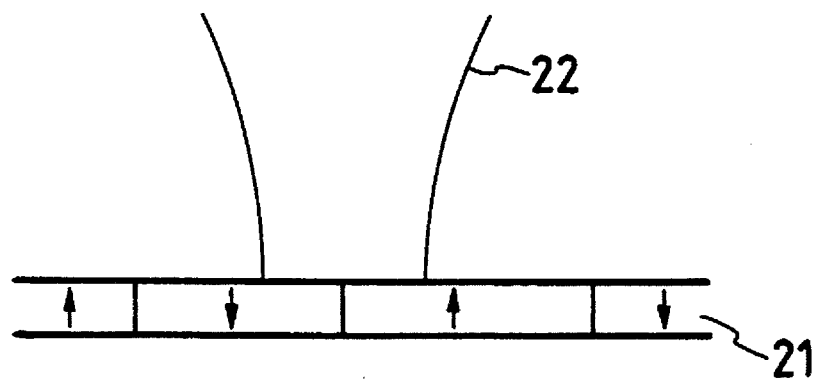
FIGS. 18A and 18B are views for explaining reflected light from an information pit in the third embodiment.
Figure 18B:
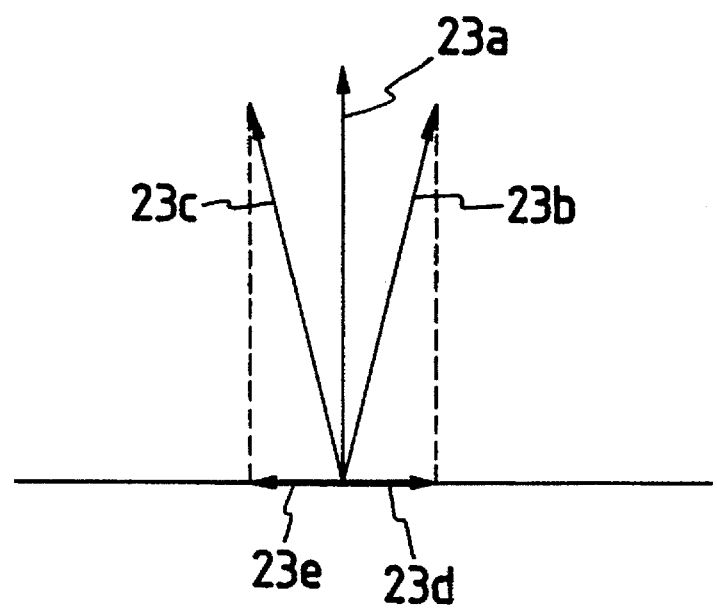

FIG. 18A shows a state wherein linearly polarized light (s-polarized light) is incident on a magnetization reversing portion of the magnetooptical medium 21. Referring to FIG. 18A, a half of a light spot 22 is radiated on a portion with upward magnetization, and the other half is radiated on a portion with downward magnetization. As is well known, the plane of polarization of incident linearly polarized light is slightly rotated by the magnetic Kerr effect, and its direction is reversed. More specifically, if s-polarized light is incident, p-polarized light is newly generated. FIG. 18B shows this state. Referring to FIG. 18B, the direction of polarization of incident light is a direction 23a. When the incident light is reflected by the surface of the magnetooptical medium, the plane of polarization of the incident light is rotated, and polarized light 23b or 23c is generated. As is apparent from FIG. 18B, these polarized light beams have polarized light components 23d and 23e perpendicular to the incident light 23a, and these polarized light components have a phase difference of 180° therebetween. In other words, the radiation regions of the light spot 22 having the edge as a boundary can be considered as phase objects having a phase difference of 180° therebetween. Therefore, paying attention to the phases, the radiation regions can be considered in the same manner as the information pit in the first and second embodiments.

Figure 19:
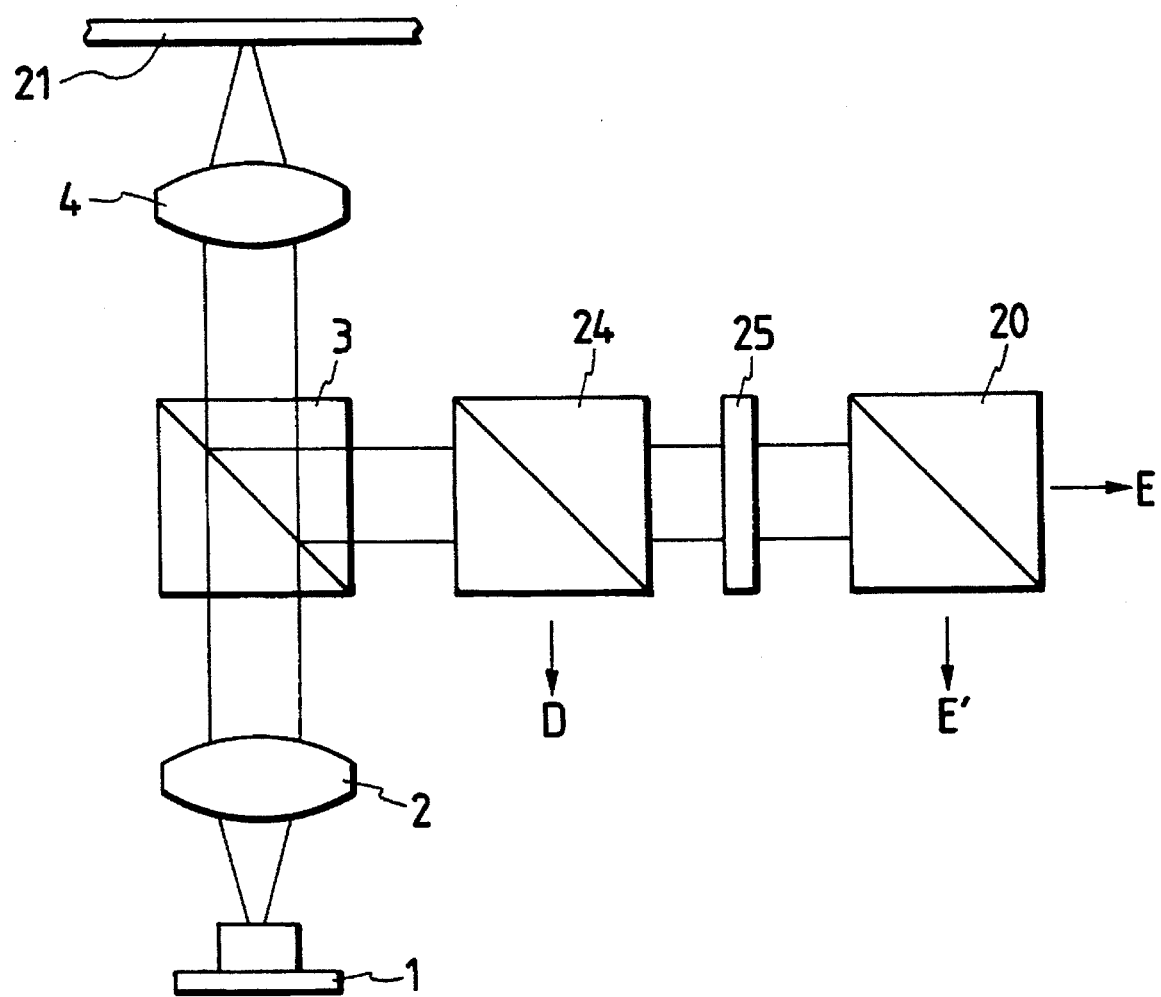
FIG. 19 is a diagram showing another reproduction optical system in the third embodiment.

FIG. 19 shows a conventional optical system for performing differential detection for the purpose of removing in-phase components by causing p-polarized light and s-polarized light to interfere with each other in magnetooptical recording. Referring to FIG. 19, light reflected by a beam splitter 24 is guided to a servo detection optical system D (not shown). Light transmitted through the beam splitter 24 is transmitted through a halfwave ($\lambda/2$) plate 25, its plane of polarization is rotated through 45°, and the rotated light is incident on the polarization beam splitter 20. Light transmitted through the polarization beam splitter 20 is guided to edge detection optical systems E and E' (see FIG. 19) having an arrangement comprising components 6 to 13. A difference between edge detection signals is calculated by these optical systems, thus obtaining a desired edge detection signal.

Figure 20A:
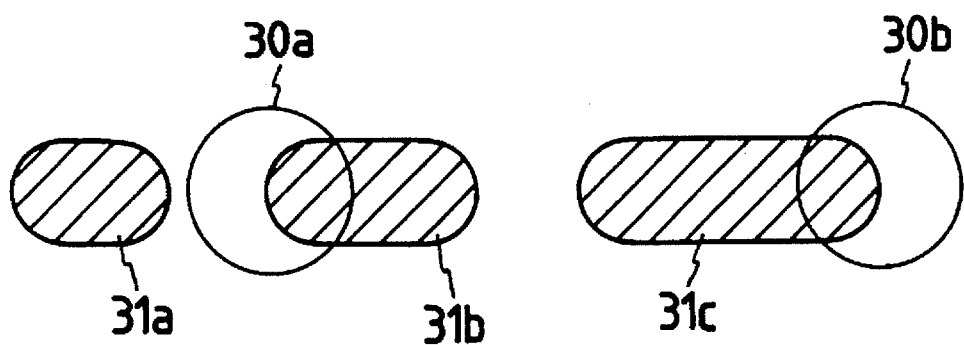
FIGS. 20A and 20B are plan views for explaining the relationship between an information pit and a light spot in the fourth embodiment.
Figure 20B:
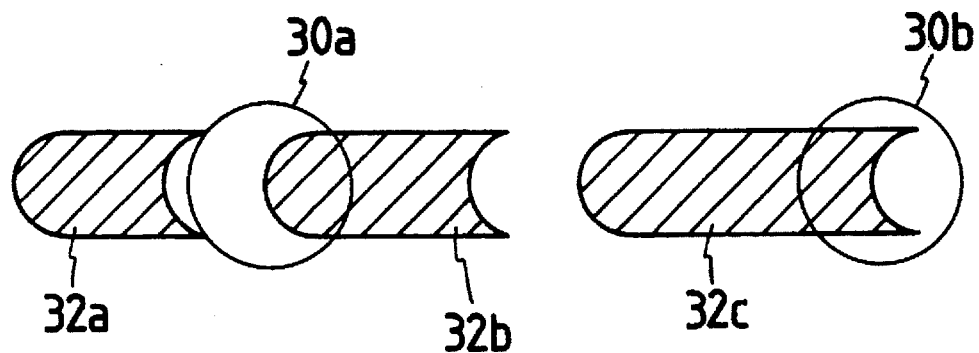

FIGS. 20A and 20B show the fourth embodiment of the present invention, and illustrate a state wherein a light spot is radiated on information pits on an information recording medium. FIG. 20A shows a state wherein a reproduction light spot is radiated on normal information pits 31a, 31b, and 31c on s read-only information recording medium, a WORM (Write Once Read Multiple) medium based on light-intensity modulation, or an erasable medium. Referring to FIG. 20A, when the light spot reaches a position 30a, it reaches the leading edge of the information pit 31b, and when the light spot reaches a position 30b, it reaches the trailing edge of the information pit 31c. In each of the first to third embodiments described above, reproduction executed when each information pit has s linear edge has been described. When the edge is to be reproduced more strictly, correction can be made for arcuated edges of information pits in the spot radiation states 30a and 30b. More specifically, when the light-receiving surface 8a in FIG. 8A, and the shift S' from the optical axis are finely adjusted, or when the shift S' of the split line from the optical axis in FIGS. 15A and 15B is finely adjusted using the optical systems of the above embodiment, the above-mentioned correction can be attained. On the other hand, FIG. 20B shows a state wherein a magnetooptical medium is used as an information recording medium, and information pits 32a, 32b, and 32c are recorded by modulating an externally applied magnetic field at high speed while radiating a high-intensity light spot, i.e., by a so-called magnetic field modulation recording method. In this case as well, as in FIG. 20A, the value S' in FIG. 8A or in FIGS. 15A and 15B can be finely adjusted. In this case, in FIG. 20A, the fine adjustment amounts of the leading and trailing edges can have values for correcting these edges in the same direction. However, in FIG. 20B, the fine adjustment amounts assume values for correcting the leading and trailing edges in opposite directions. In this manner, when correction corresponding to the edge shape of an information pit is made, more precise information reproduction can be realized. In this case, the shift amount, from the optical axis, of the arrangement position, in the spot scanning direction, of a photodetector for detecting the leading edge of an information pit is set to be slightly different from the shift amount, from the optical axis of the arrangement position, in the spot scanning direction, of a photodetector for detecting the trailing edge of the information pit.

As described above, upon reproduction of information from an optical information recording medium, the present invention comprises means for detecting the leading and trailing edges, in a light spot scanning direction, of an information pit on an optical information recording medium using edge detection means for detecting some light components of reflected light at a position shifted from the reflected light optical axis in the light spot scanning direction, so that a reproduction signal is synthesized from two edge detection signals, thereby reproducing information. Therefore, reproduction of an information pit smaller than the light spot can be realized, and the storage capacity of the information storage medium can be remarkably increased.

As described above, according to the present invention, an optical information reproduction apparatus for an information storage medium on which information is recorded so that the phase of light reflected by a small region as an information pit is different from the phase of light reflected by the remaining region, comprises edge detection means for detecting a leading edge, in the scanning direction of a light spot, of the information pit, and edge detection means for detecting a trailing edge, in the scanning direction of a light spot, of the information pit, and reproduces information by synthesizing reproduction signals from detection output signals from the two detection means.

The edge detection means includes a photodetector for detecting some light components at a position shifted from the optical axis in the scanning direction of the light spot. The edge detection means includes a two-divided photodetector having a division line at a position shifted from the optical axis in the scanning direction of the light spot. The information storage medium is a magnetooptical recording medium.

Still another embodiment of the present invention will now be described.

Figure 21:
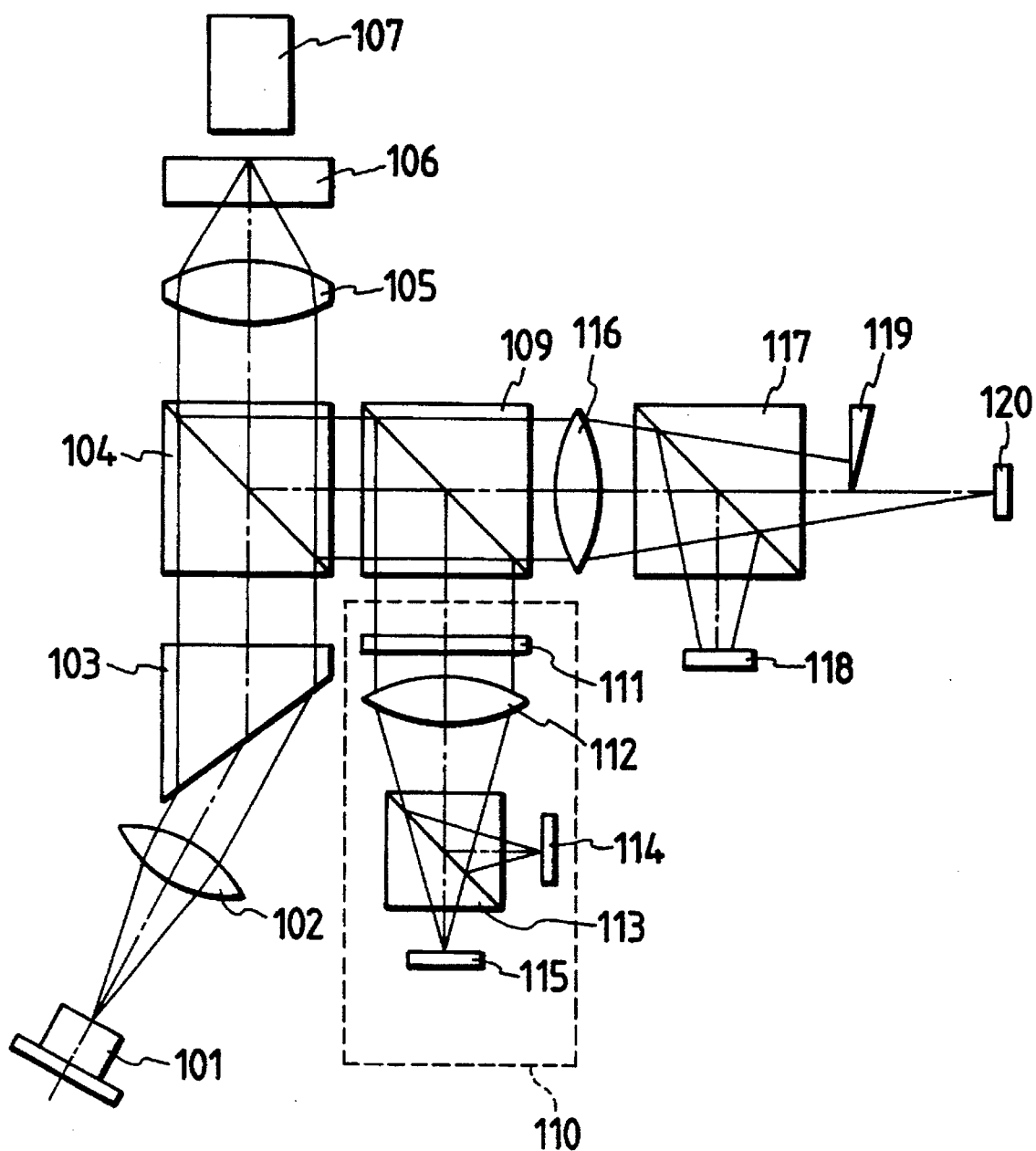
FIG. 21 is a diagram showing an optical system of a magnetooptical recording/reproduction apparatus.

In recent years, a magnetooptical information recording/reproduction apparatus, which uses a magnetooptical disk as a recording medium, is considered very promising due to its portable, large storage capacity, and erasable/rewritable features. FIG. 21 is a diagram showing an optical system of a magnetooptical information recording/reproduction apparatus. Referring to FIG. 21, a semiconductor laser 101 is used as a recording/reproduction light source. A divergent light beam emitted from the semiconductor laser 101 is collimated by a collimator lens 102, and is then shaped into a parallel beam having a circular section by a beam shaping prism 103. The parallel beam is transmitted through a polarization beam splitter 104, and is focused as a small light spot on a magnetic layer of a magnetooptical recording medium 106 by an objective lens 105. An external magnetic field from a magnetic head 107 is applied to the light spot radiation portion, thus recording an information pit on the magnetic layer.

Light reflected by the magnetooptical recording medium 106 is returned to the polarization beam splitter 104 via the objective lens 105. The reflected light is split into two beams by the beam splitter 104, and one beam is guided to a control optical system. In the control optical system, the split light beam is further split into two beams by another polarization beam splitter 109, and one light beam is guided to a reproduction optical system 110, thus generating a reproduction signal. The other light beam split by the polarization beam splitter 109 is guided to a half prism 117 via a condenser lens 116, and is split into two beams. One light beam is guided to a photodetector 118, and the other light beam is guided to a photodetector 120 via a knife edge 119. On the basis of detection signals from these photodetectors 118 and 120 in the control optical system, servo error signals for auto-tracking control and auto-focusing control are generated.

The reproduction optical system 110 comprises a half-wave plate 111 for rotating the direction of polarization of a light beam through 45°, a condenser lens 112 for focusing a light beam, a polarization beam splitter 113, and photodetectors 114 and 115 for respectively detecting the light beams split by the polarization beam splitter 113. Signals detected by the photodetectors 114 and 115 are differentially detected by a differential amplifier (not shown), thereby reproducing a magnetooptical signal.

Figure 22:
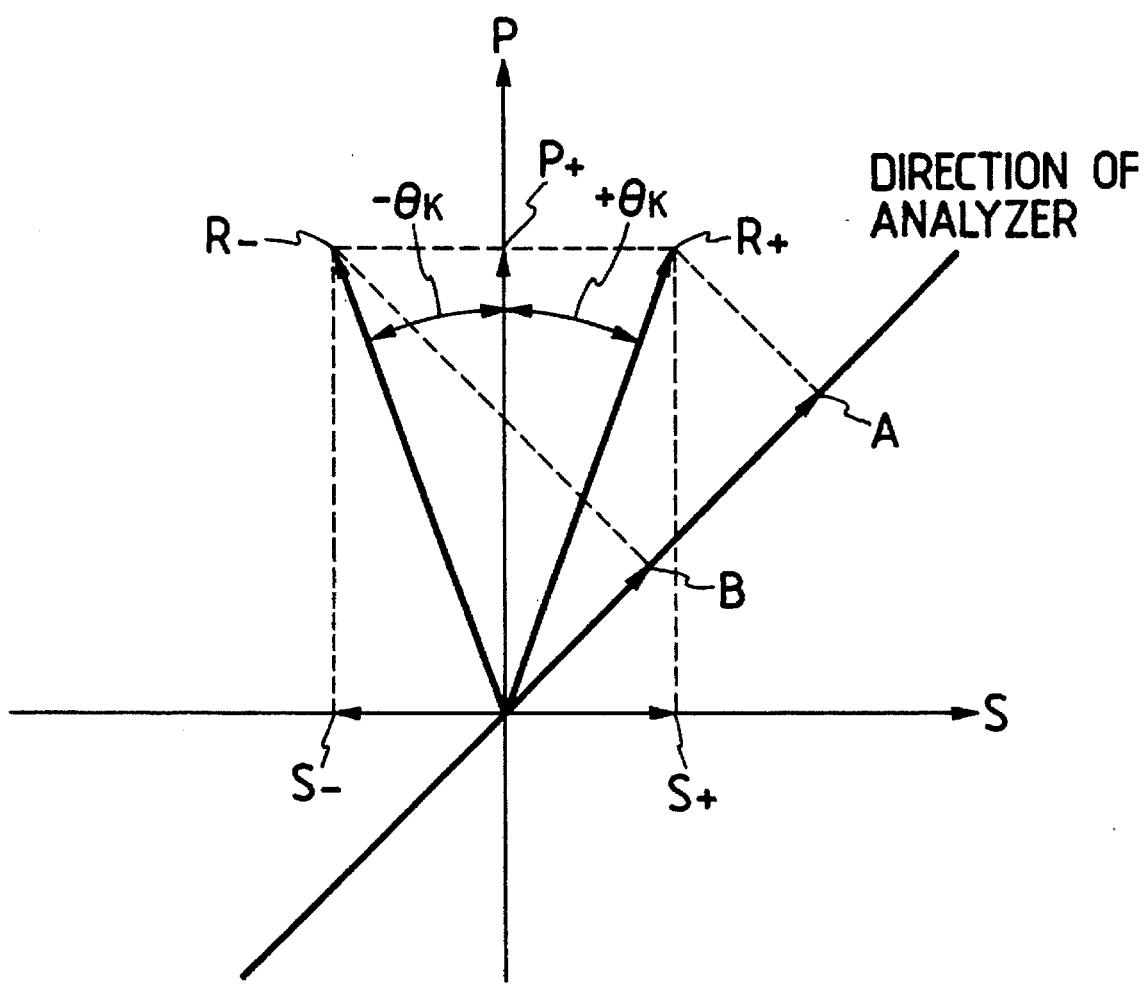
FIG. 22 is a graph for explaining the principle of information reproduction in magnetooptical recording.

On the magnetooptical recording medium, information is recorded by utilizing different directions of perpendicular magnetization. When linearly polarized light is radiated on this medium, the direction of polarization of light reflected by the medium is rotated clockwise (in a right-handed direction) or counterclockwise (in a left-handed direction) depending on the difference in direction of magnetization. For example, the direction of polarization of linearly polarized light incident on the magnetooptical recording medium is defined as a direction of the coordinate axis P, reflected light corresponding to downward magnetization is represented by $R_+$ rotated through $+\theta_K$, and reflected light corresponding to upward magnetization is represented by $R_-$ rotated through $-\theta_K$, as shown in FIG. 22. When an analyzer is placed in a direction shown in FIG. 22, light transmitted through the analyzer includes A for $R_+$, and B for $R_-$. When this light is detected by a photodetector, information can be obtained as a light intensity difference. In the example shown in FIG. 21, the polarization beam splitter 113 serves as an analyzer in a +45° direction from the coordinate axis P for one of split beams, and in a −45° direction from the coordinate axis P for the other split beam. More specifically, since signal components detected by the photodetectors 114 and 115 have opposite phases, a noise-reduced reproduction signal can be obtained by differentially detecting these signals.

In this manner, an information pit (to be simply referred to as a pit hereinafter) is recorded on the magnetooptical recording medium as a difference in direction of magnetization. As a recording format, a pit position recording method for providing a significance of information at the center of a pit, and a pit edge recording method for providing a significance of information at the edge of a pit, are available. When information is recorded on the magnetooptical recording medium using an optical means, if the recording sensitivity of the magnetooptical recording medium upon writing of a pit is moderate with respect to heat generated by a light spot, the size of the pit varies. However, the position of the center of the pit remains the same. For this reason, in most of conventional magnetooptical recording media using the optical means, pit position recording is performed. In contrast to this, if the recording sensitivity of the magnetooptical recording medium upon writing of a pit is steep with respect to heat generated by a light spot, since a variation in size of the pit can be suppressed to be equal to or smaller than a predetermined amount, pit edge recording can be performed, and the recording density can be increased. For this reason, in recent years, magnetooptical recording media and pit recording methods suitable for pit edge recording have been developed, and the recording format is in a process of a transition from pit position recording to pit edge recording.

When information recorded by pit edge recording is to be reproduced, a reproduction signal obtained by the reproduction optical system shown in FIG. 21 is compared with a predetermined slice level, and a position where the reproduction signal crosses the slice level is detected, thereby reproducing information, and restoring original recording information. However, when the recording density of information is further increased, and the size of the minimum pit becomes equal to or smaller than the size of the light spot, DC components of optically detected signals undesirably fluctuate due to relatively deteriorated transmission characteristics of an optical head and the like. For this reason, when the pit edge is detected with a predetermined slice level, an edge shift undesirably occurs.

In order to solve this problem, the following method is known. That is, optical differential detection is performed using a divided photodetector, which is divided in a direction perpendicular to a track, thereby detecting the pit edge while suppressing fluctuation of DC components. More specifically, for example, Japanese Laid-Open Patent Application No. 62-188047 discloses a method wherein a light beam reflected by an information recording medium is converted into circularly polarized light, and the light quantity distribution on a divided photodetector caused by a phase difference between circularly polarized light components reflected by portions respectively having upward magnetization and downward magnetization is detected. However, it is difficult for this method of converting reflected light into circularly polarized light to precisely detect the pit edge since the phase difference is very small, and the detection signal is very weak.

"Detecting Transition Regions In Magnetooptical Disk Systems, Appl. Phys. Lett. 55(8), 716–7 (1989)" describes a detection method of an auto-focus control signal and an auto-tracking control signal using a single multi-split photodetector, and a detection method of a pit edge based on optical differentiation. However, in this example as well, the detection signal is very weak since circularly polarized light is radiated on an information recording medium, and the edge is detected by utilizing the phase difference of reflected light components.

On the other hand, as is apparent from FIG. 22, two components $S_+$ and $S_-$ have the same magnitude but a phase difference $\pi$ therebetween. More specifically, paying attention to s-polarized light components alone, magnetooptical pits can be regarded as phase pits having the phase difference $\pi$ therebetween. Japanese Laid-Open Patent Application No. 61-198458 describes this mechanism in more detail, and discloses a method of improving quality of a reproduction signal by correcting the phase difference between s- and p-polarized light components. However, this method aims at improving quality of a reproduction signal, but does not aim at optically reproducing a pit edge. Also, as is conventionally known, the light quantity distribution of light reflected by an edge portion of a phase pit changes. For example, Japanese Laid-Open Utility Model Application No. 56-90744 discloses a method of obtaining a reproduction signal by executing optical differentiation using a multi-divided photodetector by utilizing the fact that the light quantity distribution of light reflected by the edge portion of a three-dimensional phase pit becomes asymmetrical on a far field plane. However, since the magnetooptical pit is not a three-dimensional pit, asymmetricity obtained by s-polarized light alone on the far field plane is very small, and the above-mentioned method cannot be applied to reproduction of the magnetooptical pit without modifications.

Furthermore, Japanese Laid-Open Patent Application No. 2-46544 discloses a method utilizing the fact that s-polarized light components of light reflected by the edge portion of a magnetooptical pit form an asymmetrical light quantity distribution. However, with this method as well, asymmetricity obtained by s-polarized light alone on the far field plane is very small, and the above-mentioned method cannot be applied to reproduction of the magnetooptical pit without modifications. In addition, since the light quantity of s-polarized light components alone is very small, it is difficult to precisely reproduce information. "Edge Detection For Magnetooptical Data Storage, Appl. Opt. 30. 232–252 (1991)" and Japanese Laid-Open Patent Application No. 3-120645 disclose a method of optically detecting the edge portion of a pit by utilizing both s- and p-polarized light components. However, with this method, the number of components of an optical system becomes too large, resulting in a complicated arrangement.

Figure 23:
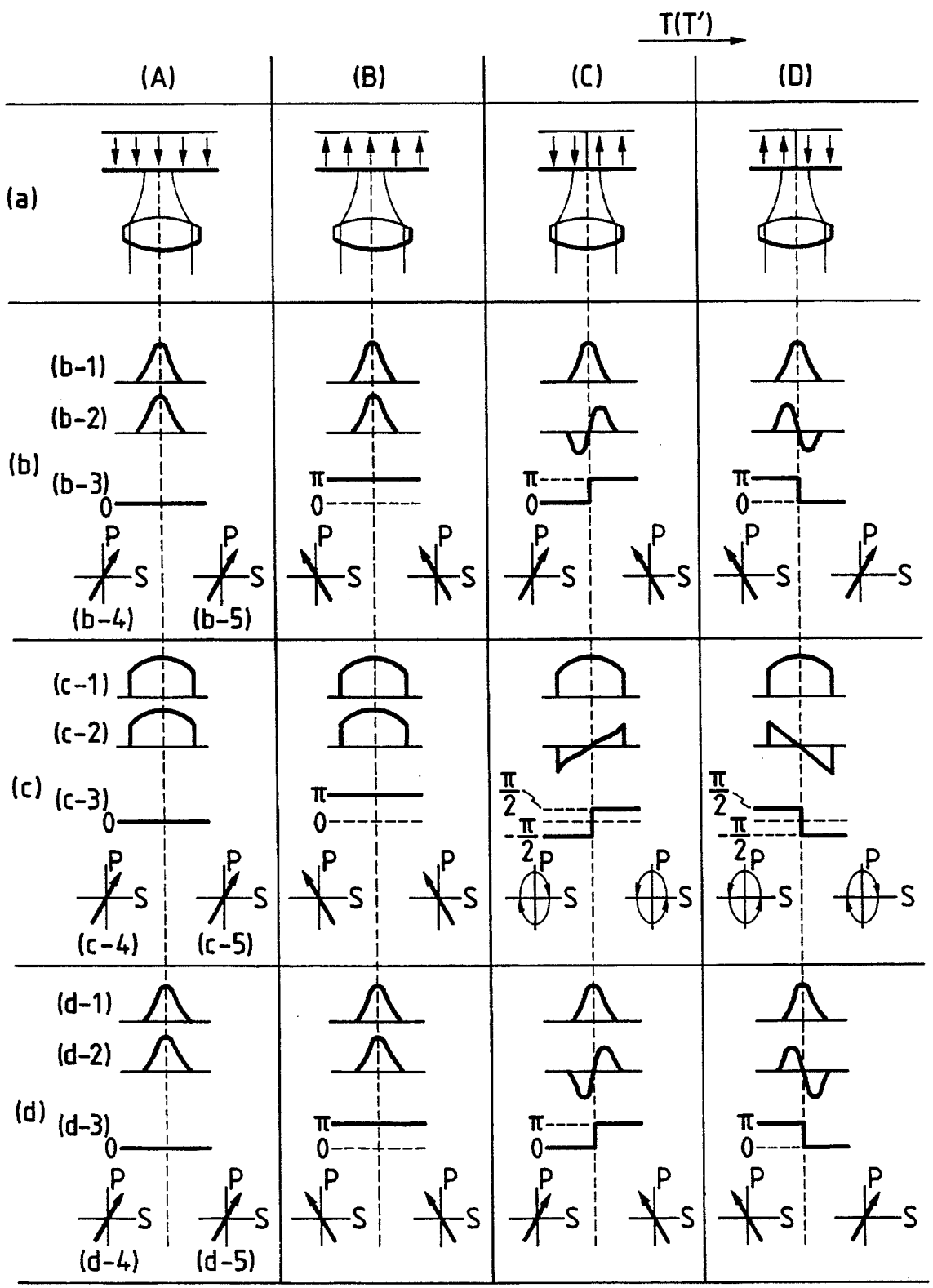
FIG. 23 is an explanation view showing the amplitude distributions, the phase distributions, and polarization distributions of reflected light at a reflected position on a magnetooptical recording medium, a far field plane, and a convergent plane of a condenser lens when linearly polarized light is incident on the magnetooptical recording medium.

(a) to (d) in FIG. 23 are views showing the amplitude distributions, the phase distributions, and the polarization distributions of a reflected light beam at a reflected position on a magnetooptical recording medium, a far field plane, and a convergent plane of a condenser lens when linearly polarized light is incident on the magnetooptical recording medium. In this case, assume that these distributions are free from the influences of a phase plate and an analyzer. (a) in FIG. 23 shows the magnetization states of the magnetooptical recording medium, and the radiation positions of a reproduction light spot focused by an objective lens in correspondence with four cases (A) to (D) in FIG. 23. In the case (A), all pits have downward magnetization, and the light spot is radiated on one of these pits. In the case (B), all pits have upward magnetization, and the light spot is radiated on one of these pits. In the case (C), left pits in (a) of FIG. 23 have downward magnetization, right pits in (a) of FIG. 23 have upward magnetization, and the light spot is radiated on the edge of a boundary pit. Furthermore, in the case (D), left pits in (a) of FIG. 23 have upward magnetization, right pits (a) in FIG. 23 have downward magnetization, and the light spot is radiated on the edge of a boundary pit. Note that an arrow T (T') indicates the moving direction of the light spot.

(b) in FIG. 23 shows the distributions of reflected light immediately after linearly polarized light is reflected by the magnetooptical recording medium. An incident light beam is p-polarized, linearly polarized light, as described above. (b-1) in FIG. 23 shows the amplitude distribution of p-polarized light, (b-2) in FIG. 23 shows the amplitude distribution of s-polarized light (its magnitude is ignored), (b-3) in FIG. 23 shows the phase distribution of s-polarized light with reference to p-polarized light, (b-4) in FIG. 23 shows the polarization state of a left-side light beam with reference to the objective lens, and (b-5) in FIG. 23 shows the polarization state of a right-side light beam. The right and left sides of the light beam respectively correspond to forward and backward directions of the light spot in the tracking direction.

(c) in FIG. 23 shows the distributions of a reflected light beam on the far field plane in correspondence with the cases (A) to (D). (c-1) in FIG. 23 shows the amplitude distribution of p-polarized light, (c-2) in FIG. 23 shows the amplitude distribution of s-polarized light (its magnitude is ignored), (c-3) in FIG. 23 shows the phase distribution of s-polarized light with reference to p-polarized light, (c-4) in FIG. 23 shows the polarization state of a left-side light beam, and (c-5) in FIG. 23 shows the polarization state of a right-side light beam. Similarly, (d) in FIG. 23 shows the distributions of a reflected light beam on the convergent plane of the condenser lens in correspondence with the cases (A) to (D). (d-1) in FIG. 23 shows the amplitude distribution of p-polarized light, (d-2) in FIG. 23 shows the amplitude distribution of s-polarized light (its magnitude is ignored), (d-3) in FIG. 23 shows the phase distribution of s-polarized light with reference to p-polarized light, (d-4) in FIG. 23 shows the polarization state of a left-side light beam, and (d-5) in FIG. 23 shows the polarization state of a right-side light beam.

When a downward magnetization pit in the case (A) is to be reproduced, as shown in (b-1) and (b-2) in FIG. 23, the amplitude distributions of both p- and s-polarized light components immediately after they are reflected by the magnetooptical recording medium have symmetrical distributions. The polarization states of the right- and left-side light beams are the same, and are linearly polarized states which are rotated clockwise, as shown in (b-5) and (b-4) in FIG. 23. At this time, the phase difference between the p- and s-polarized light components is 0, as shown in (b-3) in FIG. 23. On the far field plane and the convergent plane as well, as shown in (c-1), (c-2), (d-1) and (d-2) in FIG. 23, the amplitude distributions of p- and s-polarized light components are symmetrical. Also, the phase of s-polarized light is 0, as shown in (c-3) and (d-3) in FIG. 23. In addition, the polarization states of the right- and left-side light beams are the same, and are states which are rotated clockwise, as shown in (c-5), (c-4), (d-5) and (d-4) in FIG. 23.

When an upward magnetization pit in the case (B) is to be reproduced, the amplitude distributions of p- and s-polarized light components immediately after they are reflected by the magnetooptical recording medium are symmetrical. In this case, s-polarized light has a phase difference $\pi$ from that of p-polarized light. The polarization states of the right- and left-side light beams are linearly polarized states which are rotated counterclockwise as compared to downward magnetization. On the far field plane and the convergent plane, the amplitude distributions of p- and s-polarized light components are symmetrical, the phase difference of s-polarized light is $\pi$, and the polarization states of the right- and left-side light beams are linearly polarized states which are rotated counterclockwise.

When the edge of a pit corresponding to a boundary between downward magnetization and upward magnetization in the case (C) is to be reproduced, the amplitude distribution of p-polarized light immediately after it is reflected by the magnetooptical recording medium is symmetrical. However, the amplitude distribution of s-polarized light immediately after it is reflected by the magnetooptical recording medium is divided into two regions in correspondence with the directions of magnetization, the phase distribution of the left region is 0, and that of the right region is $\pi$. At this time, the polarization state of the left-side light beam is a linearly polarized state which is rotated clockwise, and that of the left-side light beam is a linearly polarized state which is rotated counterclockwise. On the far field plane, the amplitude distribution of p-polarized light is symmetrical, and that of s-polarized light is left divided into two regions. In this case, the phase distribution of the s-polarized light in the left region is changed to $-\pi/2$, and that in the right region is changed to $+\pi/2$. More specifically, the polarization state of the left region is a right-handed elliptically polarized state, and that of the right region is a left-handed elliptically polarized state. These elliptically polarized light components have the same ellipticity and size, and the major axis of the ellipse coincides with the p-polarized light direction. On the convergent plane of the condenser lens, the amplitude distribution of p-polarized light is symmetrical, and the amplitude distribution of s-polarized light is left divided into two regions. In this case, the phase distribution of the s-polarized light is returned to the initial state, i.e., the phase distribution of the left region is 0, and that of the right region is $\pi$. Therefore, the polarization state of the left-side light beam is a linearly polarized state which is rotated clockwise, and that of the right-side light beam is a linearly polarized state which is rotated counterclockwise. When the edge of a pit corresponding to a boundary between downward magnetization and upward magnetization in the case (D) is to be reproduced, the states of the right and left sides are reversed to those in the case (C).

Figure 24:
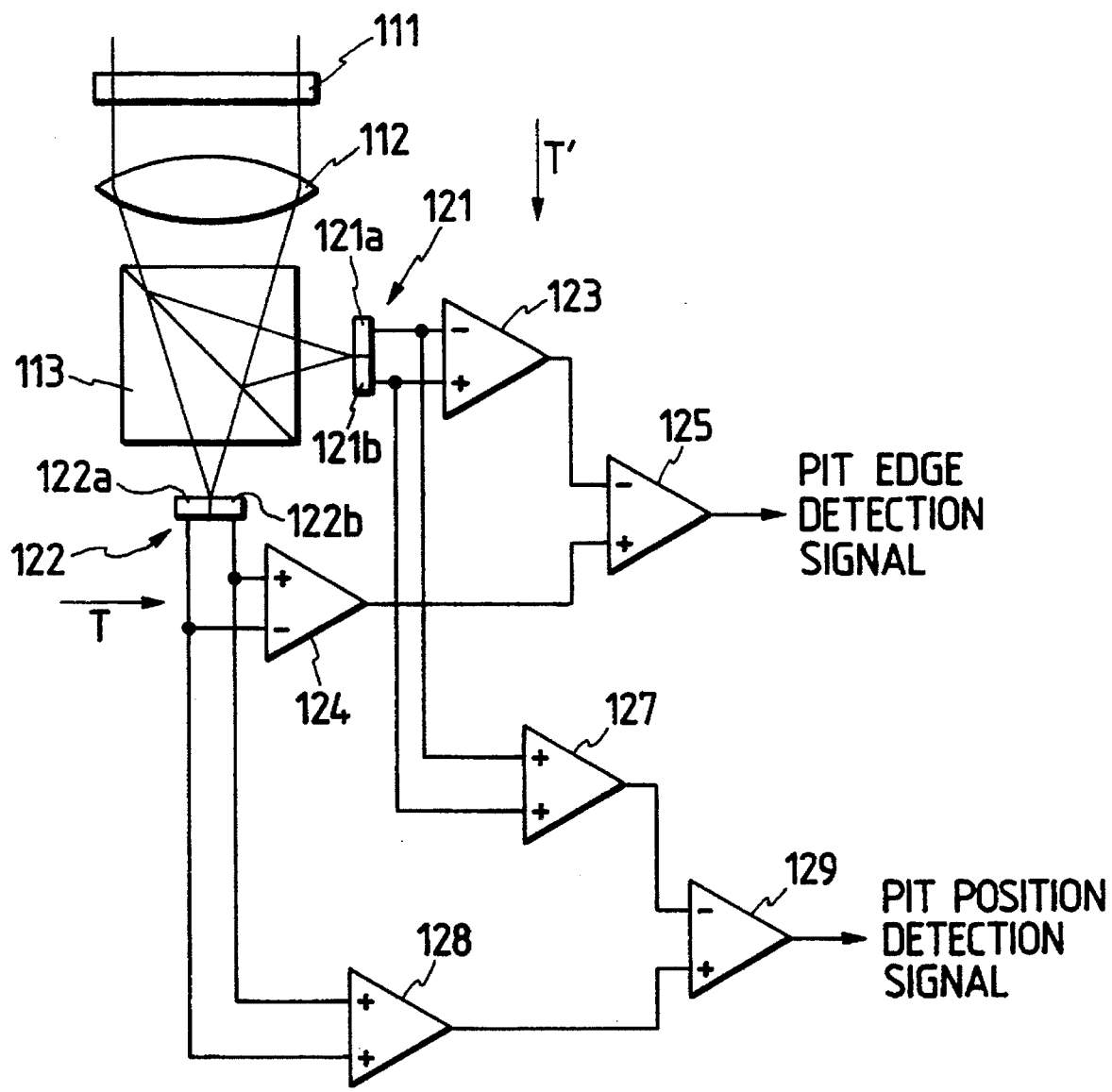
FIG. 24 is a diagram showing another reproduction optical system.

Japanese Patent Application No. 2-279710 proposes the following method. That is, paying attention to the fact that the right and left polarization states on the convergent plane represent linearly polarized light components in different directions, as has been described above with reference to (a) to (d) in FIG. 23, a two-divided photodetector, which is divided in the tracking direction, is arranged near the convergent plane, and a pit edge signal and a pit position signal are detected based on a difference or sum signal of detection signals from the photodetector. This method will be described in detail below with reference to FIGS. 24 to 26B. FIG. 24 shows a reproduction optical system in an optical head. Referring to FIG. 24, the halfwave plate 111, the condenser lens 112, and the polarization beam splitter 113 are the same as those shown in FIG. 21. Each of two-divided photodetectors 121 and 122 is divided into two detection pieces along a division line extending in a direction perpendicular to the tracking direction (T or T' direction) of an information recording medium. Detection signals from detection pieces 121a and 121b of the two-divided photodetector 121 are differentially detected by a differential amplifier 123, and detection signals from detection pieces 122a and 122b of the other two-divided photodetector 122 are differentially detected by a differential amplifier 124. The differentially detected signals are further differentially detected by a differential amplifier 125, thus obtaining a reproduction signal of a pit recorded by the pit edge recording method, i.e., a pit edge detection signal for detecting the edge of a pit.

Figure 25A:
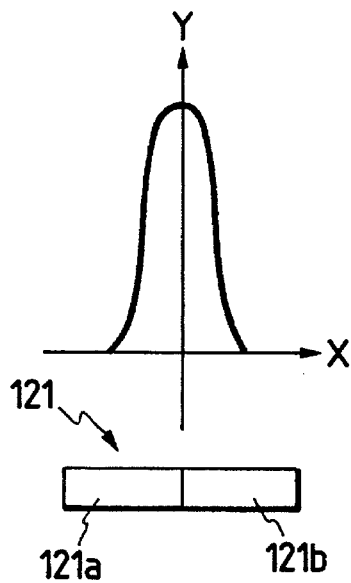
FIGS. 25A to 25F are charts for explaining the principle of information reproduction of the reproduction optical system shown in FIG. 24.
Figure 25B:
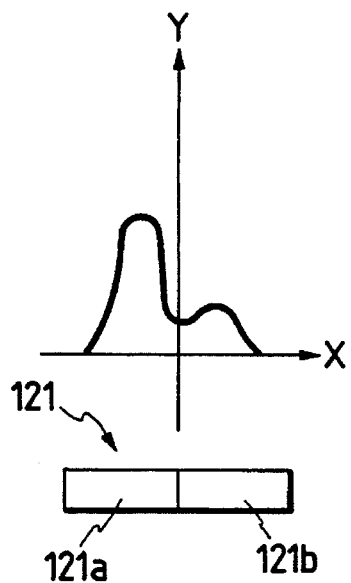
Figure 25C:
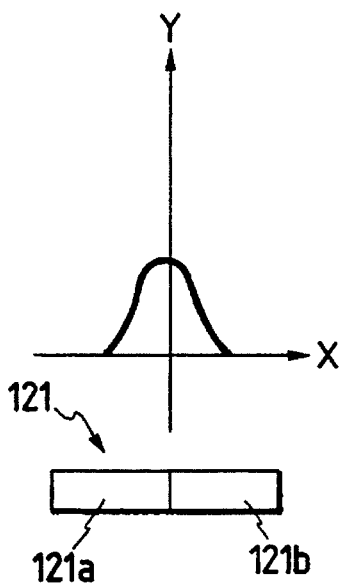
Figure 25D:
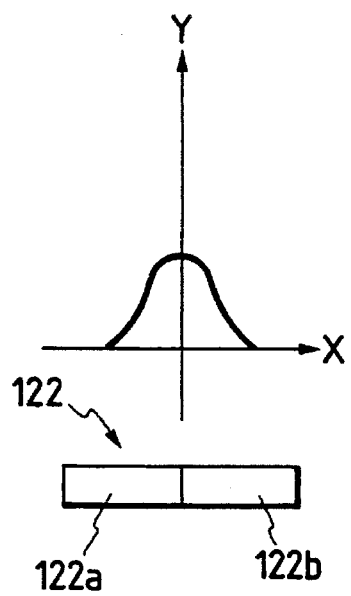

FIGS. 25A to 25F show changes in light intensity on the two-divided photodetectors 121 and 122 when the light spot moves from a downward magnetization pit to an upward magnetization pit via a boundary (edge) where the direction of magnetization is reversed. FIGS. 25A to 25C correspond to the two-divided photodetector 121, and FIGS. 25D to 25F correspond to the two-divided photodetector 122. In each of FIGS. 25A to 25F, the X axis represents the position on the two-divided photodetector illustrated therebelow, and the Y axis represents the magnitude of the light intensity. The Y axis is on the division line of each two-divided photodetector. When the light spot is present on the downward magnetization pit, the intensity distributions on the two-divided photodetectors are as shown in FIGS. 25A and 25D. These distributions are symmetrical about the Y axis, and the intensity peaks are present on the Y axis. The magnitude of the peak of the photodetector 121 shown in FIG. 25A is larger than that of the photodetector 122. In this case, the detection signals obtained by the detection pieces 121a and 121b and the detection pieces 122a and 122b of the two-divided photodetectors 121 and 122 are respectively equal to each other, and differentially detected signals from the differential amplifiers 123 and 124 become 0. Therefore, the output signal from the differential amplifier 125 also becomes 0.

Figure 25E:
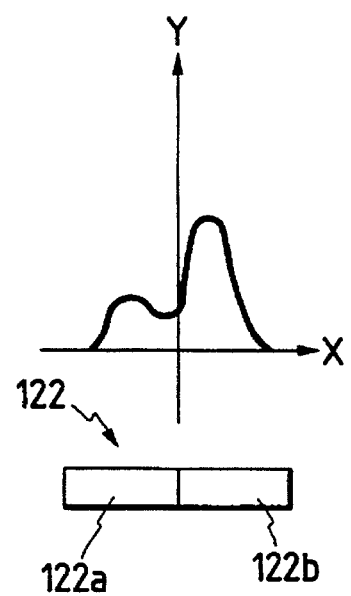
Figure 25F:
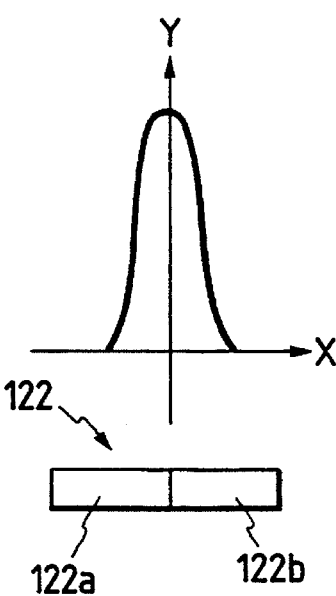

Conversely, when the light spot is located on the upward magnetization pit, the light intensity distributions on the two-divided photodetectors 121 and 122 are as shown in FIGS. 25C and 25F, which are respectively opposite to the states shown in FIGS. 25A and 25D. In this case, since the detection signals from the detection pieces 121a and 121b and the detection pieces 122a and 122b of the two-divided photodetectors 121 and 122 are respectively equal to each other, the differentially detected signals from the differential amplifiers 123 and 124 become 0, and the output signal from the differential amplifier 125 also becomes 0.

When the light spot is located at the position where the direction of magnetization is reversed from downward magnetization to upward magnetization, the light intensity distributions on the two-divided photodetectors 121 and 122 are as shown in FIGS. 25B and 25E. Each of these light intensity distributions is divided into the "+" and "−" sides of the X axis to have the Y axis as the center. In FIG. 25B, the "−" side peak is larger than the "+" side peak, and in FIG. 25E, the "+" side peak is larger than the "−" side peak. Therefore, when the differential amplifier 123 differentially detects the signals from the two detection pieces 121a and 121b of the two-divided photodetector 121, a negative signal is obtained, and when the differential amplifier 124 differentially detects the signals from the two detection pieces 122a and 122b of the two-divided photodetector 122, a positive signal is obtained. Furthermore, when these positive and negative signals are differentially detected by the differential amplifier 125, a positive value signal is obtained. More specifically, when the light spot moves from downward magnetization to upward magnetization, a signal having a peak in the positive direction can be obtained at a position where the direction of magnetization is reversed, i.e., the pit edge position.

On the other hand, when the slit spot moves from upward magnetization to the downward magnetization, a signal having a peak in the negative direction can be obtained at the pit edge position where the direction of magnetization is reversed, on the contrary to the above-mentioned case. FIGS. 26A and 26B show the above-mentioned pit edge detection signal. FIG. 26A shows a pit array on an information track, in which pits indicated by hatching have upward magnetization, and the remaining portion has downward magnetization. FIG. 26B shows the pit edge detection signal obtained by the differential amplifier 125. When the light spot moves in the direction of an arrow, a signal in the positive direction is obtained at an edge position where the direction of magnetization is reversed from downward magnetization to upward magnetization; a signal in the negative direction is obtained at an edge position where the direction of magnetization is reversed from upward magnetization to downward magnetization, as described above. The edge of a pit can be detected according to the positive or negative peak position. With the above-mentioned detection method, a signal on a pit becomes 0, and a signal appears at only the edge of the pit. Therefore, the influence of a difference in transmission characteristics of an optical head and the like due to a difference in size of a pit can be eliminated. Therefore, fluctuations of DC components can also be eliminated, and the problem of the edge shift can be solved.

Referring back to FIG. 24, addition amplifiers 127 and 128 respectively add the detection signals from the detection pieces of the two-divided photodetectors 121 and 122, and a differential amplifier 129 differentially detects sum signals obtained by these addition amplifiers 127 and 128. The output signal from the differential amplifier 129 serves as a reproduction signal of a pit recorded by the pit position recording method, i.e., a pit position detection signal. The pit position detection signal obtained by this circuit has a peak at the center of a pit like in a signal obtained by the reproduction optical system shown in FIG. 21.

In the pit edge detection method described above with reference to FIGS. 24 to 26B, the problem of the edge shift can be effectively solved, and the pit edge can be precisely detected. In this method, however, since detection is performed using the two-divided photodetectors, position adjustment of the two-divided photodetectors, i.e., position adjustment with the light spot, is complicated. In the above-mentioned example, the pit edge can be precisely detected without causing any edge shift. However, when the pit position is detected, if the pit size becomes small, DC components undesirably fluctuate due to the influence of relatively deteriorated transmission characteristics of an optical head and the like.

An embodiment of the present invention to be described below has as its object to provide a magnetooptical information reproduction apparatus, which allows pit edge detection using non-divided photodetectors, and can precisely detect a pit edge without requiring any complicated optical adjustment of the photodetectors.

The embodiment of the present invention to be described below has as its another object to provide a magnetooptical information reproduction apparatus, which can eliminate fluctuations of DC components by eliminating the influence of deteriorated transmission characteristics of an optical head and the like, thereby allowing further precise detection of a pit position.

According to the present invention, in a magnetooptical information reproduction apparatus for radiating a light beam onto a magnetooptical recording medium, and reproducing recorded information based on light reflected by the medium, phase plates, which respectively correspond to leading and trailing portions of the reflected light beam, one of which is set to advance a phase of the light beam by a predetermined amount, and the other of which is set to delay the phase of the light beam by a predetermined amount, a lens for converging the light beam transmitted through the phase plates, and an analyzer are arranged in an optical path of reflected light from the recording medium, and a photodetector is arranged on a rear surface of the analyzer to detect a change in light quantity distribution of light transmitted through the analyzer, thereby detecting an edge of an information pit recorded on the recording medium.

According to the present invention, in a magnetooptical information reproduction apparatus for radiating a light beam onto a magnetooptical recording medium, and reproducing recorded information based on light reflected by the medium, phase plates, which respectively correspond to leading and trailing portions of the reflected light beam, and phase characteristics of which are set so that one of the phase plates advances a phase of the light beam by a predetermined amount, and the other phase plate delays the phase of the light beam by a predetermined amount, a lens for converging the light beam transmitted through the phase plates, and an analyzer are arranged in an optical path of reflected light from the recording medium, and a multi-divided photodetector is arranged on a rear surface of the analyzer to detect a change in light quantity distribution of light transmitted through the analyzer, thereby detecting a position of an information pit recorded on the recording medium.

Figure 27:
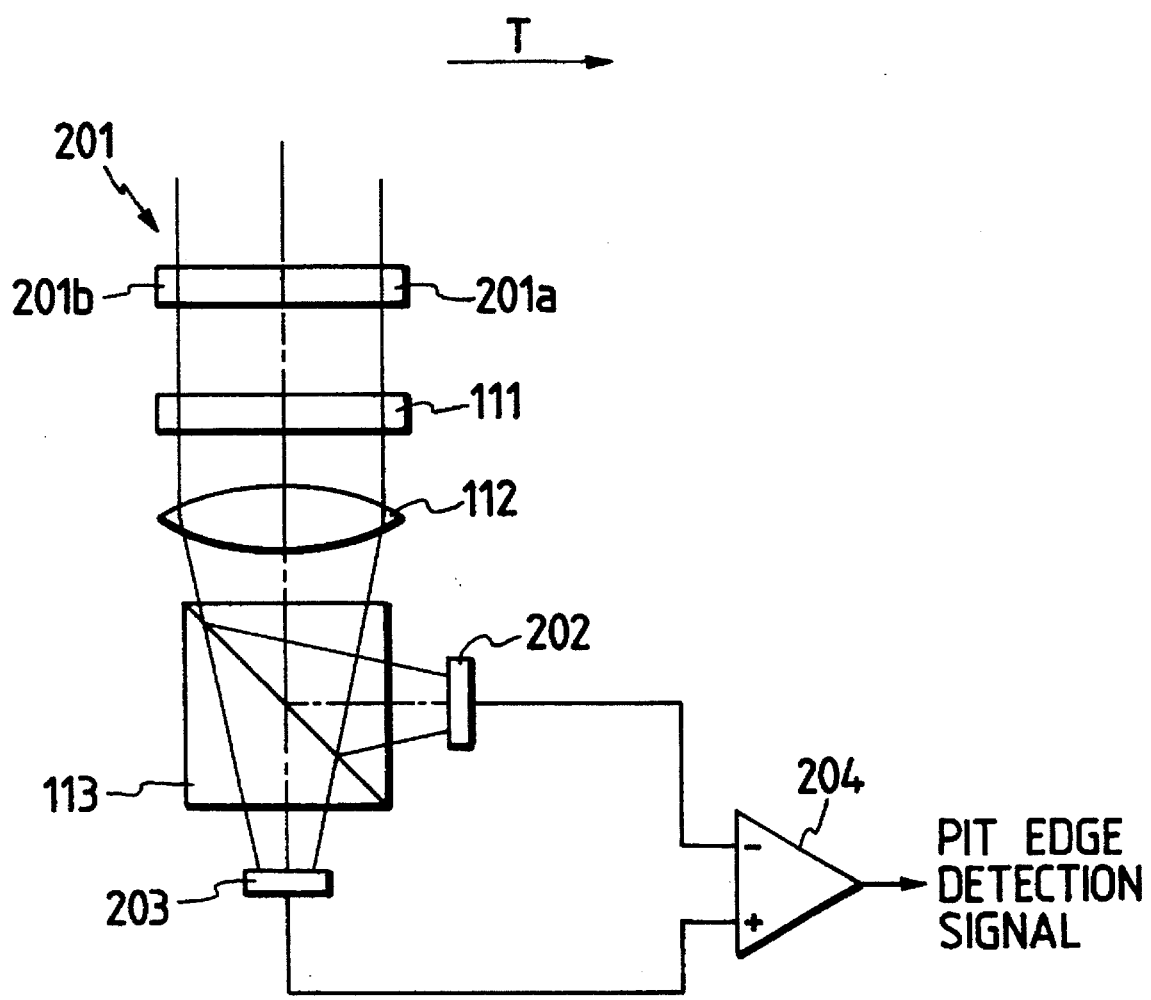
FIG. 27 is a diagram showing a magnetooptical information reproduction apparatus according to still another embodiment of the present invention.

The embodiment of the present invention will be described in detail below with reference to the accompanying drawings. FIG. 27 is a diagram showing an embodiment of a magnetooptical information reproduction apparatus according to the present invention. Note that FIG. 27 illustrates only an arrangement of a reproduction optical system 110 as main part of the present invention. Since other arrangements are the same as those in the apparatus shown in FIG. 21, a detailed description thereof will be omitted. Referring to FIG. 27, a quarterwave plate 201 is constituted by two quarterwave plates 201a and 201b having different phase characteristics. The quarterwave plate 201 is separated in correspondence with the leading and trailing portions of a light beam reflected by an information recording medium. That is, the right quarterwave plate 201a in FIG. 27 is arranged in correspondence with the leading portion of the reflected light beam, and the left quarterwave plate 201b is arranged in correspondence with the trailing portion of the reflected light beam. The quarterwave plate 201a is arranged, so that its fast axis coincides with the direction of incident linearly polarized light, and the other quarterwave plate 201b is arranged, so that its slow axis coincides with the direction of incident linearly polarized light. Therefore, if the incident linearly polarized light is linearly polarized light in the P axis direction (p-polarized light), the phase of s-polarized light of a light beam incident on the right side in FIG. 27 is advanced by the quarterwave plate 201a by a ¼ wavelength (½ π) with respect to p-polarized light, and the phase of s-polarized light of a light beam incident on the left side in FIG. 27 is delayed by the quarterwave plate 201b by the ¼ wavelength with respect to p-polarized light.

A halfwave plate 111, a condenser lens 112, and a polarization beam splitter 113 are the same as those shown in FIG. 21. The optical system 110 also includes photodetectors 202 and 203, and a differential amplifier 204. The photodetectors 202 and 203 may be arranged at a convergence position of the condenser lens 112 or at a halfway position before the convergence position. In FIG. 27, other arrangements are omitted. The arrangements shown in FIG. 21 can be used in addition to those shown in FIG. 27. Therefore, a light beam reflected by an information recording medium 106 is guided to the quarterwave plate 201 via an objective lens 105 and polarization beam splitters 104 and 109.

Figure 28:
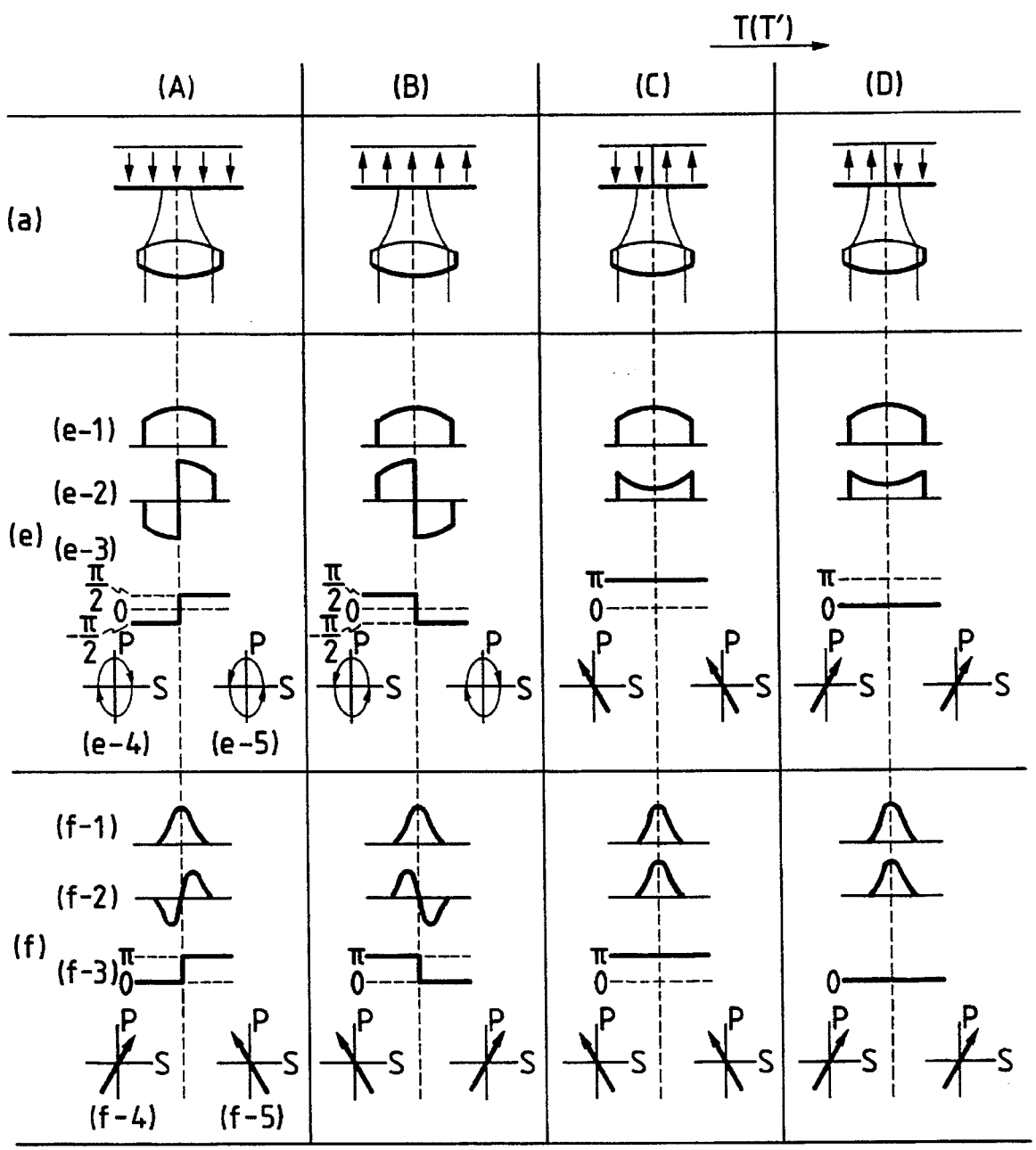
FIG. 28 is an explanation view showing the amplitude distributions, the phase distributions, and the polarization distributions of reflected light on a far field plane and a convergent plane of a condenser lens when linearly polarized light is incident on the recording medium in the embodiment shown in FIG. 27.

(a), (e) and (f) in FIG. 28 show the amplitude distributions, the phase distributions, and the polarization distributions of a reflected light beam on a far field plane and a convergent plane of a condenser lens when linearly polarized light is incident on the magnetooptical recording medium. (a) in FIG. 28 shows the magnetization states of the information recording medium and the radiation positions of a reproduction light beam focused by the objective lens in correspondence with cases (A) to (D) as in (a) in FIG. 23. In the case (A), all pits have downward magnetization, and the light spot is radiated on one of these pits. In the case (B), all pits have upward magnetization, and the light spot is radiated on one of these pits. In the case (C), left pits in (a) in FIG. 28 have downward magnetization, right pits in (a) in FIG. 28 have upward magnetization, and the light spot is radiated on the edge of a boundary pit. Furthermore, in the case (D), left pits in (a) in FIG. 28 have upward magnetization, right pits in (a) in FIG. 28 have downward magnetization, and the light spot is radiated on the edge of a boundary pit. Note that an arrow T (T') indicates the scanning direction (tracking direction) of the light spot.

(e) in FIG. 28 shows the distributions of a light beam on the far field plane in correspondence with the above-mentioned cases (A) to (D). In this embodiment, since the quarterwave plate 201 is arranged along the optical path of a light beam reflected by the information recording medium, the distributions are converted from the state shown in (c) in FIG. 23 to those shown in (e) in FIG. 28. When a downward magnetization pit in the case (A) is to be reproduced, the amplitude distribution of p-polarized light remains the same as that shown in (c) in FIG. 23, as shown in (e-1) in FIG. 28. However, the amplitude distribution of s-polarized light changes, as shown in (e-2) in FIG. 28, due to the phase advance effect of the quarterwave plate 201a and the phase delay effect of the quarterwave plate 201b. Therefore, the phase distribution of s-polarized light with reference to p-polarized light is converted, so that the left-side light beam is delayed by π/2, and the right-side light beam is advanced by π/2, as shown in (e-3) in FIG. 28. Also, the polarization state of the left-side light beam is converted from a linearly polarized state (R₊) which is rotated clockwise to a right-handed elliptically polarized state, as shown in (e-4) in FIG. 28, and the polarization state of the right-side light beam is converted from a linearly polarized state which is rotated clockwise to a left-handed elliptically polarized state, as shown in (e-5) in FIG. 28.

When an upward magnetization pit in the case (B) is to be reproduced, the amplitude distribution of p-polarized light remains the same, but the amplitude distribution of s-polarized light, and the phase distribution of s-polarized light with respect to p-polarized right are reversed to those in the case (A). Therefore, the polarization state of the left-side light beam is converted from a linearly polarized state (R_) which is rotated counterclockwise to a left-handed elliptically polarized state, and that of the right-side right beam is converted from a linearly polarized state (R_) which is rotated counterclockwise to a right-handed elliptically polarized state. When an edge between downward magnetization and upward magnetization in the case (C) is to be reproduced, the amplitude distributions of p-polarized light and s-polarized light are as shown in (e-1) and (e-2) in FIG. 28, and in the phase distribution of s-polarized light, the phases of both the right- and left-side light beams are advanced by π, as shown in (e-3) in FIG. 28. Thus, the polarization state of the left-side light beam is converted from a right-handed elliptically polarized state to a linearly polarized state (R_) which is rotated counterclockwise, and that of the right-side light beam is also converted from a left-handed elliptically polarized state to a linearly polarized state which is rotated counterclockwise. Furthermore, at an edge between upward magnetization and downward magnetization, the phase distribution of s-polarized light beam is 0. The polarization state of the left-side light beam is converted from a left-handed elliptically polarized state to a linearly polarized state (R_+) which is rotated clockwise, and that of the right-side light beam is also converted from a right-handed elliptically polarized state to a linearly polarized state which is rotated clockwise.

(f) in FIG. 28 shows the distributions of a light beam on the convergent plane of the condenser lens 112 in correspondence with the cases (A) to (D). On the convergent plane of the condenser lens 112, when a downward magnetization pit in the case (A) is to be reproduced, the amplitude distributions of p-polarized light and s-polarized light are as shown in (f-1) and (f-2) in FIG. 28, and the phase distribution of s-polarized light is as shown in (f-3) in FIG. 28. The polarization state of the left-side light beam is changed from a right-handed elliptically polarized state on the far field plane to a linearly polarized state (R_+) which is rotated clockwise, as shown in (f-4) in FIG. 28, and that of the right-side light beam is changed from a left-handed elliptically polarized state to a linearly polarized state (R_) which is rotated counterclockwise, as shown in (f-5) in FIG. 28. When an upward magnetization bit in the case (B) is to be reproduced, the amplitude distribution and the phase distribution of s-polarized light are reversed to those in the case (A). Also, the polarization state of the left-side light beam is changed to a linearly polarized state which is rotated counterclockwise, and the right-side light beam is changed to a linearly polarized state which is rotated clockwise.

On the other hand, at an edge position between downward magnetization and upward magnetization in the case (C), the amplitude distribution of p-polarized light, the amplitude distribution of s-polarized light, and the phase distribution of s-polarized light are respectively as shown in (f-1), (f-2) and (f-3) in FIG. 28. The polarization states remain the same as those on the far field plane, as shown in (f-4) and (f-5) in FIG. 28, i.e., the polarization states of both the right- and left-side light beams are linearly polarized states which are rotated counterclockwise.

Furthermore, at an edge between upward magnetization and downward magnetization in the case (D) as well, the polarization states remain the same as those on the far field plane, i.e., the polarization states of both the right- and left-side light beams are linearly polarized states which are rotated clockwise.

A light beam reflected by the information recording medium is incident on the polarization beam splitter 113 via the quarterwave plate 201, the halfwave plate 111, and the condenser lens 112, and is split into two beams, i.e., p- and s-polarized light beams according to the polarization characteristics of the beam splitter 113. The photodetectors 202 and 203 are arranged on the convergent plane of the condenser lens 112 or a halfway position before the convergent plane in correspondence with the two split light beams. When detection signals from the photodetectors 202 and 203 are differentially detected by the differential amplifier 204, a pit edge is detected. When a downward magnetization pit in the case (A) in (a) in FIG. 28 is to be reproduced, since the polarization states of the right- and left-side light beams are linearly polarization states which are respectively rotated clockwise and counterclockwise, as described above, and cancel each other, the signals from the photodetectors 202 and 203 are equal to each other. Thus, an edge detection signal differentially detected by the differential amplifier 204 becomes 0. As for an upward magnetization bit in the case (B) as well, since the right and left polarization states are similarly different from each other, the detection signals from the photodetectors 202 and 203 become equal to each other, and the edge detection signal from the differential amplifier 204 becomes 0.

On the other hand, in the case (C) in (a) in FIG. 28, since the polarization states of both the right- and left-side light beams are linearly polarized states which are rotated counterclockwise, the detection signals from the photodetectors 202 and 203 have a difference therebetween. In the case (D) as well, since the polarization states of the right- and left-side light beams are linearly polarized states which are rotated clockwise, the detection signals from the photodetectors 202 and 203 similarly have a difference therebetween. Therefore, as has been described above with reference to FIGS. 25A to 25F, when the light spot moves from downward magnetization to upward magnetization in the case (C), a positive edge detection signal can be obtained at the edge position. When the light spot moves from upward magnetization to downward magnetization in the case (D), a negative edge detection signal can be conversely obtained at the edge position. More specifically, the pit detection signal obtained by this system is the same as that obtained by the two-divided photodetector, as shown in FIGS. 26A and 26B, and a positive or negative edge detection signal can be obtained in correspondence with the leading or trailing edge of a pit.

In this manner, according to this embodiment, since the quarterwave plates having different phase characteristics are arranged in correspondence with the leading and trailing portions, in the spot scanning direction, of a reflected light beam in the optical path of the light beam reflected by the information recording medium, pit edge detection can be attained using normal non-divided photodetectors in place of the two-divided photodetectors shown in FIG. 24. Therefore, complicated position adjustment between the photodetectors and the light spot can be omitted. In addition, since the arrangement positions of the photodetectors are not limited to the convergent plane of the condenser lens, the position adjustment of the photodetectors can be greatly simplified as compared to the prior art.

Figure 29:
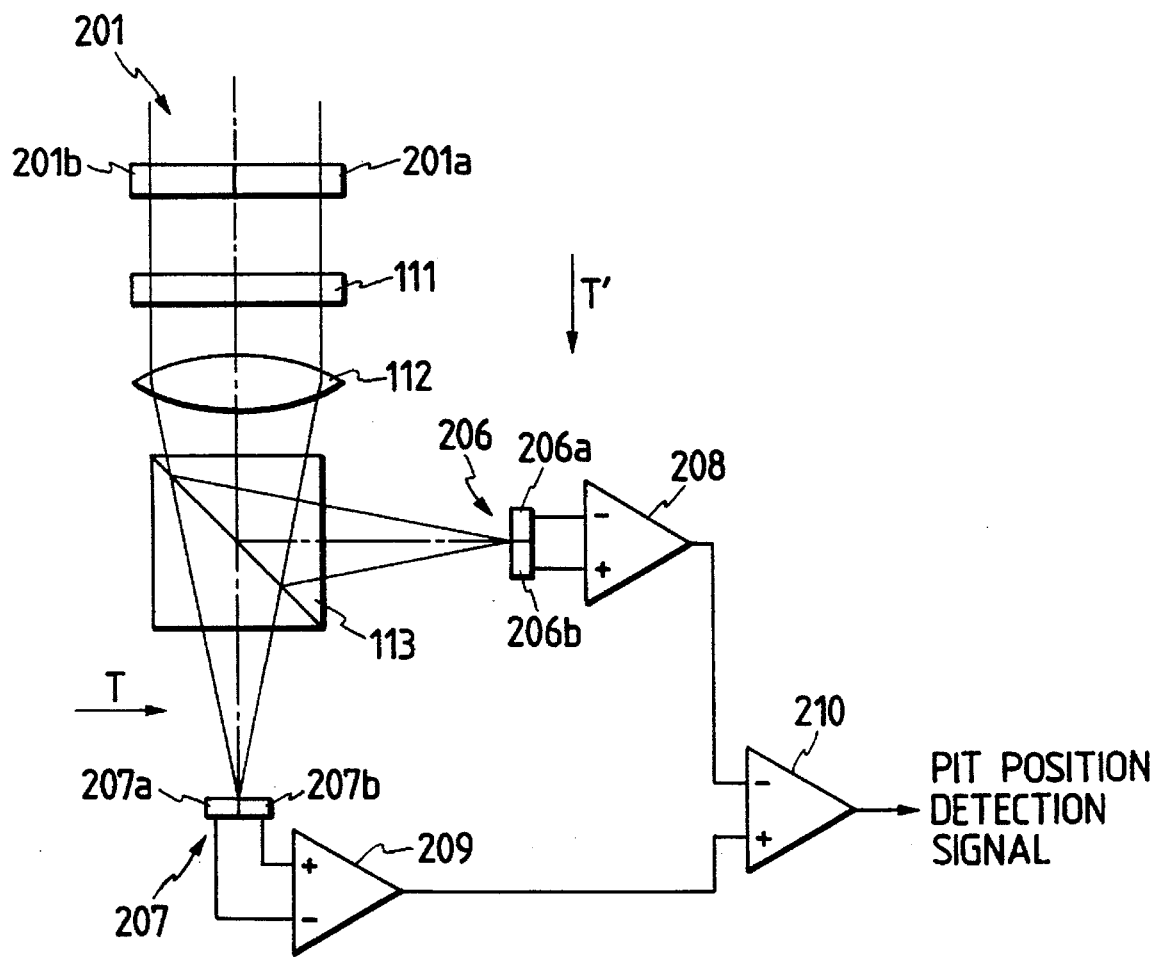
FIG. 29 is a diagram showing still another embodiment of the present invention.

FIG. 29 is a diagram showing another embodiment of the present invention. In the embodiment shown in FIG. 27, the edge of a pit recorded by the pit edge recording method is detected. However, this embodiment provides an arrangement of a reproduction optical system for detecting the pit position in the pit position recording method. Referring to FIG. 29, a quarterwave plate 201, a halfwave plate 111, a condenser lens 112, and a polarization beam splitter 113 are the same as those in the embodiment shown in FIG. 27. Since other arrangements are the same as those in the apparatus shown in FIG. 27, a detailed description thereof will be omitted. The reproduction optical system of this embodiment also includes two-divided photodetectors 206 and 207, each of which are divided into two pieces along a division line in a direction perpendicular to the tracking direction, a differential amplifier 208 for differentially detecting detection signals from detection pieces 206a and 206b of the two-divided photodetector 206, a differential amplifier 209 for differentially detecting detection signals from detection pieces 207a and 207b of the two-divided photodetector 207, and a differential amplifier 210 for further differentially detecting the differentially detected signals from the two differential amplifiers 208 and 209 to generate a pit position detection signal. The two-divided photodetectors 206 and 207 are arranged at the convergent position of the condenser lens 112.

The states of light on the detection surfaces of the two-divided photodetectors 206 and 207 will be described below. The states of light are revealed by comparing between (f) in FIG. 28 and (d) in FIG. 23. More specifically, the case (A) in (f) in FIG. 28 has the same state as that in the case (C) in (d) in FIG. 23. Similarly, the case (B) in (f) in FIG. 28 has the same state as that in the case (D) in (d) in FIG. 23, the case (C) in (f) in FIG. 28 has the same state as that in the case (B) in (d) in FIG. 23, and the case (D) in (f) in FIG. 28 has the same state as that in the case (A) in (d) in FIG. 23. More specifically, in the cases (C) and (D) in (f) in FIG. 28, the light quantity distributions on the two-divided photodetectors 206 and 207 are symmetrical, and the differentially detected signals from the differential amplifiers 208 and 209 respectively become 0. Therefore, a pit position detection signal obtained by the differential amplifier 210 at the edge of a pit becomes 0. On the other hand, in the cases (A) and (B) in (f) in FIG. 28, since the light quantity distributions on the two-divided photodetectors 206 and 207 become asymmetrical, the pit position detection signal from the differential amplifier 210 becomes a positive or negative signal at the central position of the pit.

In this manner, according to this embodiment, since the position of an information pit is detected on the basis of changes in light quantity distribution on the two-divided photodetectors, fluctuations of DC components due to relatively deteriorated transmission characteristics of an optical head and the like can be eliminated. Therefore, signal processing using a predetermined slice level can be attained, and a peak shift of a reproduction signal can also be eliminated, thus allowing more precise detection of the pit position. In the embodiment shown in FIG. 29, the pit edge can also be detected by calculating the sums of the detection pieces of the two-divided photodetectors 206 and 207 as in the embodiment shown in FIG. 27.

As described above, according to the present invention, since the edge of an information pit can be detected using normal non-divided photodetectors in place of multi-divided photodetectors, position adjustment between the photodetectors and the light spot can be greatly simplified. In pit position detection as well, a pit position detection signal, which is not easily influenced by deteriorated transmission characteristics of an optical head and the like, and can eliminate fluctuations of DC components, can be obtained, and information can be reproduced more precisely.

As described above, according to the present invention, in a magnetooptical information reproduction apparatus for radiating a light beam onto a magnetooptical recording medium, and reproducing recorded information based on light reflected by the medium, phase plates, which respectively correspond to leading and trailing portions of the reflected light beam, one of which is set to advance a phase of the light beam by a predetermined amount, and the other of which is set to delay the phase of the light beam by a predetermined amount, a lens for converging the light beam transmitted through the phase plates, and an analyzer are arranged in an optical path of reflected light from the recording medium, and a photodetector is arranged on a rear surface of the analyzer to detect a change in light quantity distribution of light transmitted through the analyzer, thereby detecting an edge of an information pit recorded on the recording medium.

The quarterwave plate 201 of this embodiment comprises two quarterwave plates arranged in correspondence with the leading and trailing portions, in the tracking direction, of a reflected light beam, one quarterwave plate is arranged, so that its fast axis substantially coincides with the direction of incident linearly polarized light, and the other quarterwave plate is arranged, so that its slow axis substantially coincides with the direction of incident linearly polarized light.

The photodetector is arranged at the convergent position of the lens or a halfway position before the convergent position.

The analyzer comprises a polarization beam splitter for splitting a light beam in accordance with the directions of polarization, light beams split by the polarization beam splitter are detected by corresponding photodetectors, and the obtained detection signals are differentially detected, thereby detecting the edge of the information pit.

Also, according to the present invention, in a magnetooptical information reproduction apparatus for radiating a light beam onto a magnetooptical recording medium, and reproducing recorded information based on light reflected by the medium, phase plates, which respectively correspond to leading and trailing portions of the reflected light beam, and phase characteristics of which are set so that one of the phase plates advances a phase of the light beam by a predetermined amount, and the other phase plate delays the phase of the light beam by a predetermined amount, a lens for converging the light beam transmitted through the phase plates, and an analyzer are arranged in an optical path of reflected light from the recording medium, and a multi-divided photodetector is arranged on a rear surface of the analyzer to detect a change in light quantity distribution of light transmitted through the analyzer, thereby detecting a position of an information pit recorded on the recording medium.

The multi-divided photodetector is arranged at the convergent position of the lens.

The analyzer comprises a polarization beam splitter for splitting a light beam in accordance with the directions of polarization, two light beams split by the polarization beam splitter are detected by two-divided photodetectors, each of which are split in a direction perpendicular to a track, detection signals of two detection pieces of each of the two-divided photodetectors are differentially detected, and the obtained two differentially detected signals are further differentially detected, thereby detecting the position of the information pit.

Still another embodiment of the present invention will be described hereinafter.

An embodiment of the present invention to be described below has as its object to provide a magnetooptical information reproduction apparatus, which can make an optical system further compact since a phase plate having a birefringence is arranged in an optical path of reflected light from a recording medium to allow a photodetector to be arranged before the convergent plane of a condenser lens.

The embodiment of the present invention to be described below has as its another object to provide a magnetooptical information reproduction apparatus, which can make an optical system compact by detecting a light beam transmitted through an analyzer using a single multi-divided photodetector arranged at the convergent position of a condenser lens.

According to the present invention, in a magnetooptical information reproduction apparatus for radiating a light beam onto a magnetooptical recording medium, and reproducing recorded information based on light reflected by the medium, a lens for converging light, a phase plate having a birefringence, and an analyzer are arranged in an optical path of reflected light from the recording medium, and a multi-divided photodetector is arranged on a far field plane after light is transmitted through the phase plate on the front surface of the analyzer so as to detect a change in light quantity distribution of light transmitted through the analyzer, thereby detecting an edge of an information pit recorded on the recording medium.

Also, according to the present invention, in a magnetooptical information reproduction apparatus for radiating a light beam onto a magnetooptical recording medium, and reproducing recorded information based on light reflected by the medium, a lens for converging light and an analyzer are arranged in an optical path of reflected light from the recording medium, and a single multi-divided photodetector is arranged at the convergent position of the lens on the front surface of the analyzer so as to detect a change in light quantity distribution of light transmitted through the analyzer, thereby detecting an edge of an information pit recorded on the recording medium.

Figure 30:
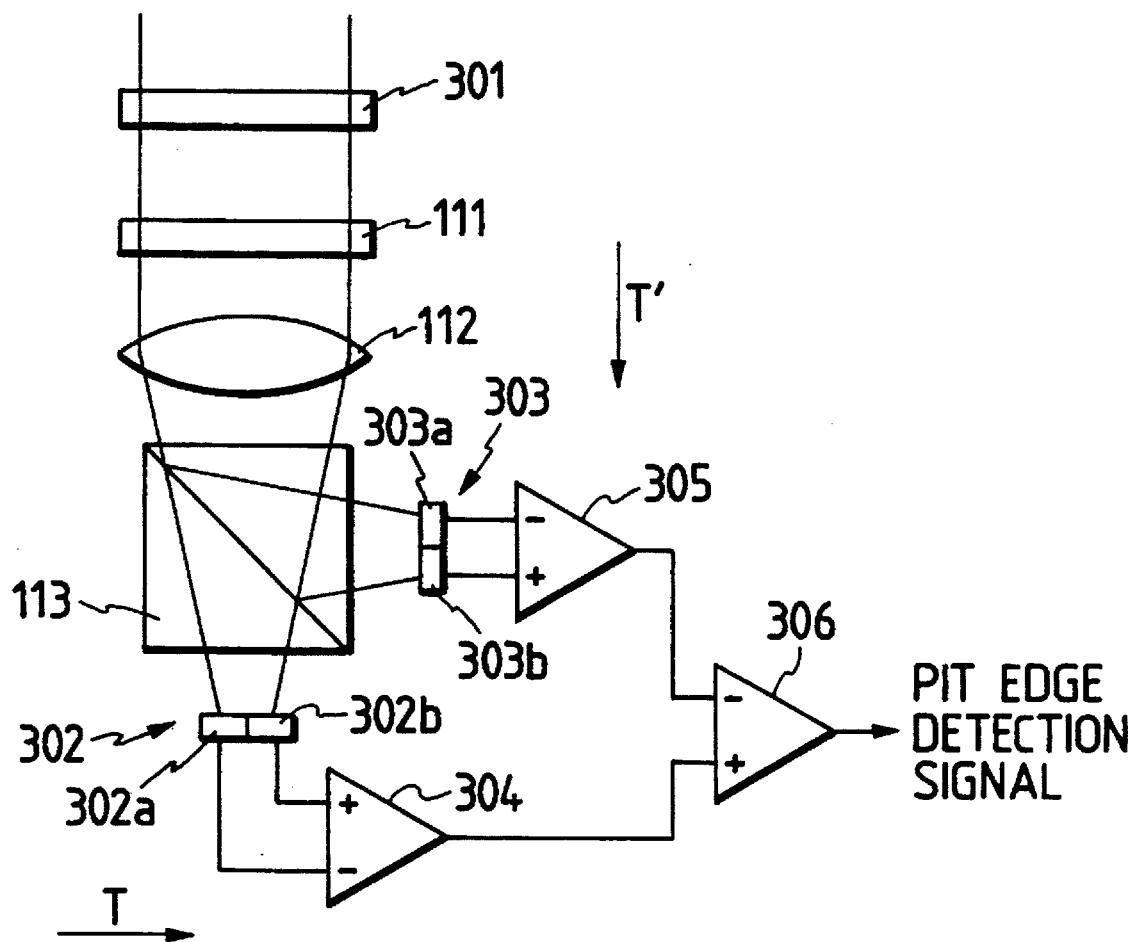
FIG. 30 is a diagram showing a magnetooptical information reproduction apparatus according to still another embodiment of the present invention.

The embodiment of the present invention will be described in detail below with reference to the accompanying drawings. FIG. 30 is a diagram showing an embodiment of a magnetooptical information reproduction apparatus according to the present invention. Note that FIG. 30 illustrates only an arrangement of a reproduction optical system as main part of the present invention. Since other arrangements are the same as those in the apparatus shown in FIG. 21, a detailed description thereof will be omitted. Referring to FIG. 30, a quarterwave plate 301 having a birefringence is arranged in the reproduction optical system. The quarterwave plate 301 is arranged, so that its fast or slow axis coincides with the direction of incident linearly polarized light, and functions to advance or delay the phase of s-polarized light by $\pi/2$ with respect to p-polarized light. A halfwave plate 111, a condenser lens 112, and a polarization beam splitter 113 are the same as those shown in FIG. 21. The reproduction optical system also includes two-divided photodetectors 302 and 303, each of which is divided into two pieces along a division line in a direction perpendicular to the tracking direction on an information recording medium, a differential amplifier 304 for differentially detecting detection signals from detection pieces 302a and 302b of the two-divided photodetector 302, a differential amplifier 305 for differentially detecting detection signals from detection pieces 303a and 303b of the two-divided photodetector 303, and a differential amplifier 306 for further differentially detecting the differentially detected signals from the differential amplifiers 303 and 305 to generate an edge detection signal of an information pit. Although other arrangements are omitted in FIG. 30, the arrangements shown in FIG. 21 can be used in addition to the arrangement shown in FIG. 30. Therefore, a light beam reflected by an information recording medium 106 is guided to the quarterwave plate 301 via an objective lens 105 and polarization beam splitters 104 and 109. The two-divided photodetectors 302 and 303 are arranged on far field planes after light is transmitted through the quarterwave plate 301.

Figure 31:
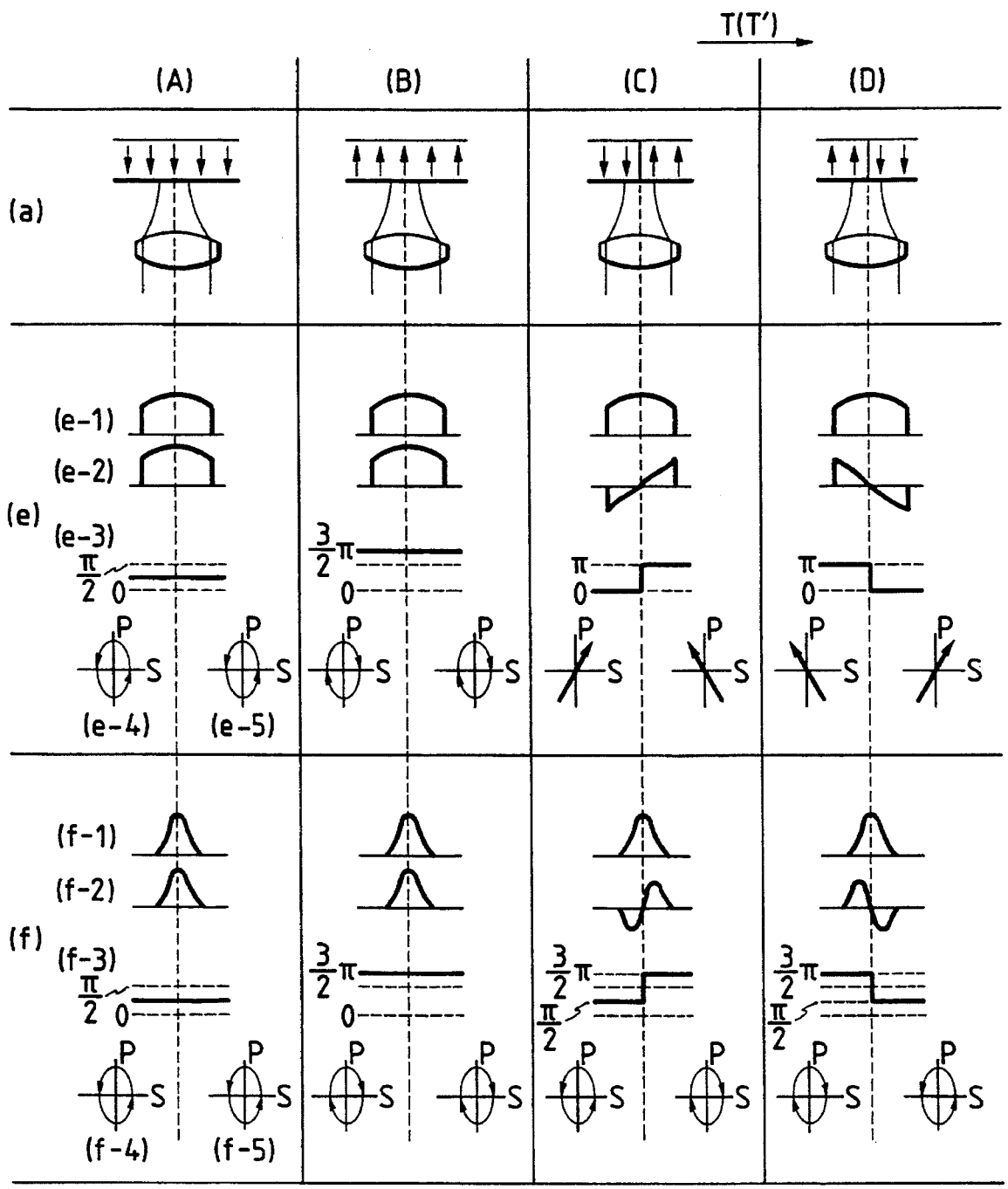
FIG. 31 is an explanation view showing the amplitude distributions, the phase distributions, and the polarization distributions of reflected light on a far field plane after the light is transmitted through a quarter-wave plate, and a convergent plane of a condenser lens when linearly polarized light is incident on a recording medium in the embodiment shown in FIG. 30.

(a), (e) and (f) in FIG. 31 show the amplitude distributions, the phase distributions, and the polarization distributions of a reflected light beam on the far field plane after light is transmitted through the quarterwave plate 301 and the convergent plane of the condenser lens 112 when linearly polarized light (p-polarized light) is incident on the information recording medium. In this case, assume that these distributions are free from the influences of the halfwave plate 111 and the polarization beam splitter 113 as an analyzer. (a) in FIG. 31 shows the magnetization states on the information recording medium, and the radiation positions of a reproduction light spot focused by the objective lens in correspondence with the four cases (A) to (D) as in (a) in FIG. 23. In the case (A), all pits have downward magnetization, and the light spot is radiated on one of these pits. In the case (B), all pits have upward magnetization, and the light spot is radiated on one of these pits. In the case (C), left pits in (a) in FIG. 30 have downward magnetization, right pits in (a) in FIG. 30 have upward magnetization, and the light spot is radiated on the edge of a boundary pit. Furthermore, in the case (D), left pits in (a) in FIG. 30 have upward magnetization, right pits in (a) in FIG. 30 have downward magnetization, and the light spot is radiated on the edge of a boundary pit. Note that an arrow T (T') indicates the scanning direction (tracking direction) of the light spot.

(e) in FIG. 31 shows the distributions of a reflected light beam on the far field plane after light is transmitted through the quarterwave plate 301 in correspondence with the cases (A) to (D). Note that the distributions at a reflected position on the recording medium and the far field plane before light is incident on the quarterwave plate 301 are as shown in (b) and (c) in FIG. 23. When a downward magnetization pit in the case (A) is to be reproduced, at the reflected position on the recording medium, the amplitude distributions of p-polarized light and s-polarized light are symmetrical about the optical axis, the polarization distributions of right- and left-side light beams are the same and are linearly polarized states, which are rotated clockwise, and the phase difference between p-polarized light and s-polarized light is 0, as shown in (b) in FIG. 23. On the far field plane before light is incident on the quarterwave plate 301, as shown in (c) in FIG. 23, the distributions of light remain the same as those at the reflected position on the recording medium. However, on the far field plane after light is transmitted through the quarterwave plate 301, since the fast or slow axis of the quarterwave plate 301 coincides with the direction of incident linearly polarized light (direction of p-polarized light), the phase of s-polarized light is advanced or delayed by $\pi/2$ with respect to the phase of p-polarized light. In this embodiment, assume that the fast axis of the quarterwave plate 301 is set to coincide with the direction of p-polarized light to advance the phase of p-polarized light by $\pi/2$. Therefore, although the amplitude distributions of p-polarized light and s-polarized light remain the same as those shown in (b) and (c) in FIG. 23, as shown in (e-1) and (e-2) in FIG. 31, the phase difference of s-polarized light from p-polarized light changes to $\pi/2$, as shown in (e-3) in FIG. 31. Since p-polarized light and s-polarized light have a phase difference of $\pi/2$, the polarization states of the right- and left-side light beams become left-handed elliptically polarized states having a major axis coinciding with the direction of p-polarized light, as shown in (e-4) and (e-5) in FIG. 31.

When an upward magnetization pit in the case (B) is to be reproduced, the amplitude distributions of p-polarized light and s-polarized light are symmetrical about the optical axis, the phase of s-polarized light is $\pi$, and the polarization states of the right- and left-side light beams are linearly polarized states which are rotated counterclockwise, at the reflected position on the recording medium and the far field plane before light is incident on the quarterwave plate 301, as shown in (b) and (c) in FIG. 23. However, on the far field plane after light is transmitted through the quarterwave plate

301, although the amplitude distributions of p-polarized light and s-polarized light remain the same, since the phase of s-polarized light is advanced by $\pi/2$, as described above, the phase of s-polarized light changes to $3\pi/2$, as shown in (e-3) in FIG. 31. At this time, the polarization states of both the right- and left-side light beams are right-handed elliptically polarized state, as shown in (e-4) and (e-5) in FIG. 31.

When an edge between downward magnetization and upward magnetization in the case (C) is to be reproduced, the amplitude distribution of p-polarized light is symmetrical about the optical axis, the amplitude distribution of s-polarized light is divided into two regions, and the phase distribution of the left region is 0, and that of the right region is $\pi$, at the reflected position on the recording medium, as shown in (b) in FIG. 23. At this time, the polarization state of the left-side light beam is a linearly polarized state which is rotated clockwise, and that of the right-side light beam is a linearly polarized state which is rotated counterclockwise. On the far field plane before light is incident on the quarterwave plate 301, although the amplitude distribution of p-polarized light is symmetrical, and the amplitude distribution of s-polarized light is left divided into two regions, the phase distribution of s-polarized light in the left region changes to $-\pi/2$, and that in the right region changes to $+\pi/2$. Thus, the polarization state of the left-side light beam is a right-handed elliptically polarized state, and that of the right-side light beam is a left-handed elliptically polarized state. Furthermore, on the far field plane after light is transmitted through the quarterwave plate 301, although the amplitude distributions of p-polarized light and s-polarized light remain the same, since the phase is advanced by $\pi/2$ by the quarterwave plate 301, the phase of the left region becomes 0, and that of the right region becomes $\pi$, as shown in (e-3) in FIG. 31. The polarization state of the left-side light beam is a linearly polarized state which is rotated clockwise, and that of the right-side light beam is a linearly polarized state which is rotated counterclockwise.

When an edge between upward magnetization and downward magnetization in the case (D) is to be reproduced, the amplitude distributions, the phase distributions, and the polarization distributions at the reflected position on the recording medium and on the far field plane before light is incident on the quarterwave plate 301 are reversed to those in the case (C). On the far field plane after light is transmitted through the quarterwave plate 301 as well, the amplitude distributions of p-polarized light and s-polarized light are reversed to those in the case (C). As for the phase distribution of s-polarized light, the phase of the left region becomes $\pi$, and that of the right region becomes 0, as shown in (e-3) in FIG. 31, contrary to the case (C). Also, the polarization state of the left-side light beam becomes a linearly polarized state which is rotated counterclockwise, and that of the right-side right beam becomes a linearly polarized state which is rotated clockwise, contrary to the case (C).

(f) in FIG. 31 shows the distributions of a light beam on the convergent plane of the condenser lens 112 in correspondence with the cases (A) to (D). When a downward magnetization pit in the case (A) is to be reproduced, the states remains the same as those in (e) in FIG. 31. That is, the amplitude distributions of p-polarized light and s-polarized light are symmetrical, as shown in (f-1) and (f-2) in FIG. 31, and the phase of s-polarized light remains $\pi/2$, as shown in (f-3) in FIG. 31. Also, the polarization states remain the same, i.e., the polarization states of both the right- and left-side light beams remain the left-handed elliptically polarized states, as shown in (f-4) and (f-5) in FIG. 31. When an upward magnetization pit in the case (B) is to be reproduced, the states remain the same as those in (e) in FIG. 31, too. That is, the amplitude distributions of p-polarized light and s-polarized light are symmetrical, the phase of s-polarized light is $3\pi/2$, and the polarization states of the right- and left-side light beams are right-handed elliptically polarized states.

At the reproduction position in the case (C), although the amplitude distribution of p-polarized light is symmetrical, and that of the s-polarized light is left divided into two regions, the phase of s-polarized light in the left region changes to $\pi/2$, and that in the right region changes to $3\pi/2$. The polarization state of the left-side light beam is changed to a left-handed elliptically polarized state, and that of the right-side light beam is changed to a right-handed elliptically polarized state.

Furthermore, at the reproduction position in the case (D), the distributions are reversed to those in the case (C). That is, although the amplitude distribution of p-polarized light is symmetrical, and that of the s-polarized light is left divided into two regions, the phase of s-polarized light in the left region changes to $3\pi/2$, and that in the right region changes to $\pi/2$. The polarization state of the left-side light beam is changed to a right-handed elliptically polarized state, and that of the right-side light beam is changed to a left-handed elliptically polarized state.

In the embodiment shown in FIG. 30, when a light beam reflected by the recording medium is transmitted through the halfwave plate 111 and the polarization beam splitter 113 as an analyzer, the difference between two linearly polarized light components $R_+$ and $R_-$ can be detected as a light quantity difference, as has been described above with reference to FIG. 22. However, the difference between two right- and left-handed elliptically polarized light components cannot be detected. More specifically, in order to detect a pit position signal indicating the position of an information pit, the photodetector must be arranged on the far field plane shown in (c) in FIG. 23 without the quarterwave plate 301, or on the convergent plane of the condenser lens 112 shown in (d) in FIG. 23. On the other hand, in order to detect a pit edge, the photodetector must be arranged on the convergent plane of the condenser lens shown in (d) in FIG. 23 without the quarterwave plate 301 or on the far field plane shown in (e) in FIG. 31 with the quarterwave plate 301. Also, in order to obtain both the pit position signal and the pit edge signal, a multi-divided photodetector can be arranged at the convergent position of the condenser lens 112, as shown in FIG. 24. Furthermore, when the pit edge signal need only be obtained, a multi-divided photodetector can be arranged on the far field plane after light is transmitted through the quarterwave plate 301, as described above.

In this embodiment, based on the above-mentioned principle, the two-divided photodetectors 302 and 303 are arranged on the far field plane after light is transmitted through the quarterwave plate 301. More specifically, since this far field plane is present before the convergent position of the condenser lens 112, the two-divided photodetectors 302 and 303 can be arranged nearer the polarization beam splitter 113 accordingly, thus rendering the reproduction optical system compact. As described above, each of the two-divided photodetectors 302 and 303 is divided along the division line in the direction perpendicular to the tracking direction, and light beams split by the polarization beam splitter 113 are detected by the corresponding two-divided photodetectors 302 and 303. The distributions of light obtained at the positions of the two-divided photodetectors are as shown in (e) in FIG. 31. At the edge position of a pit in the case of (C) or (D) in (a) in FIG. 31, since the polarization states of light- and left-side light beams become linearly polarized states which are rotated in different directions, the difference between two linearly polarized light components $R_+$ and $R_-$ can be detected as a light quantity difference. More specifically, the detection signals from the detection pieces 302a and 302b and the detection pieces 303a and 303b of the two-divided photodetectors 302 and 303 are respectively differentially detected by the differential amplifiers 304 and 305, and the obtained differentially detected signals are further differentially detected by the differential amplifier 306, thus obtaining a signal of the edge of an information pit, i.e., a pit edge detection signal having a peak in the positive or negative direction, as shown in FIGS. 26A and 26B.

In this manner, according to this embodiment, since the quarterwave plate having a birefringence is arranged in the optical path of reflected light from the recording medium, bit edge detection using the two-divided photodetectors 302 and 303 can be attained on the far field plane after light is transmitted through the quarterwave plate. Therefore, since this far field plate is present before the convergent plane of the condenser lens as the detection position in FIG. 24, the optical path length to the two-divided photodetector in the reproduction optical system can be shortened, and the reproduction optical system can be rendered compact. In the above description, a phase difference, inherent to an optical system, between p-polarized light and s-polarized light caused in each element of the optical system, and a phase difference inherent to a recording medium are ignored. These inherent phase differences can be corrected by changing the thickness of the quarterwave plate 301 in accordance with the phase differences.

Figure 32:
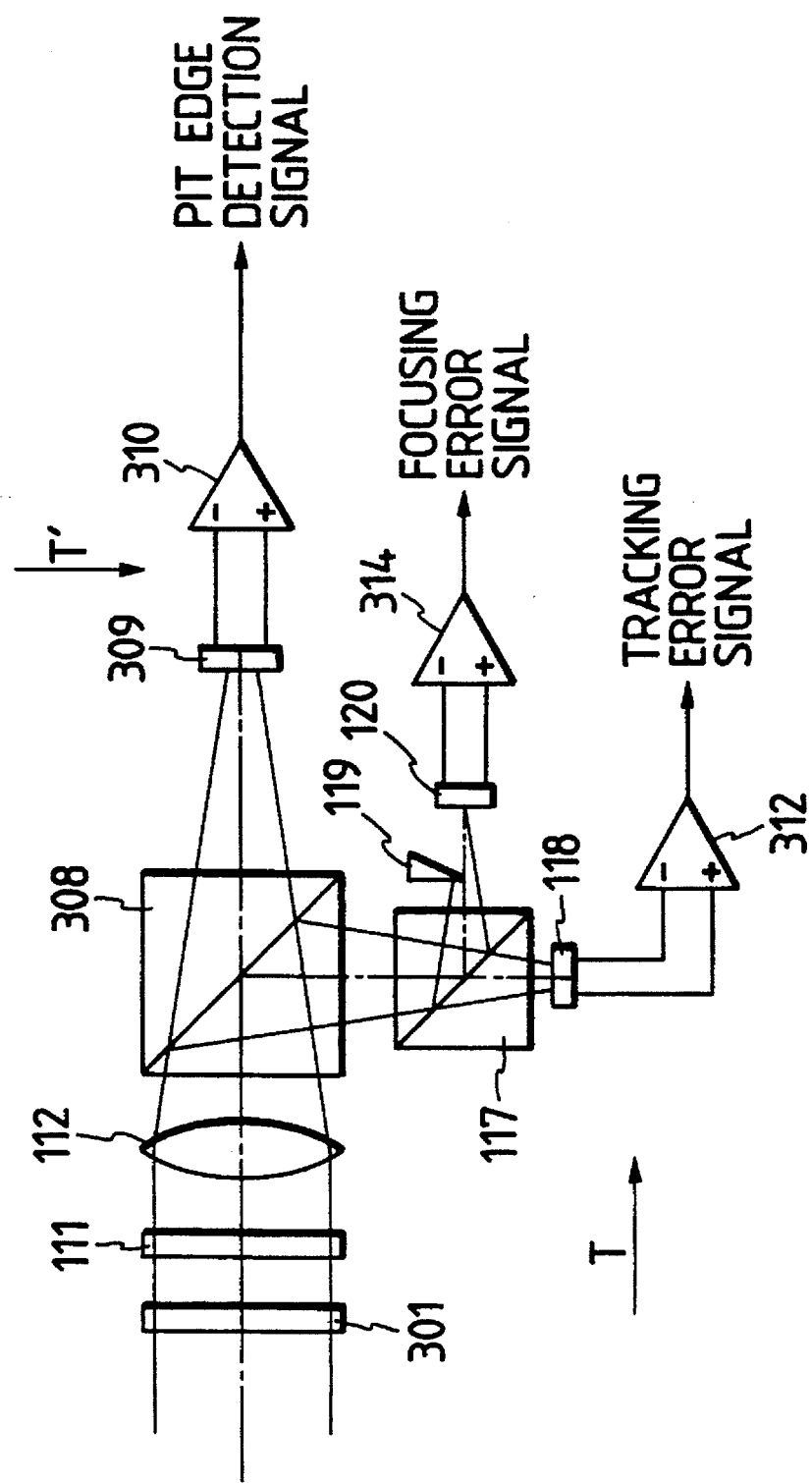
FIG. 32 is a diagram showing still another embodiment of the present invention.

Still another embodiment of the present invention will be described below. FIG. 32 is a diagram showing still another embodiment of the present invention. Referring to FIG. 32, a quarterwave plate 301, a halfwave plate 111, and a condenser lens 112 are the same as those in the embodiment shown in FIG. 30. Since other arrangements are the same as those in the apparatus shown in FIG. 30, a detailed description thereof will be omitted. It is preferable that the halfwave plate 111 is arranged obliquely in the direction of s-polarized light, so that the direction of an analyzer shown in FIG. 22 forms 45° or more with respect to a transmission light beam. An apparatus shown in FIG. 32 also includes a polarization beam splitter 308 as an analyzer, a two-divided photodetector 309, which is divided into two pieces along a division line in a direction perpendicular to the tracking direction (T'), and a differential amplifier 310. A light beam transmitted through the polarization beam splitter 308 is detected by the two-divided photodetector 309, and when detection signals of the two detection pieces of the photodetector 309 are differentially detected, a pit edge detection signal is generated.

The apparatus shown in FIG. 32 also includes a half prism 117, two-divided photodetectors 118 and 120, a knife edge 119, and differential amplifiers 312 and 314. The two-divided photodetector 118 is divided into two pieces along a division line in the tracking direction (T), and the two-divided photodetector 120 is divided into two pieces along a division line in the direction perpendicular to the tracking direction (T'). Light reflected by the polarization beam splitter 308 is split into two beams by the half prism 117, and one light beam is detected by the two-divided photodetector 120 via the knife edge 119. Detection signals from the two detection pieces of the two-divided photodetector 120 are differentially detected by the differential amplifier 314, thereby Generating a focusing error signal for auto-focusing control based on a so-called knife edge method. The other light beam split by the half prism 117 is detected by the two-divided photodetector 118, and detection signals from the two detection pieces of the two-divided photodetector 118 are differentially detected by the differential amplifier 312, thereby Generating a tracking error signal for auto-tracking control based on a push-pull method. The two-divided photodetector 309 is arranged on the far field plane after light is transmitted through the quarterwave plate 301.

In this embodiment, the two-divided photodetector 309 is arranged before the convergent position of the condenser lens 112 as in the embodiment shown in FIG. 30, and detection signals from the two detection pieces of the two-divided photodetector 309 are differentially detected by the differential amplifier 310, thereby Generating a pit edge detection signal. In this case, the pit edge is detected using only one light beam transmitted through the polarization beam splitter 308. Since the detection signals from the two detection pieces of the two-divided photodetector 309 are differentially detected by the differential amplifier 310, a noise-reduced reproduction signal can be obtained. Since the focusing error signal and the tracking error signal are generated using the other light beam reflected by the polarization beam splitter 308, the entire optical system can be made very simple and compact as compared to the conventional system.

Figure 33:
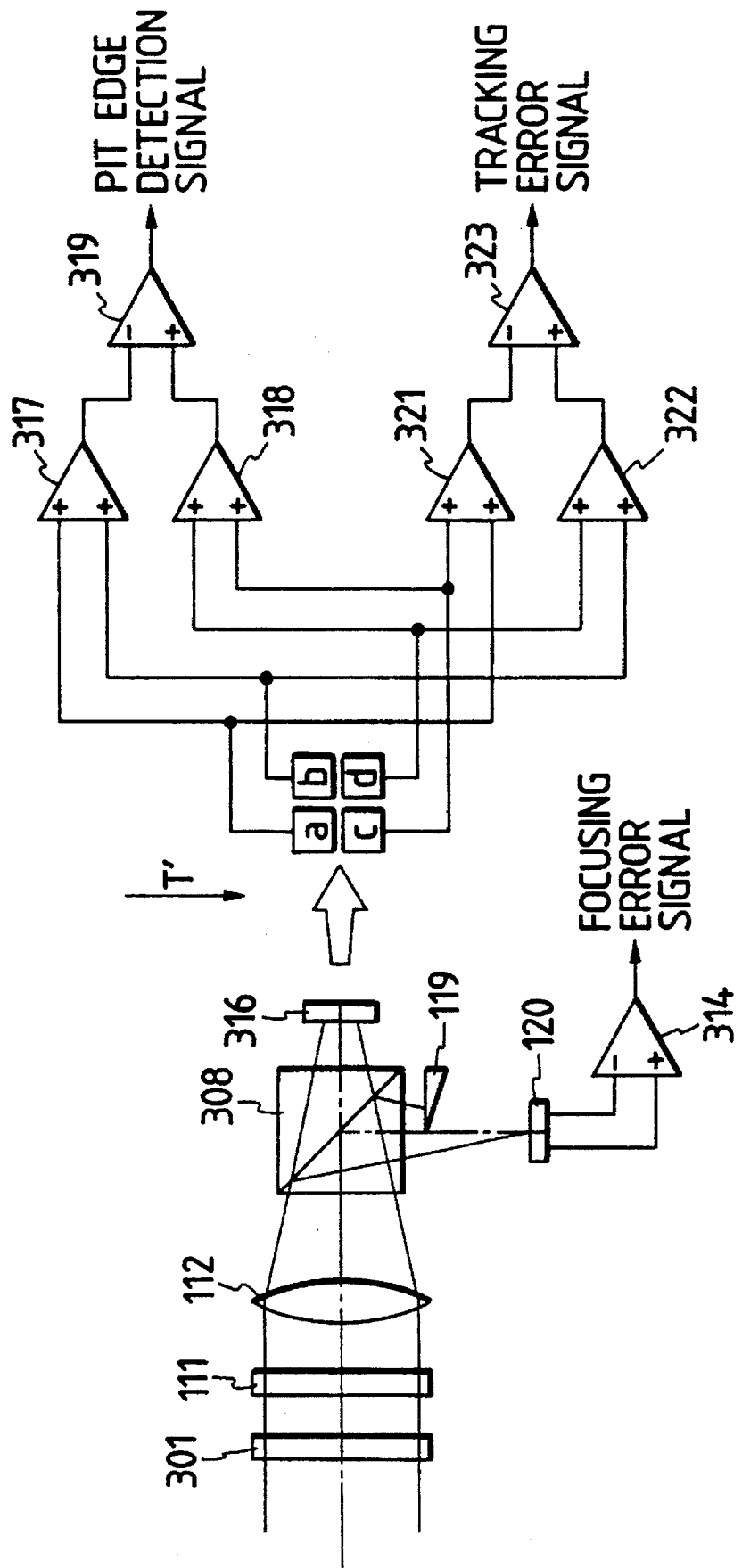
FIG. 33 is a diagram showing still another embodiment of the present invention.

FIG. 33 is a diagram showing still another embodiment of the present invention. In this embodiment, the half prism 117 shown in FIG. 32 is omitted to make the optical system further compact. Referring to FIG. 33, a four-divided photodetector 316 has a detection surface divided into four detection pieces a to d. A light beam transmitted through the polarization beam splitter 308 is detected by the four-divided photodetector 316, and a pit edge detection signal and a tracking error signal are generated based on the obtained detection signals. More specifically, detection signals from the detection pieces a and b, and the detection pieces c and d, which are adjacent in the direction perpendicular to the tracking direction (T'), of the four-divided photodetector 316 are respectively added by addition amplifiers 317 and 318, and the obtained sum signals are differentially detected by a differential amplifier 319, thus generating a pit edge detection signal. Also, detection signals from the detection pieces a and c, and the detection pieces b and d, which are adjacent in the tracking direction (T'), of the four-divided photodetector 316 are respectively added by addition amplifier 321 and 322, and the obtained sum signals are differentially detected by a differential amplifier 323, thus Generating a tracking error signal. The pit edge detection signal obtained by this apparatus is output through a high-pass filter (not shown), and the tracking error signal is output through a low-pass filter, thereby eliminating the influence of light leakage on the four-divided photodetector 316. A light beam reflected by the polarization beam splitter 308 is directly detected by the two-divided photodetector 120 via the knife edge 119, and signals from the detection pieces of the two-divided photodetector 120 are differentially detected by the differential amplifier 314 as in the embodiment shown in FIG. 32, thus generating a focusing error signal. In this embodiment, since the pit edge detection signal and the tracking error signal are detected using the four-divided photodetector, the half prism can be omitted, and the optical system can be rendered further compact.

Figure 34:
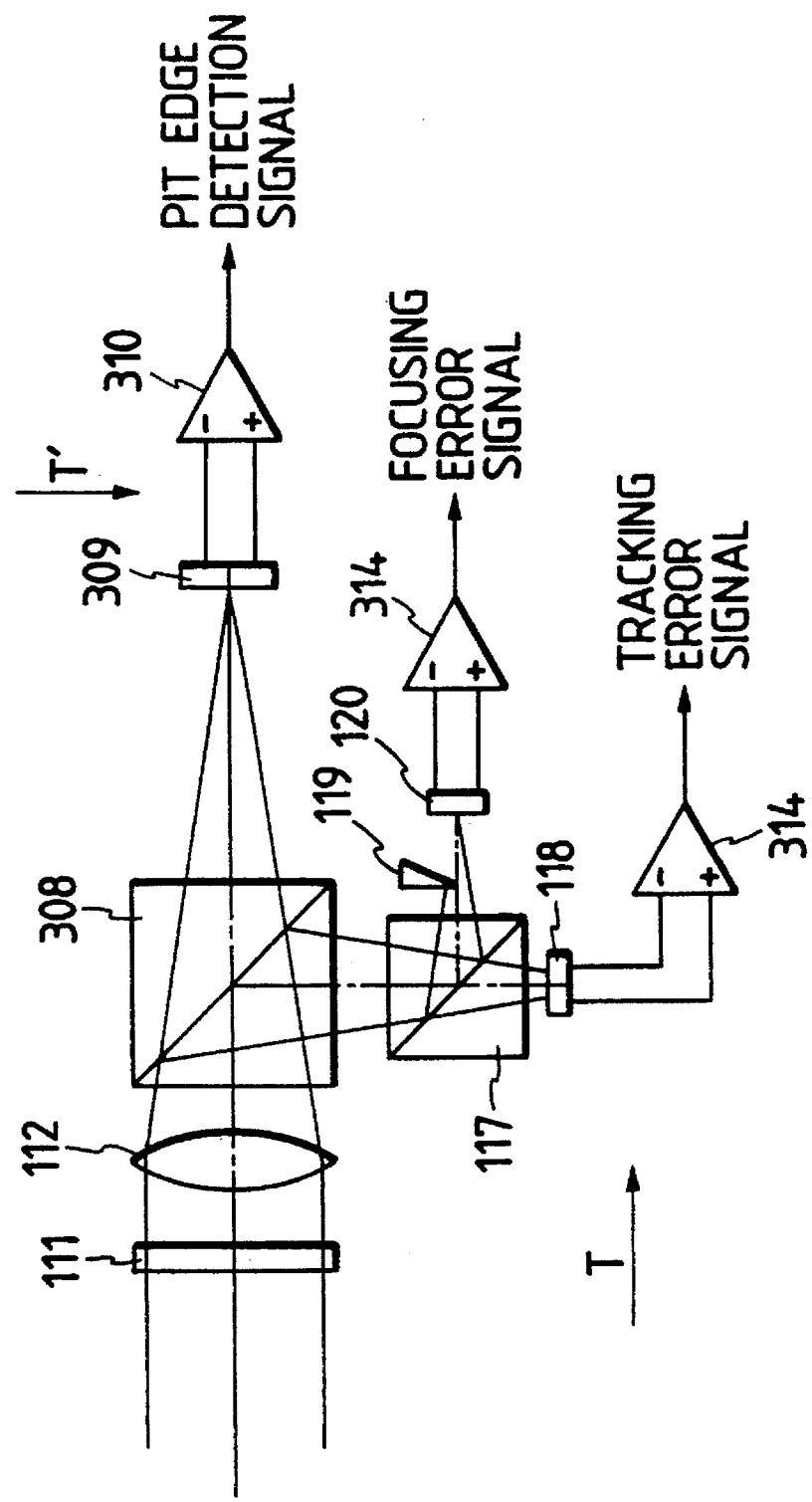
FIG. 34 is a diagram showing still another embodiment of the present invention.

FIG. 34 is a diagram showing still another embodiment of the present invention. In this embodiment, the quarterwave plate 301 arranged in the embodiment shown in FIG. 32 is omitted, and the two-divided photodetector 309 is arranged instead at the convergent position of the condenser lens 112. Since the operation of this embodiment is the same as that of the embodiment shown in FIG. 32, a detailed description thereof will be omitted.

Figure 35:
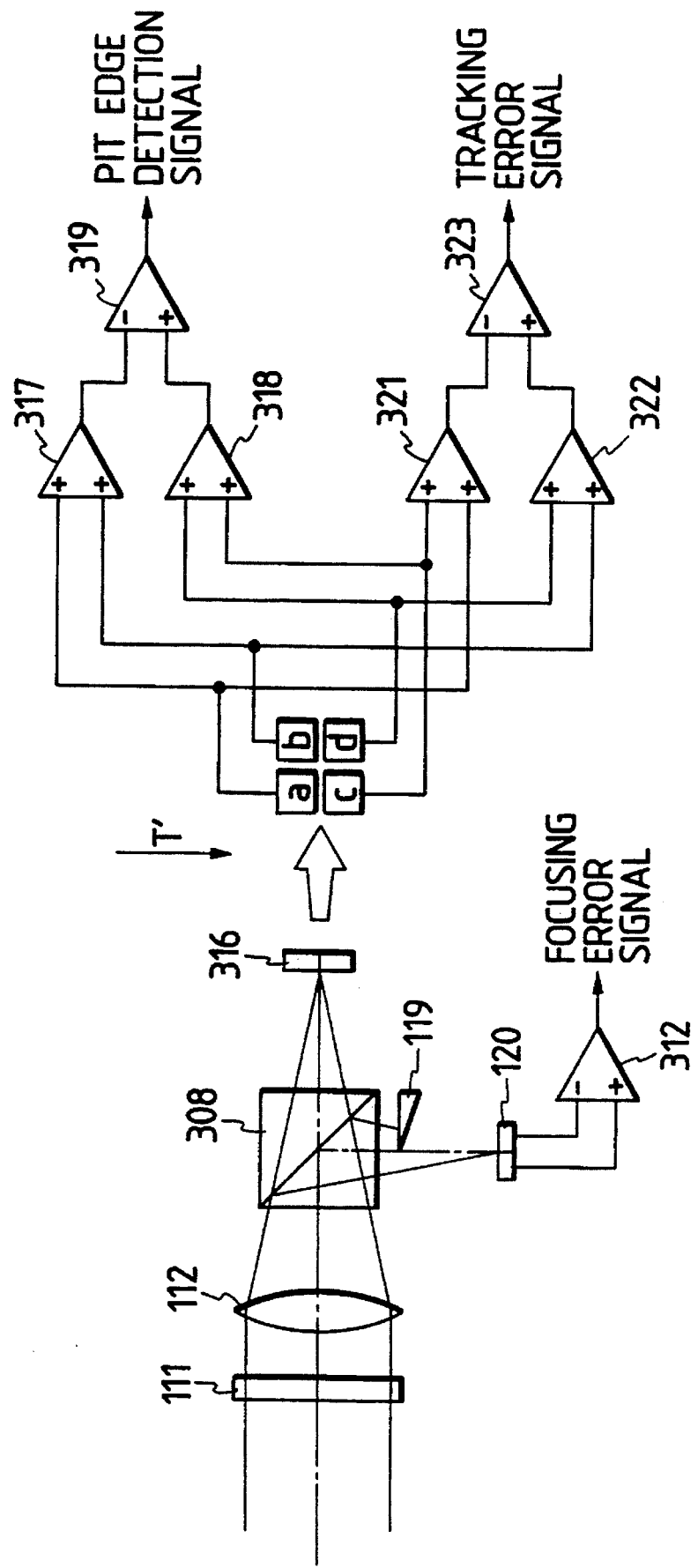
FIG. 35 is a diagram showing still another embodiment of the present invention.

FIG. 35 is a diagram showing still another embodiment of the present invention. In this embodiment, the quarterwave plate 301 in the embodiment shown in FIG. 33 is omitted, and the four-divided photodetector 316 is arranged instead at the convergent position of the condenser lens 112. The operation of this embodiment is the same as that in the embodiment shown in FIG. 33. In each of the above embodiments shown in FIGS. 34 and 35, although the two-divided photodetector 309 or the four-divided photodetector 316 is arranged on the convergent plane of the condenser lens 112, since the pit edge is detected using one light beam split by the polarization beam splitter 308, and the focusing error signal and the tracking error signal are detected using the other light beam, the optical system can be rendered simple and compact, as in the embodiments shown in FIGS. 32 and 33.

Figure 36:
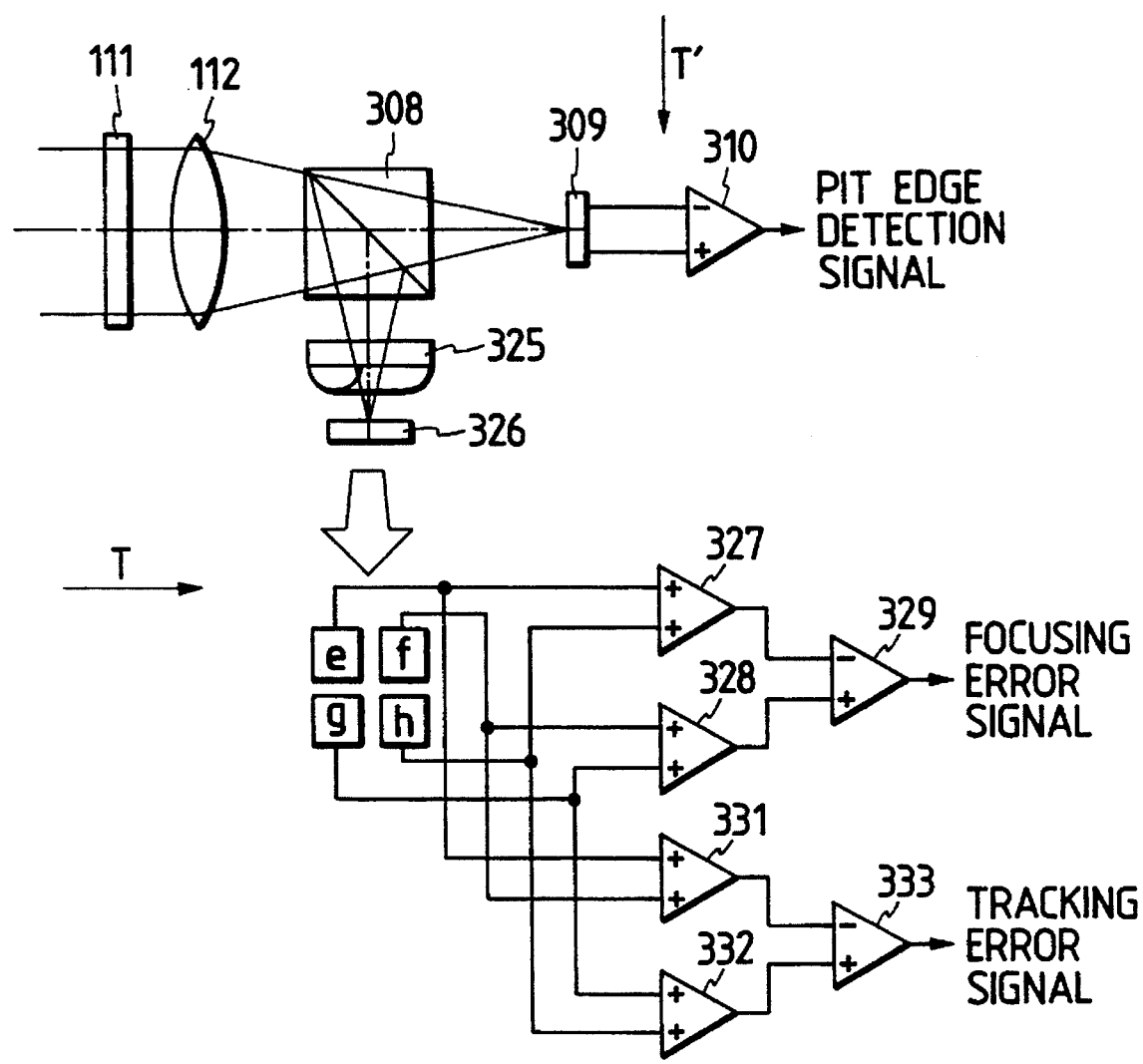
FIG. 36 is a diagram showing still another embodiment of the present invention.

FIG. 36 is a diagram showing still another embodiment of the present invention. Since the basic arrangement of the apparatus is the same as that of the apparatus shown in FIG. 21, a detailed description thereof will be omitted. In this embodiment, as a detection method in a control optical system, a push-pull method and an astigmatism method are combined. Note that no quarterwave plate 301 is used, either. Referring to FIG. 36, a cylindrical lens 325 is used for providing an astigmatism, and a four-divided photodetector 326 has a detection surface divided into four pieces e to h. The cylindrical lens 325 is arranged, so that its generator forms an inclination angle of 45° with respect to the tracking direction T, and the four-divided photodetector 326 is arranged at a position corresponding to a circle of least confusion. Light reflected by the polarization beam splitter 308 is incident on the four-divided photodetector 326 via the cylindrical lens 325, and is detected by the four detection pieces e to h. Detection signals from the detection pieces e and h, and the detection pieces f and g, which are located at the diagonal positions, are respectively added by addition amplifiers 327 and 328, and the obtained sum signals are differentially detected by a differential amplifier 329, thereby generating a focusing error signal. Detection signals from the detection pieces e and f, and the detection pieces g and h, which are adjacent in the direction perpendicular to the tracking direction (T), are respectively added by addition amplifiers 331 and 332, and the obtained sum signals are differentially detected by a differential amplifier 333, thereby generating a tracking error signal. On the other hand, light transmitted through the polarization beam splitter 308 is detected by the two-divided photodetector 309 arranged at the convergent position of the condenser lens 112 as in the embodiment shown in FIG. 34, and detection signals from the photodetector 309 are differentially detected by a differential amplifier 310, thus generating a pit edge detection signal.

Figure 37:
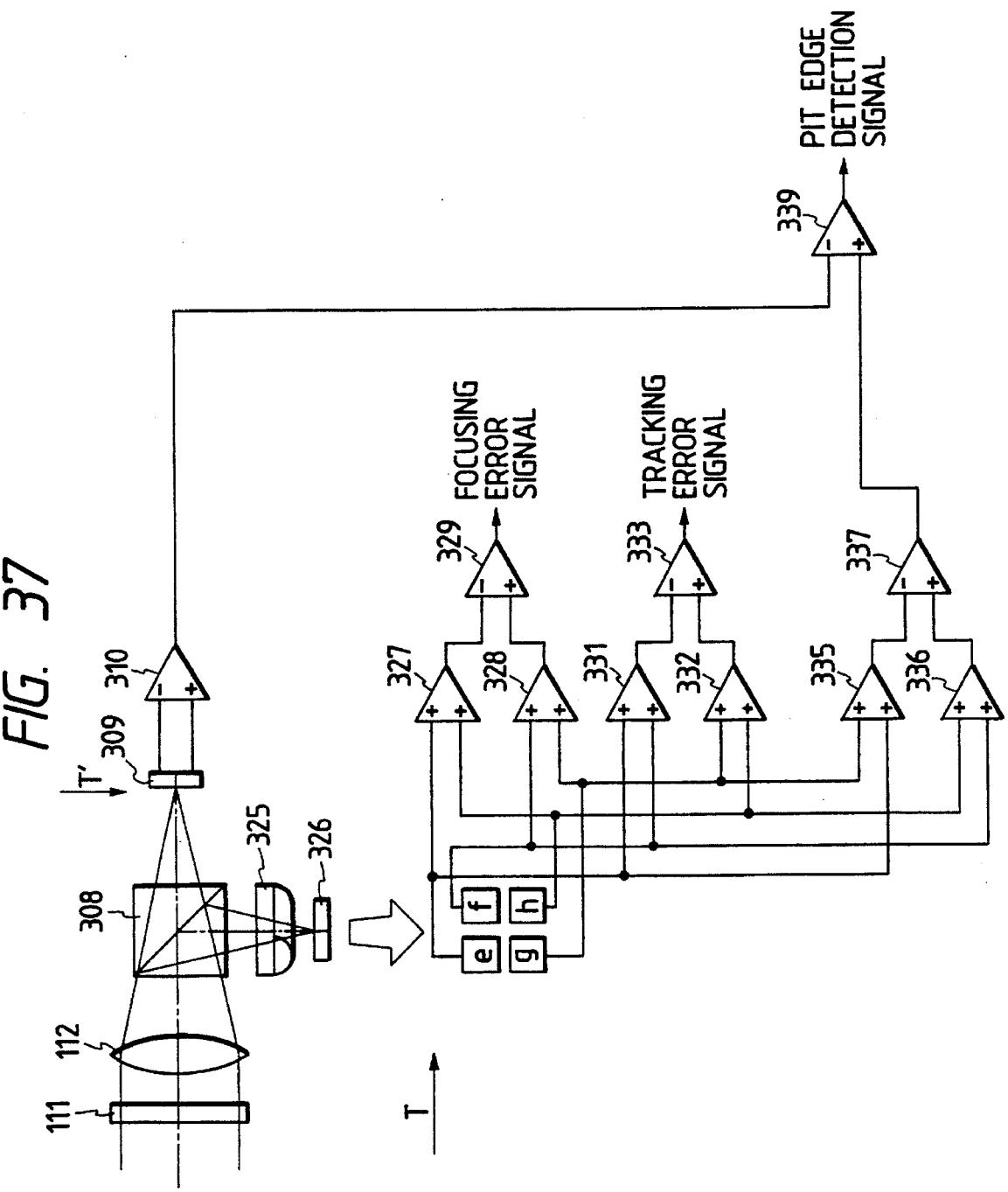
FIG. 37 is a diagram showing still another embodiment of the present invention.

FIG. 37 is a diagram showing still another embodiment of the present invention. In this embodiment, the embodiment shown in FIG. 36 is further modified to improve quality of a pit edge detection signal. More specifically, the distributions of light on the four-divided photodetector 326 are the same as those on the convergent plane of the condenser lens 112, as shown in (d) in FIG. 23, and the other two-divided photodetector 309 has similar distributions of light since it is also arranged on the convergent plane of the condenser lens 112. Thus, quality of the pit edge detection signal is improved by differentially detecting pit edge detection signals obtained based on the two light beams split by the polarization beam splitter 308. More specifically, detection signals from the detection pieces e and g, and the detection pieces f and h, which are adjacent in the direction perpendicular to the tracking direction (T), of the four-divided photodetector 326 are respectively added by addition amplifiers 335 and 336. These sum signals are differentially detected by a differential amplifier 337, and thereafter, the differentially detected signal is differentially detected with a pit edge detection signal from the other differential amplifier 310, thus generating a pit edge detection signal. Quality of the obtained pit edge detection signal is equivalent to that of the pit edge detection signal in the embodiment shown in FIG. 30. Note that, in this embodiment, the halfwave plate 111 is arranged, so that the direction of the polarization beam splitter 308 forms ±45° with respect to the direction of p-polarized light. Other arrangements are the same as those in the embodiment shown in FIG. 36. That is, the differential amplifier 329 outputs a focusing error signal, and the differential amplifier 333 outputs a tracking error signal.

Figure 38:
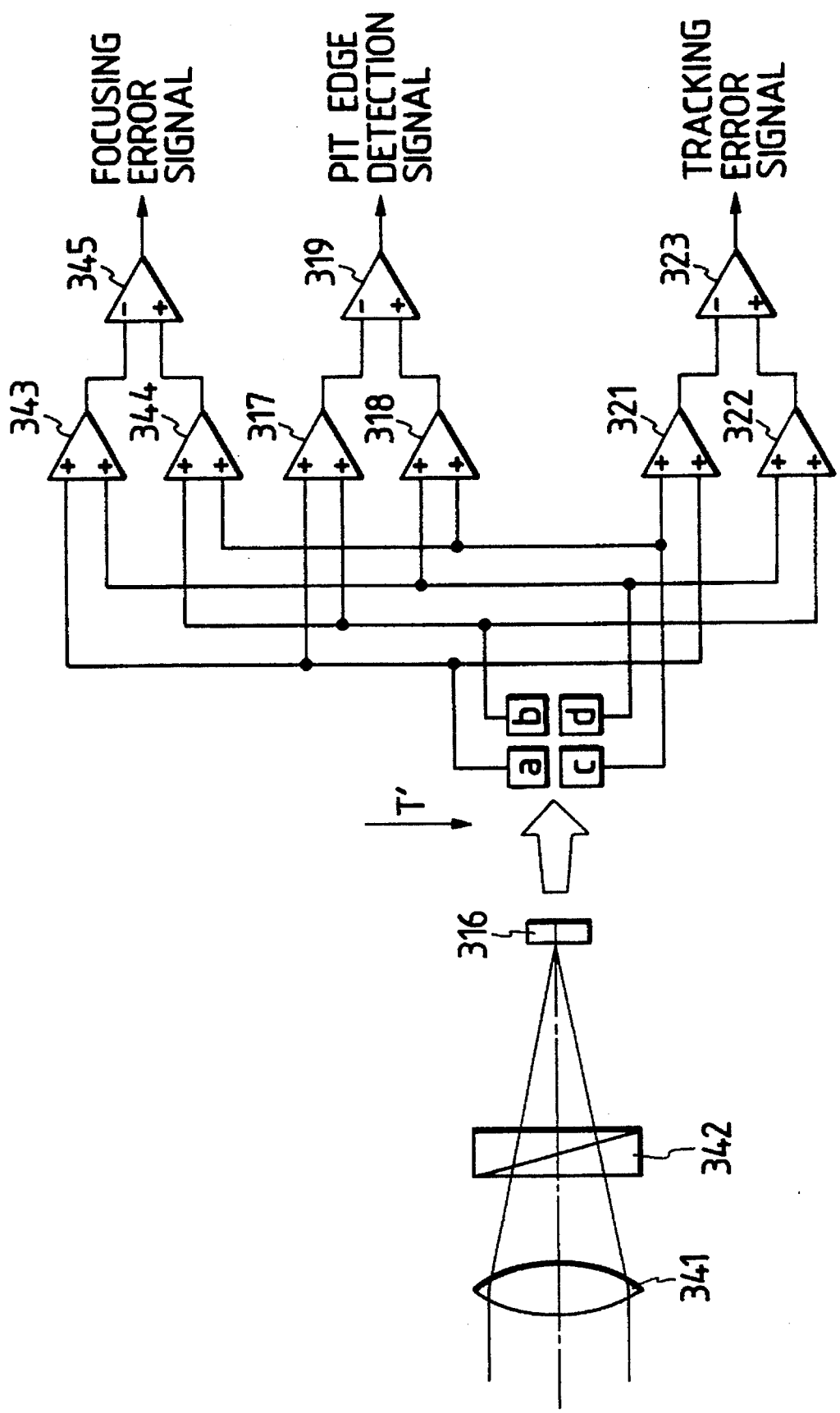
FIG. 38 is a diagram showing still another embodiment of the present invention.

FIG. 38 is a diagram showing still another embodiment of the present invention. The basic arrangement of the apparatus is the same as that of the apparatus shown in FIG. 21, and a light beam reflected by the polarization beam splitter 104 is incident on a condenser lens 341. In this embodiment, a pit edge detection signal, a focusing error signal, and a tracking error signal are generated based on detection signals from a single four-divided photodetector, thus attaining a further compact structure of an optical system. Referring to FIG. 38, an apparatus includes the condenser lens 341 having an astigmatism, an analyzer 342, and the four-divided photodetector 316 having a detection surface divided into four detection pieces a to d. The four-divided photodetector 316 is arranged at a position corresponding to a circle of least confusion, and the distributions of light on its detection surface are as shown in (d) in FIG. 23. Detection signals from the detection pieces a and d, and the detection pieces c and b, which are located at diagonal positions, of the four-divided photodetector 316 are respectively added by addition amplifiers 343 and 344. The obtained sum signals are differentially detected by a differential amplifier 345, thereby generating a focusing error signal based on an astigmatism method. A pit edge detection signal and a tracking error signal are obtained in the same manner as in the embodiment shown in FIG. 35. That is, upon execution of signal processing based on detection signals from the four-divided photodetector 316, the differential amplifiers 319 and 323 respectively output a pit edge detection signal and a tracking error signal.

Figure 39:
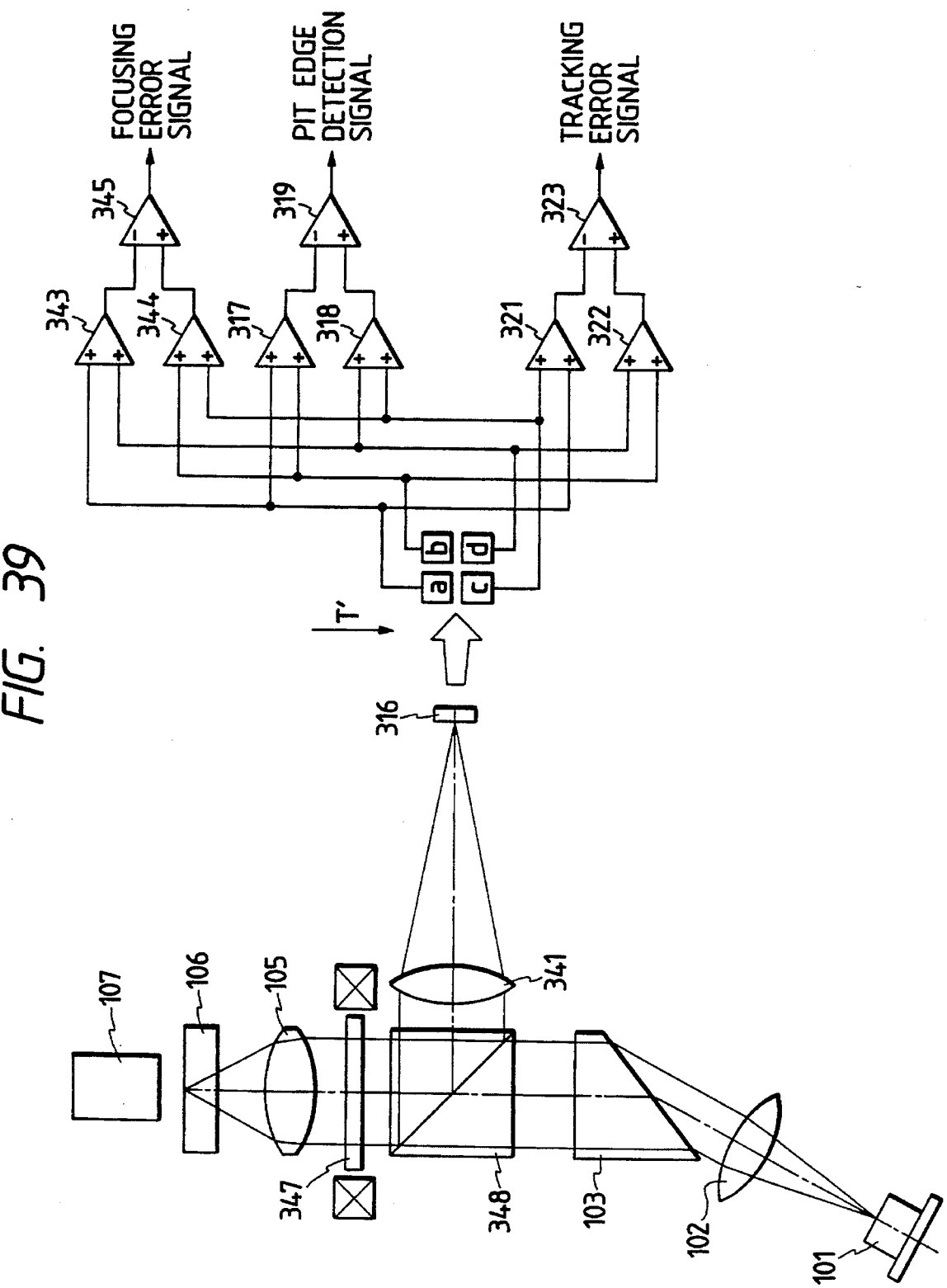
FIG. 39 is a diagram showing still another embodiment of the present invention.

FIG. 39 is a diagram showing still another embodiment of the present invention. In this embodiment, the analyzer 342 used in the embodiment shown in FIG. 38 is replaced with a combination of a Faraday element and a polarization beam splitter. Referring to FIG. 39, a Faraday element 347 is arranged to rotate the direction of polarization by a predetermined angle every time light is transmitted therethrough. A polarization beam splitter 348 has characteristics in that it transmits 60% p-polarized light, reflects 40% p-polarized light, transmits 0% s-polarized light, and reflects 100% s-polarized light. Therefore, when the above-mentioned Faraday element 347 and the polarization beam splitter 348 are combined, they can provide the same function as that of the analyzer 342, and a light beam reflected by the polarization beam splitter 348 is incident on the four-divided photodetector 316 via the condenser lens 341 having an astigmatism. Other arrangements are the same as those in the embodiment shown in FIG. 38. That is, upon execution of predetermined signal processing based on detection signals from the four-divided photodetector 316, the differential amplifiers 345, 319, and 323 respectively output a focusing error signal, a pit edge detection signal, and a tracking error signal.

Figure 40:
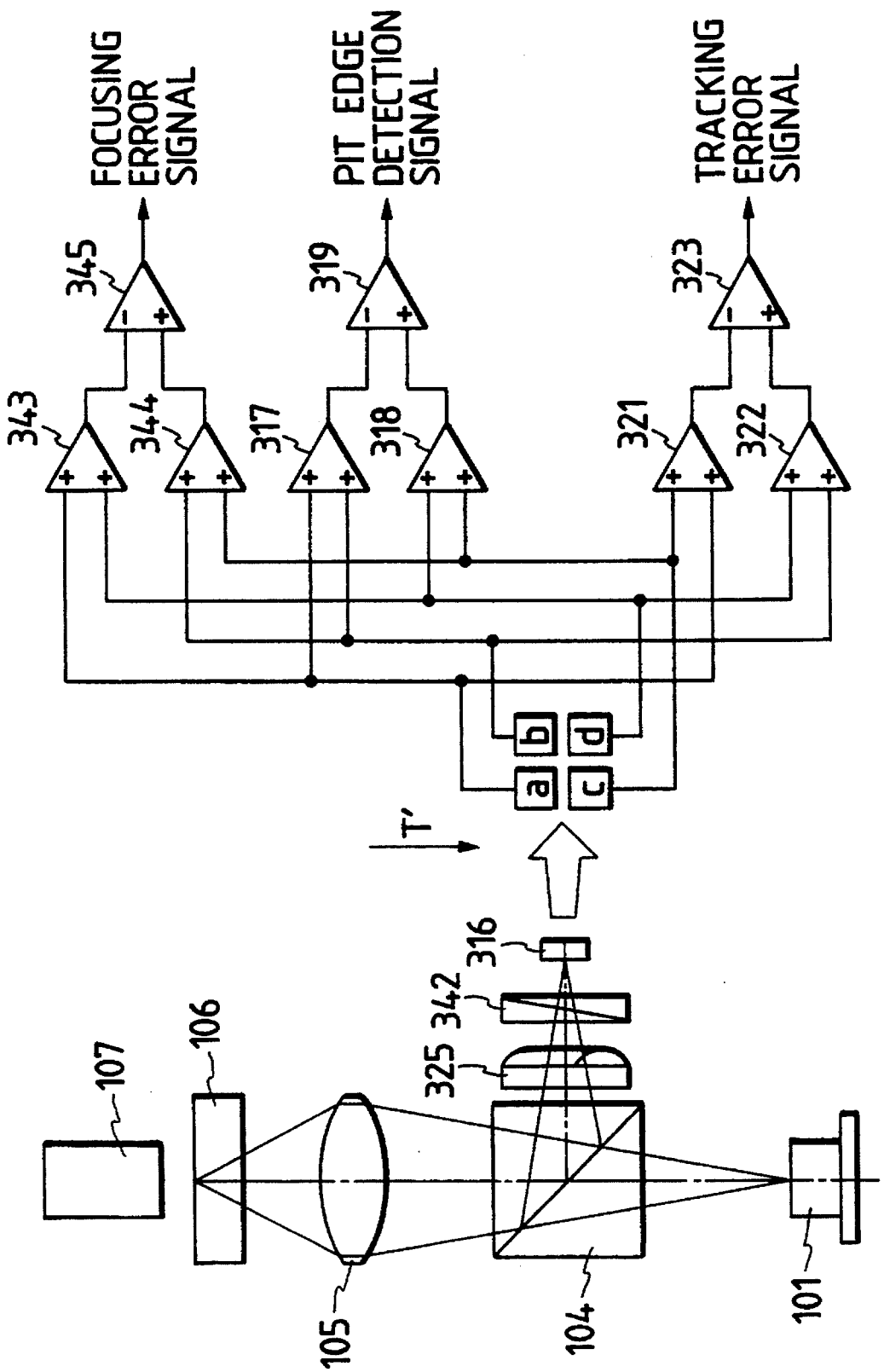
FIG. 40 is a diagram showing still another embodiment of the present invention.

In each of the above embodiments, an infinite system has been described as an optical system. In the following embodiments, a finite system will be exemplified. FIG. 40 is a diagram showing still another embodiment of the present invention, and illustrates the arrangement of the embodiment shown in FIG. 38 as a finite system. In this embodiment, the cylindrical lens 325 is arranged in place of the condenser lens 341 for providing an astigmatism. The optical system shown in FIG. 40 also includes the analyzer 342 and the four-divided photodetector 316. Detection signals from the four-divided photodetector 316 are processed by the addition amplifiers and the differential amplifier as in the embodiment shown in FIG. 38, and the differential amplifiers 345, 319, and 323 respectively output a focusing error signal, a pit edge detection signal, and a tracking error signal.

Figure 41:
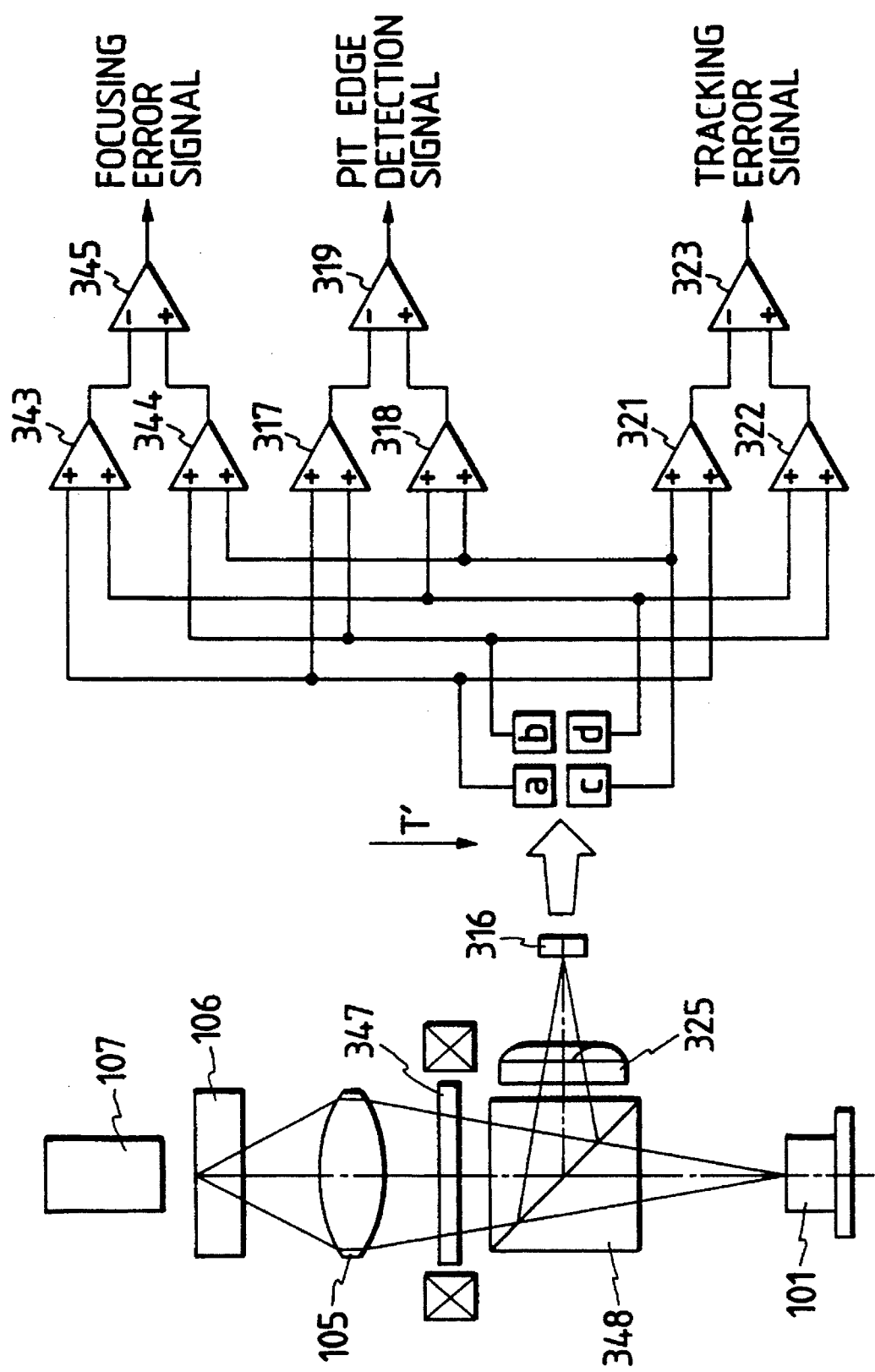
FIG. 41 is a diagram showing still another embodiment of the present invention.

FIG. 41 is a diagram showing still another embodiment of the present invention, and illustrates the arrangement of the embodiment shown in FIG. 39 as a finite system. In this embodiment as well, the cylindrical lens 325 is arranged in place of the condenser lens 341, and the combination of the Faraday element 347 and the polarization beam splitter 348 replaces the analyzer 342. The detection signals from the four-divided photodetector 316 are processed in the same manner as in the embodiment shown in FIG. 39, thereby outputting a focusing error signal, a pit edge detection signal, and a tracking error signal.

As described above, according to the present invention, since a phase plate having a birefringence is arranged on an optical path of reflected light from a magnetooptical recording medium, a multi-divided photodetector can be arranged on the far field plane after light is transmitted through the phase plate. Therefore, since the optical path length to the multi-divided photodetector can be shortened, the optical system can be rendered compact. Also, a light beam transmitted through an analyzer is detected by a single multi-divided photodetector, and the edge of an information pit is detected based on the obtained detection signals. Thus, the number of elements in the optical system can be decreased, and the optical system can be rendered compact.

As described above, according to the present invention, in a magnetooptical information reproduction apparatus for radiating a light beam onto a magnetooptical recording medium, and reproducing recorded information based on light reflected by the medium, a lens for converging light, a phase plate having a birefringence, and an analyzer are arranged in an optical path of reflected light from the recording medium, and a multi-divided photodetector is arranged on a far field plane after light is transmitted through the phase plate on the front surface of the analyzer so as to detect a change in light quantity distribution of light transmitted through the analyzer, thereby detecting an edge of an information pit recorded on the recording medium.

The phase plate comprises a quarterwave plate, which is arranged so that its fast or slow axis substantially coincides with the direction of incident linearly polarized light.

The analyzer comprises a polarization beam splitter for splitting a light beam in accordance with the directions of polarization. Two light beams split by the polarization beam splitter are detected by multi-divided photodetectors arranged on the far field plane, and the edge of the information pit is detected based on the detection signals from these photodetectors.

The analyzer comprises a polarization beam splitter for splitting a light beam in accordance with the directions of polarization. One of two beams split by the polarization beam splitter is detected by the multi-divided photodetector arranged on the far field plane, and the edge of the information pit is detected based on the obtained detection signals.

The analyzer comprises a polarization beam splitter for splitting a light beam in accordance with the directions of polarization. Two light beams split by the polarization beam splitter are detected by multi-divided photodetectors, and the edge of the information pit, and servo error signals for focusing control and tracking control are detected based on the obtained detection signals.

Also, according to the present invention, in a magnetooptical information reproduction apparatus for radiating a light beam onto a magnetooptical recording medium, and reproducing recorded information based on light reflected by the medium, a lens for converging light and an analyzer are arranged in an optical path of reflected light from the recording medium, and a single multi-divided photodetector is arranged at the convergent position of the lens on the front surface of the analyzer so as to detect a change in light quantity distribution of light transmitted through the analyzer, thereby detecting an edge of an information pit recorded on the recording medium.

The analyzer comprises a polarization beam splitter for splitting a light beam in accordance with the directions of polarization. Two light beams split by the polarization beam splitter are detected by multi-divided photodetectors, and the edge of the information pit, and servo error signals for focusing control and tracking control are detected based on the obtained detection signals.

Still another embodiment of the present invention will be described hereinafter.

An embodiment of the present invention to be described below has as its object to provide an optical detection apparatus, which can improve the degree of modulation of a detection signal in edge detection, and can improve detection reliability.

According to the present invention, in an optical detection apparatus for radiating a laser beam onto a phase object, guiding light transmitted through/reflected by the phase object to a photodetector, and detecting a characteristic of the phase object, the photodetector detects an interference intensity distribution obtained by causing a diffracted wavefront from the phase object to be wave-mixing interfered with a reference wavefront, and the apparatus has a phase compensation plate for setting a relative phase difference between a total phase obtained by superposing phase modulation caused by polarization characteristics of the phase object and spatial phase modulation by the diffracted wavefront from the phase object, and a phase of the reference wavefront to be substantially equal to an integer multiple of $\pi$ in a spatial partial region.

Figure 42:
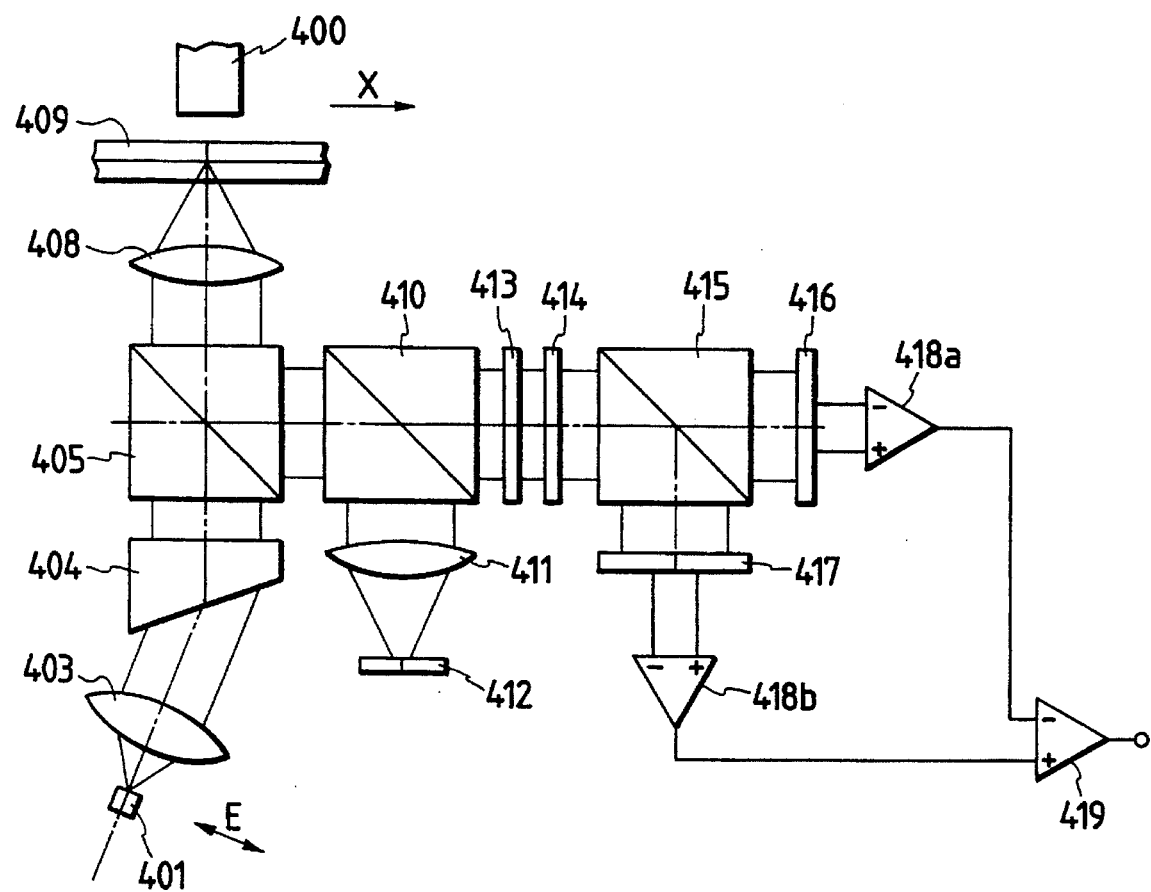
FIG. 42 is a diagram showing an optical head of a magnetooptical disk recording/reproduction apparatus to which the present invention is applied.

The embodiment of the present invention will be described below. FIG. 42 shows an arrangement of an optical head of a magnetooptical disk recording/reproduction apparatus according to the present invention. Referring to FIG. 42, the optical head comprises a semiconductor laser 401, a collimator lens 403, a beam shaping prism 404, a first polarization beam splitter 405, a pickup lens 408, a magnetooptical disk 409 which is moved in an X direction relative to the pickup lens 408, a beam splitter 410, a servo sensor lens 411 having a cylindrical surface, a four-divided servo sensor 412, a phase compensation plate 413, a halfwave plate 414, a second polarization beam splitter 415, two-divided RF sensors 416 and 417 for detecting a magnetooptical signal, and differential amplifiers 418a, 418b, and 419. The first polarization beam splitter 405 trasmits 70% of polarized light components in an E direction (p-polarized light), reflects 30% of the polarized light components in the E direction, and reflects 10% of polarized light components in a direction perpendicular to the E direction (s-polarized light). The second polarization beam splitter 415 transmits 100% of p-polarized light, and reflects 100% of s-polarized light. The division line of each of the two-divided RF sensors 416 and 417 extends in a direction perpendicular to the plane of drawing of FIG. 42, and divides information tracks on the magnetooptical disk 409 into two groups in a direction perpendicular to the extending direction.

Light from the laser 401 is converted into a parallel beam having an almost circular section by the collimator lens 403 and the beam shaping prism 404, and the parallel beam is focused on a recording surface of the magnetooptical disk 409 via the first polarization beam splitter 405 and the pickup lens 408, thus forming a diffraction limit light spot thereon. Some light components of light reflected by the magnetooptical disk 409 reach the first polarization beam splitter 405 via the pickup lens 408. The first polarization beam splitter 405 reflects 30% of p-polarized light components and 100% of s-polarized light components, thus guiding the reflected light components to a detection optical system. In the detection optical system, some light components split by the beam splitter 410 are guided to the four-divided servo sensor 412 via the servo sensor lens 411. In this optical information recording/reproduction apparatus, auto-focusing control adopts an astigmatism method, and auto-tracking control adopts a push-pull method. Note that light transmitted through the beam splitter 410 gains an optimal phase shift by the phase compensation plate 413.

When information is recorded, the light spot is continuously radiated on the information track on the magnetooptical disk 409 by the pickup lens 408, while an external magnetic field corresponding to data to be recorded is applied by a magnetic head 400.

On the recording surface of the magnetooptical disk 409, phase domains of magnetooptical domains are recorded on the information track to represent information.

Figure 43A:
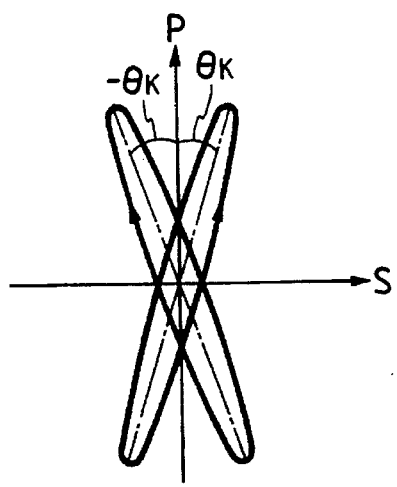
FIGS. 43A to 43E are graphs for explaining a Kerr effect.
Figure 43B:
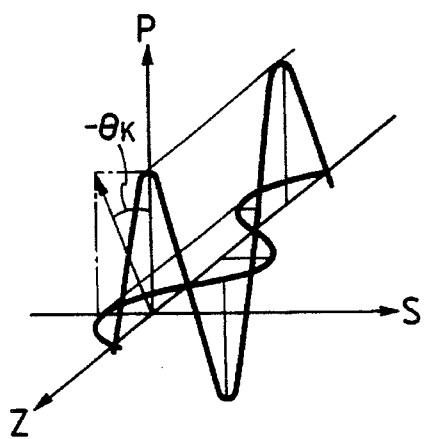
Figure 43C:
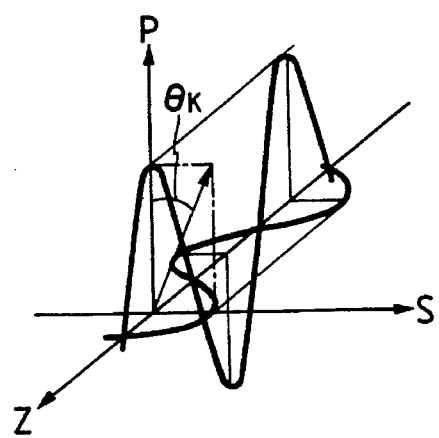
Figure 43D:
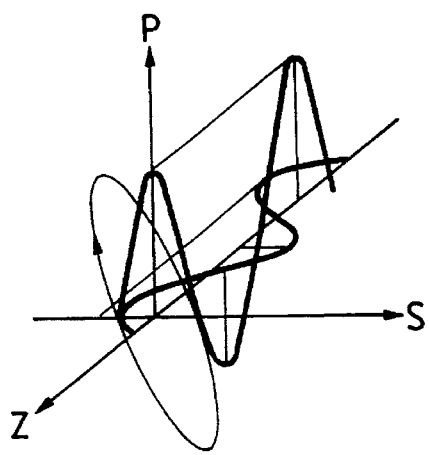
Figure 43E:
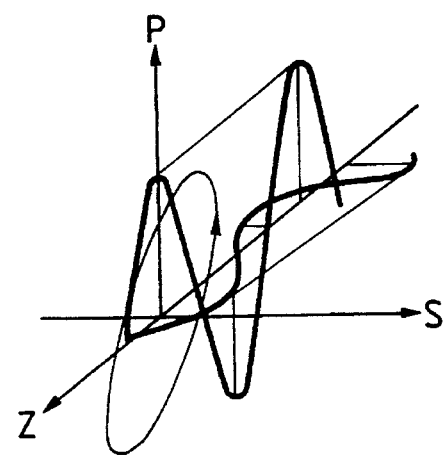

FIGS. 43A to 43E are views for explaining a change in polarized light due to magnetic domains. More specifically, FIG. 43A shows the polarization state of reflected light when p-polarized light is caused to become incident on the magnetooptical disk in FIG. 42. In FIG. 43A, a rotational angle θk (Kerr rotational angle) is reversed between positive and negative values depending on the upward or downward direction of a recorded magnetic domain. The reflected light becomes elliptically polarized light, and its direction of rotation is also reversed between clockwise and counter-clockwise directions. FIGS. 43B and 43C show the polarization states developed in a propagation direction Z in units of p- and s-polarized light components when the Kerr ellipticity of the Kerr effect is set to be 0, i.e., when only rotation of linearly polarized light is considered. FIGS. 43D and 43E show cases considering the Kerr ellipticity. As can be apparent from FIGS. 43A to 43E, the fact that rotation of polarized light is reversed between ±θk depending on the direction of a magnetic domain means that the phase of s-polarized light component is shifted by π. Therefore, if this fact is examined based on s-polarized light components alone, an array of upward and downward magnetic domains can be considered as an array of phase objects having phase differences of 0 and π. That is, the magnetic wall, i.e., the edge portion, serves as a 0/π phase edge, which is a very large phase change and a step-shaped steep change.

Figure 44:
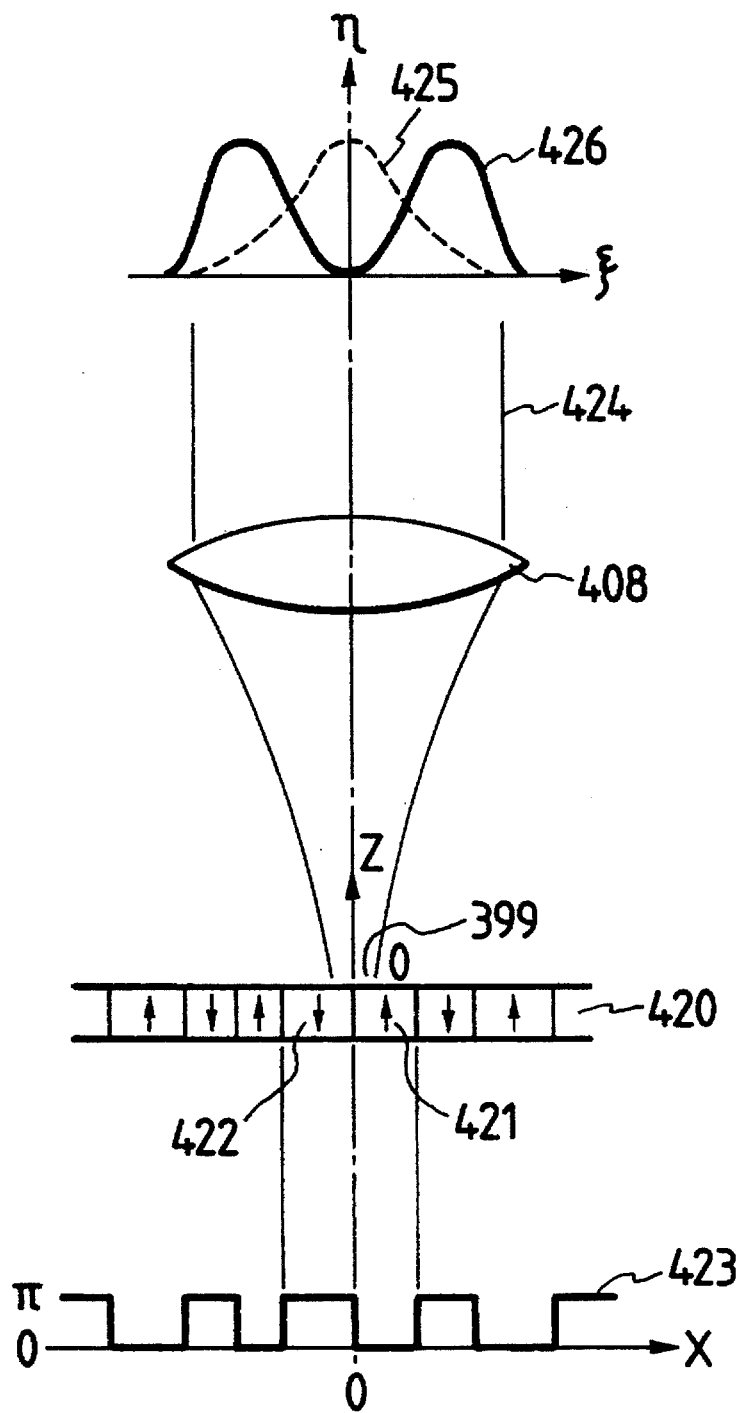
FIG. 44 is an explanatory view of diffraction from a magnetooptical domain edge.

FIG. 44 is a view for explaining phase type edges aligned on the X axis, and a diffracted wavefront from a phase type grating on a pupil plane ξ. Referring to FIG. 44, an array of an upward magnetic domain 421 and a downward magnetic domain 422 recorded in a magnetooptical film 420 can be considered as an array of small phase difference objects 423 of 0 and π if it is considered based on s-polarized light components, as described above. When a diffracted wave from this edge is observed on the pupil plane of the pickup lens 408 or a far field region 424, the light quantity distribution of the E direction in FIG. 42, i.e., the p-polarized light components, becomes a normal Gaussian distribution 425 since, in particular, objects whose amplitudes and phases are spatially modulated, are not present. On the other hand, s-polarized light components define a light quantity distribution having two peaks on the two sides of the center since they are diffracted by phase edges of 0 and π. Note that this phenomenon occurs due to diffraction as an interaction between small objects and light. For example, in the case of FIG. 44, although the light quantity distribution has two peaks, these peaks are defined not by independent light beams but by a diffraction pattern formed by wavefronts from respective points in a diffraction limit spot 399 on an interference far field. More specifically, this diffraction pattern is not formed by geometrically aligning reflected polarized light beam components from the upward magnetic domain 421 and reflected polarized light beam components from the downward magnetic domain 422, but is a single wavefront formed upon interference of wavefronts from respective points in these magnetic domains, which are present everywhere on the far field. In other words, the diffraction pattern is a result of mixing of wavefronts from the upward and downward magnetic domains, and hence, it is impossible to geometrically consider polarized light components from these magnetic domains, and to spatially separate and specify the polarized light components.

Figure 45A:
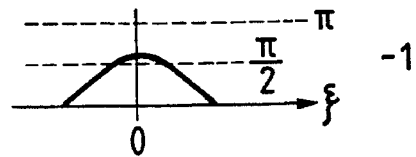
FIGS. 45A to 45G are explanatory views of diffraction patterns.
Figure 45B:
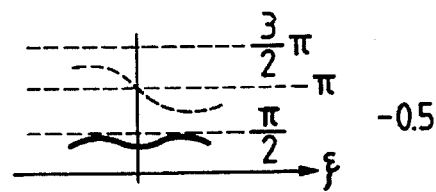
Figure 45C:
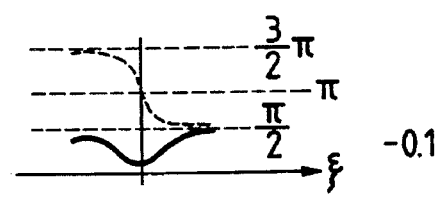
Figure 45D:
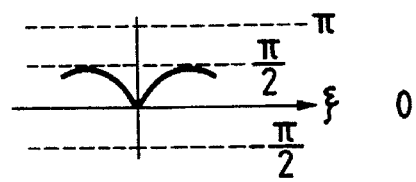
Figure 45E:
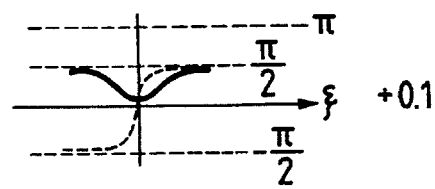
Figure 45F:
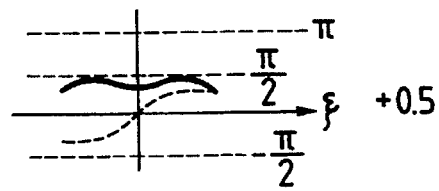
Figure 45G:
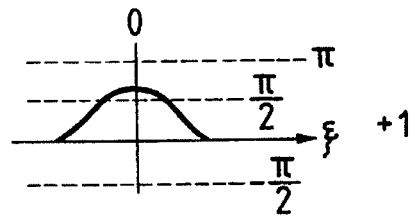

FIGS. 45A to 45G show calculation results of diffracted wavefronts on the pupil plane of the lens 408 in association with s-polarized light components when the diffraction limit spot 399 is scanned in the X direction. FIGS. 45A to 45G show differences in units of spot positions normalized by the spot size on the x-coordinate axis. In FIGS. 45A to 45G, a solid curve represents the amplitude distribution of diffracted wavefronts, and a broken curve represents the phase distribution thereof. Note that the phase is represented by a relative value for the sake of simplicity. FIG. 45A shows a case wherein the spot 399 is radiated on only the downward magnetic domain 422. In this case, the amplitude distribution is a Gaussian distribution, and the phase distribution is shifted by πrad corresponding to the phase object 423. When the edge enters the spot, the central portion of the amplitude distribution curve is recessed, as shown in FIGS. 45B to 45F. In particular, in FIG. 45D showing a case wherein the optical axis coincides with the edge, the amplitude distribution curve has two peaks. When the edge enters the spot, as described above, the phase distribution is modulated to have πrad as the center, as shown in FIGS. 45B and 45C. In FIG. 45D, modulation is changed to that-having 0 rad as the center. Thereafter, as the edge leaves the light spot, the degree of modulation decreases. The diffracted wavefront from the upward magnetic domain 421 having a phase of 0 rad has a phase of 0 rad, and its amplitude distribution is also returned to a Gaussian distribution, as shown in FIG. 45G.

As can be understood from these calculation results, in reproduction utilizing the diffraction phenomenon according to the present invention, even at the positions where the edge is shifted from the optical axis shown in FIGS. 45B, 45C, 45E, and 45F, a diffraction pattern is formed upon superposition of wavefronts from the respective points in the magnetic domains. In particular, since the phase distributions of the wavefronts correspond to the distribution of spatial polarization states, reproduction utilizing asymmetricity of phases can be realized. However, in this case, it is impossible to geometrically or geometrically optically describe wavefronts in FIGS. 45B, 45C, 45E, and 45F as reflected polarized light states from a specific magnetic domain.

Next, the light intensity distribution obtained when s-polarized light components whose wavefronts are modulated by diffraction by magnetooptical domains and p-polarized light components which are not modulated by the domains are wave-mixing interfered with each other will be examined below. An example is a case wherein the fast axis of the halfwave plate 414 is rotated about the optical axis through 22.5°, and two orthogonal polarized light components are wave-mixing interfered with each other by projecting them onto a ±45° analyzer by the second polarization beam splitter 415. In the following description, a case will be examined first wherein no phase compensation plate 413 is arranged, and the Kerr ellipticity is 0. Next, a case will be examined wherein no phase compensation plate 413 is arranged, and the Kerr ellipticity is not 0. Finally, the effect of improving the degree of modulation by the phase compensation plate 413 will be explained.

Figure 46A:
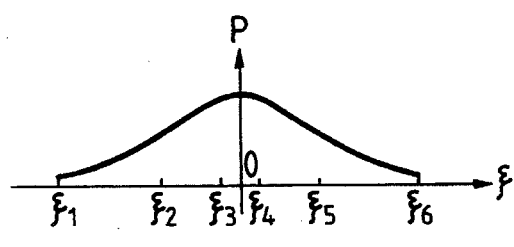
FIGS. 46A to 46I are explanatory views of polarization states.
Figure 46B:
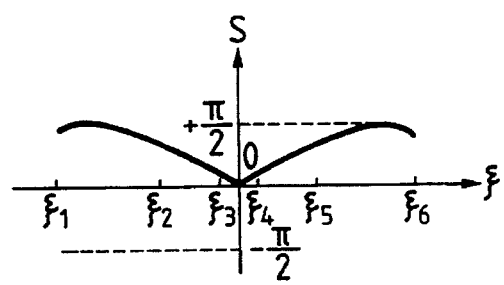

FIGS. 46A to 46I show the spatial distributions of p- and s-polarized light components obtained when no phase compensation plate 413 is arranged, and the Kerr ellipticity is 0. FIG. 46A shows the amplitude and phase distributions of p-polarized light components on the pupil plane. In FIG. 46A, the amplitude distribution is a Gaussian distribution, and the phase distribution is constant (0 rad). FIG. 46B corresponds to FIG. 45D, and shows the amplitude distribution (solid curve) and the phase distribution (broken curve) of s-polarized light components on the pupil plane obtained when the magnetic domain edge is located on the optical axis of the light spot. Since elliptic conversion due to the Kerr effect is ignored in this case, the phase of s-polarized light is spatially divided into two regions of ±π/2 rad to have 0rad as the center. FIGS. 46C to 46I show synthesized polarization states of p- and s-polarized light components at coordinates $\xi=\xi_1, \xi_2, \xi_3, 0, \xi_4, \xi_5$, and $\xi_6$ on the pupil plane. In general, if p-polarized light and s-polarized light are represented by $E_P$ and $E_S$, and their amplitudes are represented by $A_P$ and $A_S$, and the angular frequency of light is represented by $\omega$, the wavelength is represented by $\lambda$, and the initial phases of the p-polarized light and s-polarized light are represented by $\phi_{P1}$ and $\phi_S$, we have:

$$E_P = A_P \cos(\tau + \phi_P)$$

$$E_S = A_S \cos(\tau + \phi_S)$$

(for $\tau = \omega t - 2\pi/\lambda Z$). If $\delta = \phi_P$ and $\phi_S$, synthesized light is expressed as right-handed elliptically polarized light if $\delta > 0$, and as left-handed elliptically polarized light if $\delta < 0$. If $\delta = 0$, the synthesized polarized light is expressed as linearly polarized light. If $\delta = \pm\pi/2$ and $A_P = A_S$, the synthesized polarized light is expressed as right- or left-handed circularly polarized light.

Figure 46C:
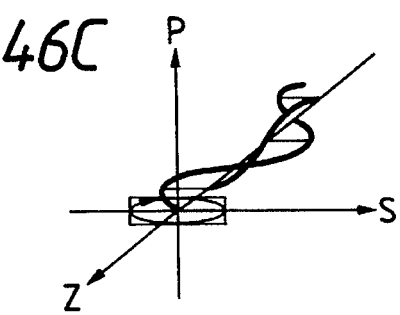

FIG. 46C shows the polarization state at the coordinate $\xi = \xi_1$. If $E_P(\xi_1) < E_S(\xi_1)$, then $\delta(\xi_1) = +\pi/2 > 0$. Therefore, the synthesized polarized light is expressed by low-profile right-handed elliptically polarized light, whose major axis coincides with the direction of s-polarized light, as shown in FIG. 46C. At the spatially symmetrical position $\xi = \xi_6$, as shown in FIG. 46I, if $E_P(\xi_6) < E_S(\xi_6)$, then $\delta(\xi_6) = -\pi/2 < 0$. In addition, since $E_P(\xi_6) = E_P(\xi_1)$ and $E_S(\xi_6) = E_S(\xi_1)$, the synthesized polarized light becomes left-handed elliptically polarized light although it has the same shape as that of FIG. 46C. Since a difference between clockwise and counterclockwise rotations cannot be detected by the ±45° analyzer (second polarization beam splitter), wave-mixing interference intensities $I(\xi)$ at points $\xi = \xi_1$ and $\xi = \xi_6$ become equal to each other. More specifically, if the inclination angle of the analyzer from p-polarized light is represented by $\alpha$, since the intensity $I(\xi)$ is given by:

$$I(\xi) = (A_P(\xi) \cos \alpha)^2 + (A_S(\xi) \sin \alpha)^2 + 2A_P(\xi)A_S(\xi) \cos^2 \sin^2 \cdot \cos \delta(\xi)$$

then $\alpha = \pm 45°$. Since $A_P(\xi_1) = A_P(\xi_6)$ and $A_S(\xi_1) = A_S(\xi_6)$, we have:

$$\begin{aligned} I(\xi_1) &= \frac{A_P(\xi_1)^2}{2} + \frac{A_S(\xi_1)^2}{2} \pm A_P(\xi_1)A_S(\xi_1)\cos\left(+\frac{\pi}{2}\right) \\ &= \frac{A_P(\xi_1)^2}{2} + \frac{A_S(\xi_1)^2}{2} \\ &= \frac{A_P(\xi_6)^2}{2} + \frac{A_S(\xi_6)^2}{2} \pm A_P(\xi_6)A_S(\xi_6)\cos\left(-\frac{\pi}{2}\right) \\ &= I(\xi_6) \end{aligned}$$

As long as the phase difference between p-polarized light and s-polarized light is $\delta = \pm\pi/2$, the interference term=0, and if their amplitudes are equal to each other, their intensities also become equal to each other.

Figure 46D:
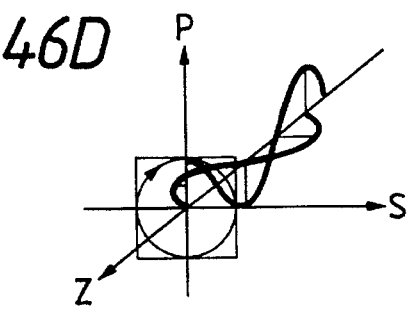
Figure 46E:
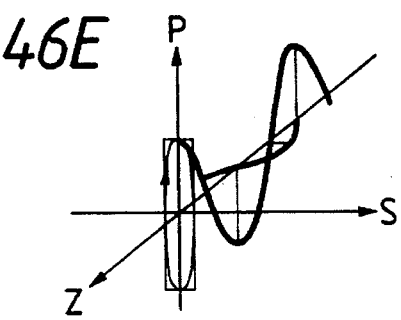
Figure 46F:
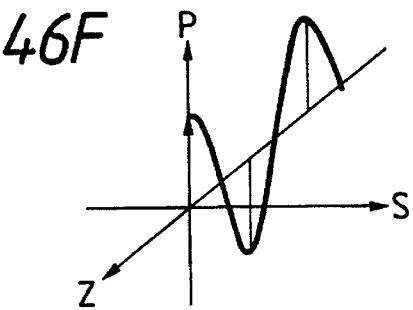
Figure 46G:
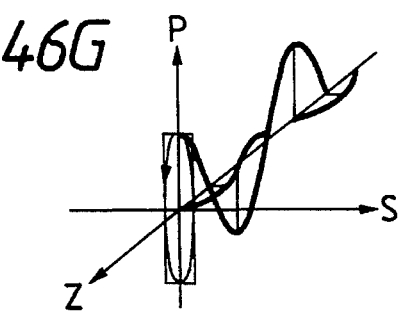
Figure 46H:
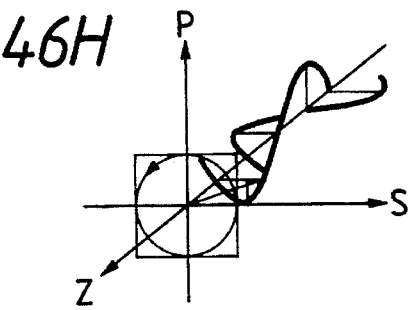
Figure 46I:
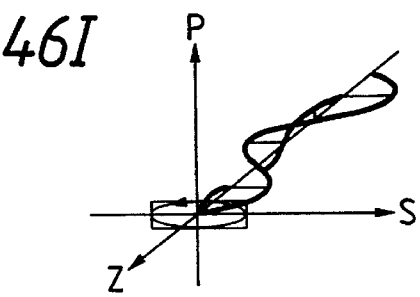

FIGS. 46D and 46H show the polarization states at the coordinates $\xi = \xi_2$ and $\xi = \xi_5$. In these states, since $E_P = E_S$ and $\delta = -\pi/2$, corresponding synthesized polarized light beams are respectively expressed as right- and left-handed circularly polarized light beams, and $I(\xi_2) = I(\xi_5)$. FIGS. 46E and 46G show the polarization states at the coordinates $\xi = \xi_3$ and $\xi = \xi_4$. Since $E_P < E_S$ and $\delta = \pm\pi/2$, corresponding synthesized polarized light beams are respectively expressed as vertically elongated low-profile elliptically polarized light beams, which have the major axes coinciding with p-polarized light, and have different rotational directions, and $I(\xi_3) = I(\xi_4)$. Furthermore, FIG. 46F shows the polarization state at $\xi = 0$, and since $E_S = 0$, synthesized polarized light becomes p-polarized light.

Figure 47A:
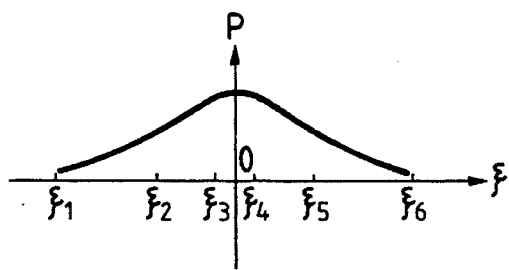
FIGS. 47A to 47I are explanatory views of polarization states.
Figure 47B:
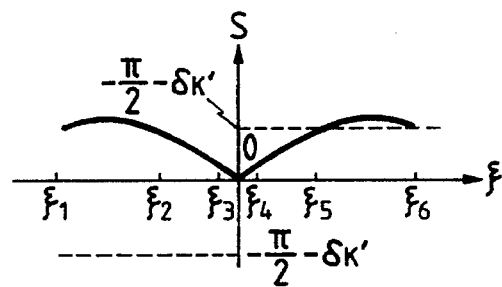
Figure 47C:
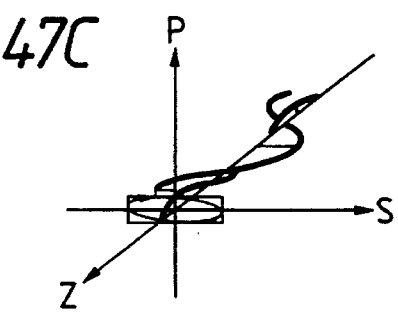
Figure 47D:
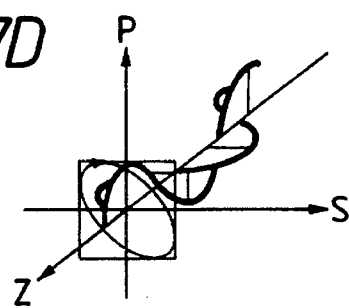
Figure 47E:
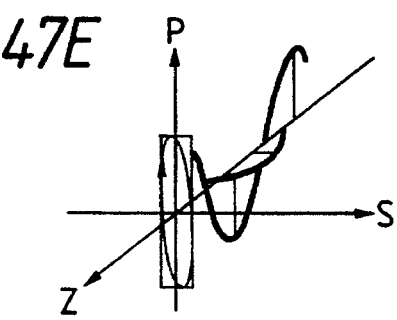
Figure 47F:
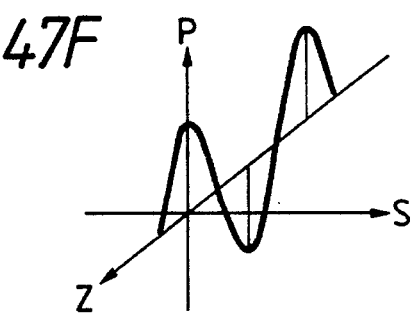
Figure 47G:
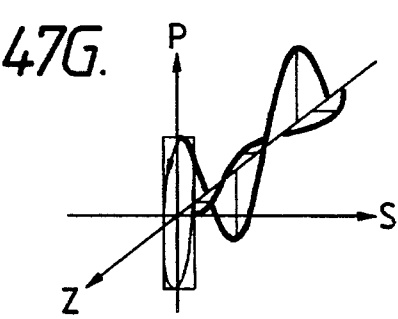
Figure 47H:
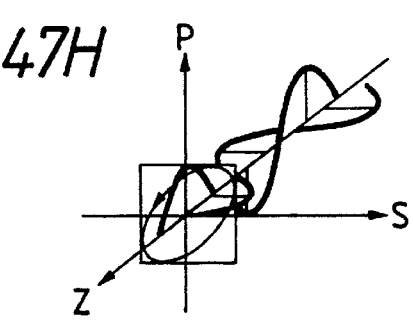
Figure 47I:
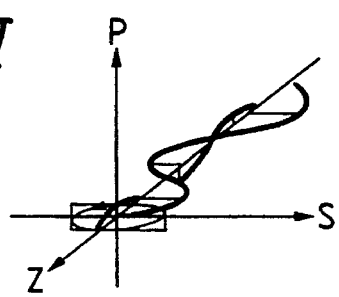

A case will be described below wherein the Kerr ellipticity is not 0. FIGS. 47A to 47I show the polarization states on the pupil plane in this case. These figures correspond to FIGS. 46A to 46I. A difference from FIGS. 46A to 46I is that the elliptic conversion effect due to the Kerr effect, i.e., $\delta_k = \phi_{kp} - \phi_{ks}$, is added in s-polarized light. Although the amplitude distribution of s-polarized light in FIG. 47B is the same as that in FIG. 46B, its phase distribution is shifted by $-\delta'_k$, and is not rotation-symmetrical about the optical axis $\xi = 0$, i.e., is not an odd function. FIGS. 47C, 47D, 47E, 47F, 47G, 47H, and 47I respectively show the polarization states at coordinate points $\xi = \xi_1, \xi_2, \xi_3, 0, \xi_4, \xi_5$, and $\xi_6$ in this case as in FIGS. 46A to 46I. In this case, due to the presence of the Kerr ellipticity $\delta_k$, $\delta = \phi_P - \phi_S + \phi_k$ is never equal to $\pm\pi/2$. For this reason, the major and minor axes of each elliptically polarized light never coincide with the directions of p-polarized light and s-polarized light. In a region of $\delta = -\pi/2 - \delta'_k$ and $\xi < 0$ shown in FIG. 47B, synthesized polarized light becomes right-handed elliptically polarized light whose major axis is inclined counterclockwise with respect to the direction of p-polarized light, as shown in FIGS. 47C, 47D, and 47E, and in a region of $\delta=+\pi/2-\delta'_k$ and $\xi>0$, synthesized polarized light becomes left-handed elliptically polarized light whose major axis has an opposite inclination. Therefore, wave-mixing interference intensities at respective points are no longer equal to each other, and the interference intensity distribution becomes asymmetrical. Upon comparison of the intensities at the coordinate points $\xi=\xi_2$ and $\xi_5$, since $A_P(\xi_5)=A_P(\xi_2)$, and $A_S(\xi_5)=A_S(\xi_2)$, the following equations are obtained, and the sign of the interference term is reversed to have the optical axis $\xi=0$ as a boundary.

$$I(\xi_2) = \frac{A_P(\xi_2)^2}{2} + \frac{A_S(\xi_2)^2}{2} \pm$$

$$A_P(\xi_2)A_S(\xi_2) \cdot \cos\left(-\frac{\pi}{2} - \delta_R'\right)$$

$$= \frac{A_P(\xi_2)^2}{2} + \frac{A_S(\xi_2)^2}{2} \pm (-1)A_P(\xi_2)A_S(\xi_2)\sin\delta_R'$$

$$I(\xi_5) = \frac{A_P(\xi_5)^2}{2} + \frac{A_S(\xi_5)^2}{2} \pm$$

$$A_P(\xi_5)A_S(\xi_5) \cdot \cos\left(+\frac{\pi}{2} - \delta_R'\right)$$

$$= \frac{A_P(\xi_2)^2}{2} + \frac{A_S(\xi_2)^2}{2} \pm A_P(\xi_2)A_S(\xi_2)\sin\delta_R'$$

More specifically, as can be understood from the above equations, although the interference intensity distribution on the pupil plane by the edge does not have asymmetricity due to the diffraction effects of Kerr components alone, as shown in FIGS. 46A to 46I, the interference intensity distribution has asymmetricity upon combination with the elliptic conversion effect of the Kerr effect, and an edge detection signal can be obtained.

The above description reveals the fact that an edge detection signal obtained by a series of new edge detection methods represented by Japanese Laid-Open Patent Application No. 3-268252 is obtained by combining the elliptic conversion effect $\delta_R$ due to the Kerr effect, and a phase change due to a phase shift and diffraction caused by the phase difference $\delta_o$ between p-polarized light and s-polarized light produced by a substrate or an intermediate optical system, as has been described above with reference to FIGS. 47A to 47I. More specifically, this fact will be explained below with reference to FIG. 47B. When $\xi<0$, the state of $-\pi/2-\delta'_R+\delta_o$ is attained, and when $\xi>0$, the state of $+\pi/2-\delta'_R+\delta_o$ is attained. A light intensity difference between a $+|\xi|$ point and a $-|\xi|$ point is expressed by the interference term $A_P(\xi)A_S(\xi)\sin(\delta'_R-\delta_o)$. In this case, the phase difference distribution 6 is normalized as follows so as not to be limited by the shift of $\delta'_R$ shown in FIG. 47B:

$$\delta=\delta_d+\delta_R+\delta_o=\phi_P-\phi_S$$

where $\delta_d$ is the phase difference caused by diffraction, $\delta_R$ is the phase difference caused by the Kerr ellipticity, and $\delta_o$ is the phase difference caused by a substrate, an optical system, and the like. Although $\delta_d$ and $\delta_R$ need not be separately considered, they are separately classified to facilitate descriptions of a uniform domain and a domain with an edge.

The Kerr rotational angle $\theta_k$ and the Kerr ellipticity $\delta_k$ satisfy the Kramers-Kronig relations therebetween, are not independent, and are on substantially the same order. In general, $\theta_k$ is 1° or less, and $\delta_k$ is also 1° or less. In normal level detection, an effort for decreasing $\delta_o$ is made, and for this purpose, an example utilizing a phase shift of the reflection surface of a compensation plate, a mirror, or a beam splitter is known, as described above. More specifically, this means that an effort for achieving $\delta_k+\delta_o=0$ has been made in a conventional optical system. Namely, this effect is an effort in a direction to eliminate an edge detection signal shown in FIGS. 46A to 46I in edge detection. Even if $\delta_k+\delta_o\neq0$, and a residual phase difference is present, it is very small, and becomes $|A_PA_S\cos\delta|=|A_PA_S\sin(\delta_k+\delta_o)|$ corresponding to the degree of modulation of the amplitude (peak) of the edge detection signal. Therefore, as is apparent from the above description, a very small signal can only be obtained.

The present invention has as its object to improve the degree of modulation of the edge detection signal and quality of a reproduction signal so as to improve reliability of data reproduction. More specifically, in the embodiment shown in FIG. 42, the phase difference distribution $\delta$ is corrected by the phase compensation plate 413, thereby maximizing the amplitude of the edge detection signal.

Figure 48:
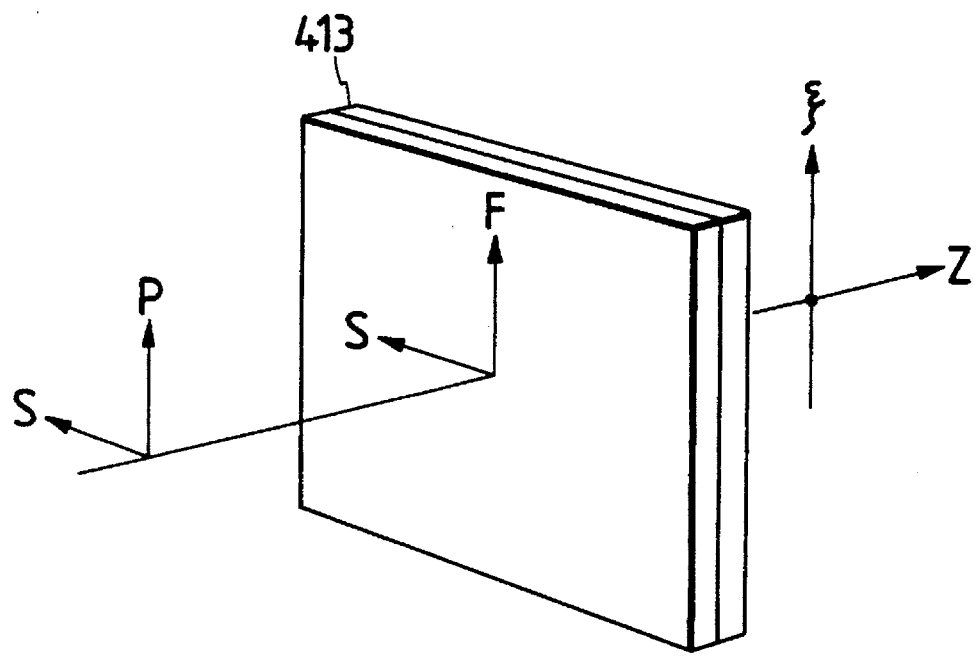
FIG. 48 is a perspective view of a phase compensation plate.

FIG. 48 is a perspective view of the phase compensation plate 413. The phase compensation plate 413 has a laminated structure of quartz, which utilizes a thickness difference to cancel optical rotatory power, and to use a birefringence characteristic alone. In this embodiment, the thickness of the phase compensation plate 413 is set, so that the total phase difference between the fast axis F and the slow axis S is equal to $(\pi/2)-(\delta_k+\delta_o)$. Also, the fast axis F is caused to coincide with the direction of p-polarized light, and the slow axis S perpendicular to the fast axis is caused to coincide with the direction of s-polarized light. Therefore, as is apparent from the above description, when the domain edge is present on the optical axis of the light spot, the phase distribution of s-polarized light on the pupil plane is defined by $-(\pi/2)+(\delta_k+\delta_o)$ and $+(\pi/2)+(\delta_k+\delta_o)$ with reference to the phase of p-polarized light. Since the phase distribution of s-polarized light is delayed by the above-mentioned phase compensation plate 413 by $(\pi/2)-(\delta_k+\delta_o)$ with respect to p-polarized light, the phase distribution after light is transmitted through the phase compensation plate 413 is defined by 0 and $\pi$ with respect to p-polarized light.

Figure 49A:
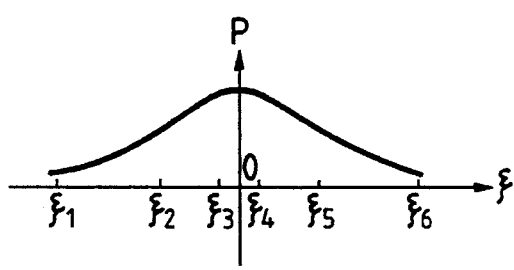
FIGS. 49A to 49I are explanatory views of polarization states.
Figure 49B:
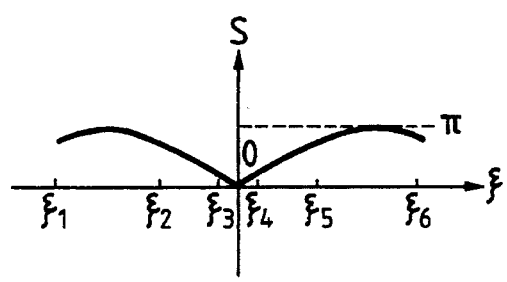
Figure 49C:
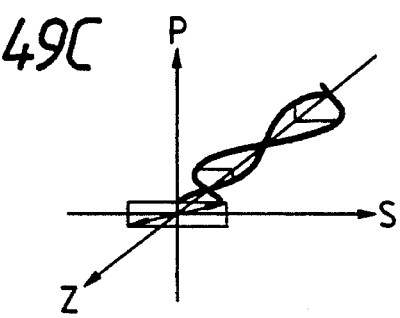
Figure 49D:
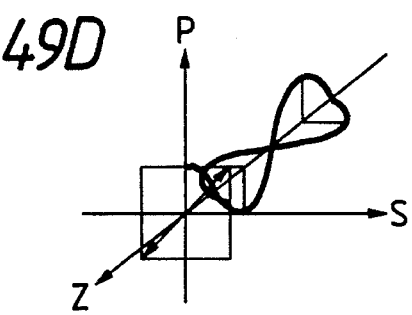
Figure 49E:
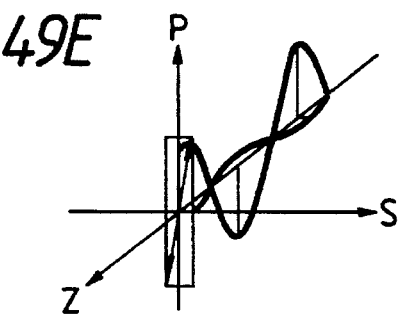
Figure 49F:
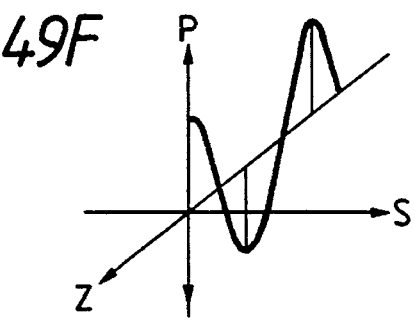
Figure 49G:
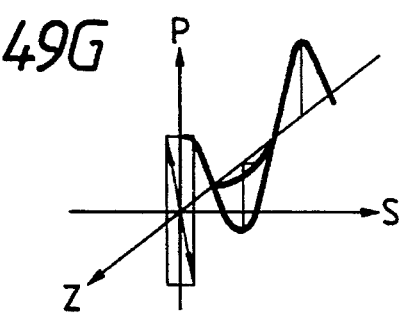
Figure 49H:
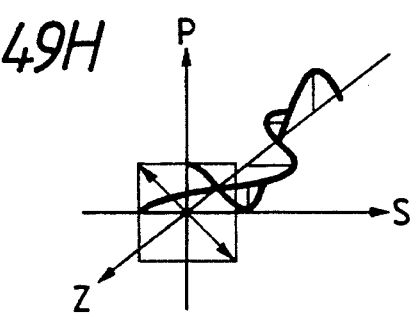
Figure 49I:
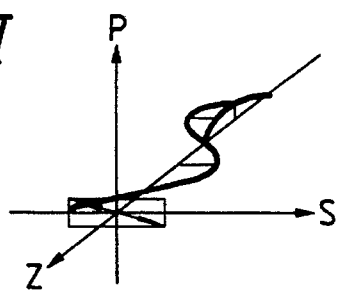

FIGS. 49A to 49I show the polarization states after light is subjected to phase correction by the phase compensation plate 413, and correspond to FIGS. 46A to 46I and FIGS. 47A to 47I. As shown in FIG. 49B, when the phase of p-polarized light is used as a reference phase (0 rad), the phase compensation plate 413 serves to define the phase distribution of s-polarized light by 0 and $\pi$rad. More specifically, phase $-\pi/2$ or $-\pi/2-\delta'_k$ when $\xi<0$ in FIG. 46B or FIG. 47B is delayed to 0, and a phase $+\pi/2$ or $+\pi/2-\delta'_k$ when $\xi>0$ is delayed to $\pi$. With this operation, the polarization states at points $\xi=\xi_1, \xi_2, \tau_3, 0, \xi_4, \xi_5$, and $\xi_6$ are respectively as shown in FIGS. 49C, 49D, 49E, 49F, 49G, 49H, and 49I. In this case, since the phase difference $\delta$ between p-polarized light and s-polarized light is 0 or $\pi$, synthesized polarized light becomes linearly polarized light in place of elliptically polarized light. However, as can be seen from these figures, the rotational angle and amplitude of polarized light are nonuniformly distributed. In the same manner as in the above-mentioned case, as for the polarization distributions shown in FIGS. 49A to 49I, the polarization states are uniformly rotated through 45° by rotating the slow axis through 22.5° with respect to the direction of p-polarized light by the halfwave plate 414. Thus, the wave-mixing interference intensity distribution by the analyzer set at ±45° with respect to the p-polarized light axis is obtained as transmitted light and reflected light by the second polarization beam splitter 415 which has a differential detection arrangement for removing in-phase noise components.

As can be understood from FIGS. 49A to 49I, the intensity distributions have considerable asymmetricity. When such asymmetrical distributions are compared between $\xi=\xi_1$ and $\xi_6$, since $A_P(\xi_1)=A_P(\xi_6)$ and $A_S(\xi_1)=A_S(\xi_6)$, we have:

$$I(\xi_1) = \frac{A_P(\xi_1)^2}{2} + \frac{A_S(\xi_1)^2}{2} \pm A_P(\xi_1)A_S(\xi_1)\cos 0$$

$$= \frac{A_P(\xi_1)^2}{2} + \frac{A_S(\xi_1)^2}{2} \pm A_P(\xi_1)(\xi_1)$$

$$I(\xi_6) = \frac{A_P(\xi_6)^2}{2} + \frac{A_S(\xi_6)^2}{2} \pm A_P(\xi_6)A_S(\xi_6)\cos \pi$$

$$= \frac{A_P(\xi_1)^2}{2} + \frac{A_S(\xi_1)^2}{2} \pm A_P(-1)(\xi_1)A_S(\xi_1)$$

More specifically, maximum possible asymmetricity is formed. Therefore, the maximum degree of modulation of the edge detection signal can be obtained. At other point pairs ($\xi_2$, $\xi_5$) and ($\xi_3$, $\xi_4$), the maximum asymmetricity is similarly formed. More specifically, when the two-divided sensors 416 and 417 detect the asymmetricity of the intensity distribution, and their outputs are differentially detected by the differential amplifiers 418a and 418b, the amplitude of the signal is proportional to $2A_PA_S$. In the example shown in FIGS. 47A to 47I, although the amplitude is $2A_PA_S\cdot\sin(\delta_k+\delta_o)$, and is very small, the limit maximum amplitude is obtained according to the present invention.

In other words, the shape of elliptically polarized light inscribed in a rectangle (the side on the p-polarized light side has a length $2A_P$, and the side on the s-polarized light side has a length $2A_S$) in the PS plane in each of FIGS. 46C to 46I, 47C to 47I, and 49C to 49I is controlled to have an optimal value. More specifically, the present invention is not limited to the arrangement shown in FIG. 42, and includes concepts which can be applied to polarization states caused by every optical phenomena such as the Kerr effect, diffraction, birefringence, and the like. For example, in the optical head for the magnetooptical disk shown in FIG. 42, the medium arrangement and multi-layered film structure of the magnetooptical disk can be set, so that linearly polarized light distributions shown in FIGS. 49A to 49I are obtained on the pupil plane. For example, the present invention includes the concept of an edge recording/reproduction optical disk, in which $\delta_R$ is defined in advance to include a phase shift caused by multiple reflections, and which has a phase distribution as an integer multiple of $\pi$ after it undergoes a phase change caused by diffraction or a phase change $\delta_o$ caused by an intermediate optical system. Furthermore, the present invention can be separated to provide an optical head which determines the ellipticity of an optical disk in consideration of compatibility of optical disks, and determines the influence of diffraction and a phase change of an optical system. Note that the phase compensation plate 413 is not limited to a quartz plate, as a matter of course. Furthermore, as long as target phase distributions can be obtained by combining phase differences between p-polarized light and s-polarized light in a mirror, a beam splitter, and the like, the present invention can be practiced without using the phase compensation plate 413.

Figure 50:
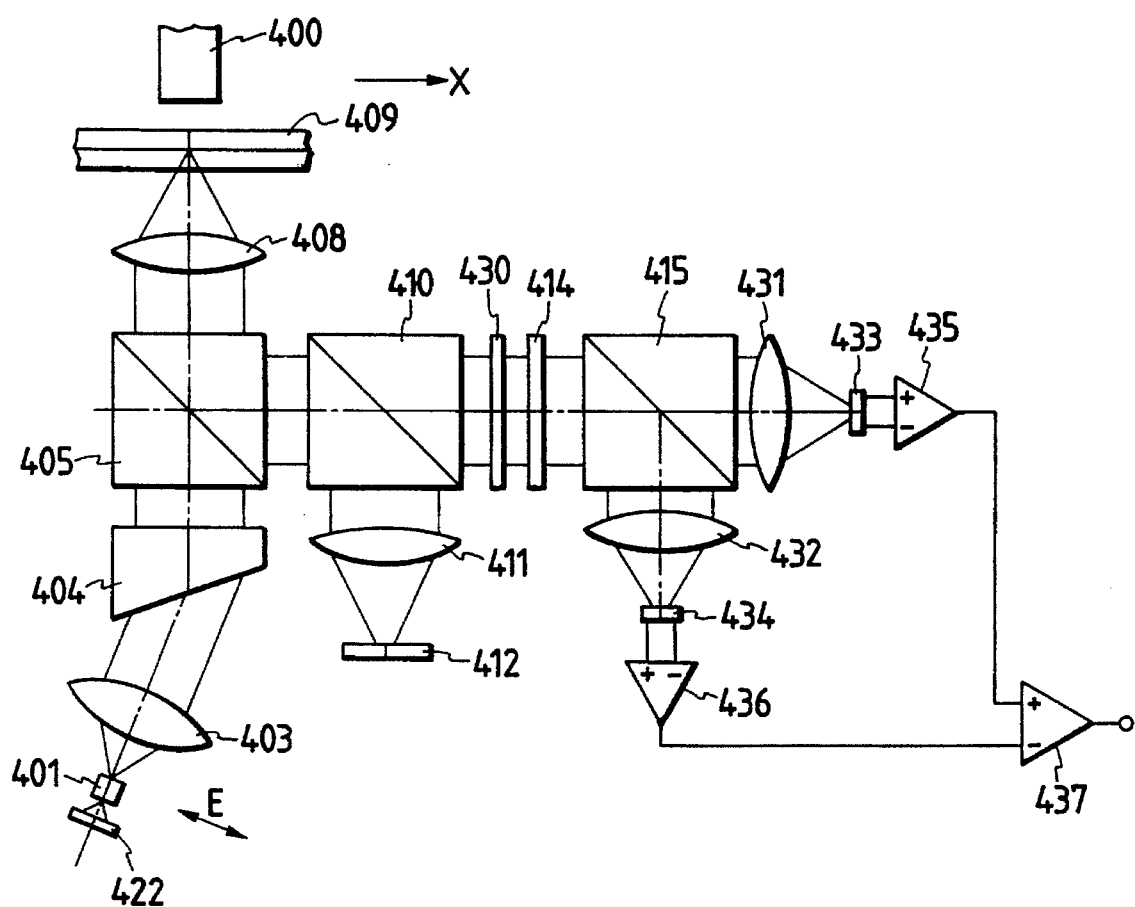
FIG. 50 is a diagram showing still another embodiment of the present invention.

Still another embodiment of the present invention will be described below. FIG. 50 shows an arrangement of an optical head of a magnetooptical disk recording/reproduction apparatus according to the present invention. The same reference numerals in FIG. 50 denote the same parts as in the embodiment shown in FIG. 42. The embodiment shown in FIG. 50 executes re-imaging plane detection, while the embodiment shown in FIG. 42 executes pupil plane detection. The optical head shown in FIG. 50 includes a phase compensation plate 430, sensor lenses 431 and 432, two-divided RF sensors 433 and 434 (a split line extends in a direction perpendicular to the plane of drawing of FIG. 50, and in a direction perpendicular to a track on the magnetooptical disk 409), and differential amplifiers 435, 436, and 437.

Figure 51A:
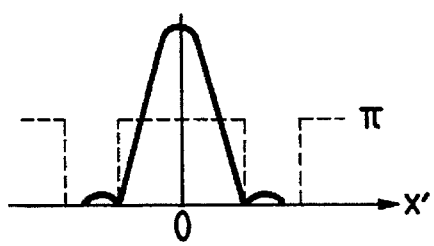
FIGS. 51A to 51G are explanatory views of diffraction patterns.
Figure 51B:
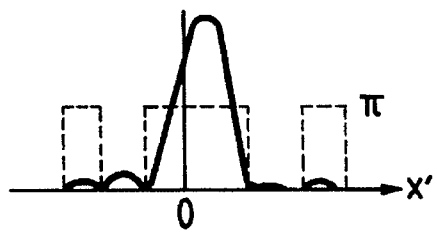
Figure 51C:
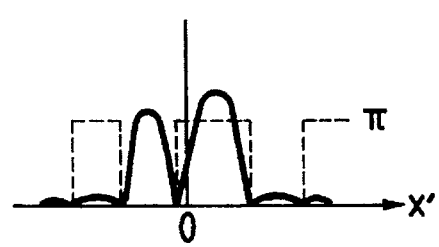
Figure 51D:
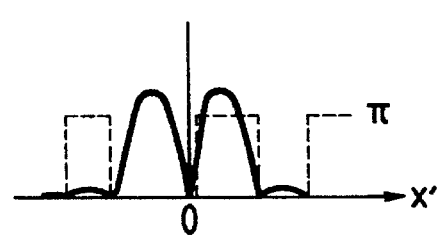
Figure 51E:
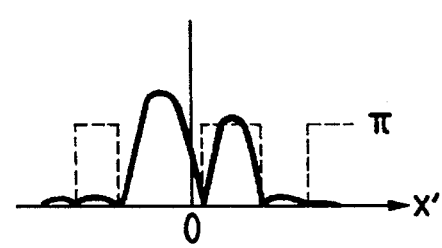
Figure 51F:
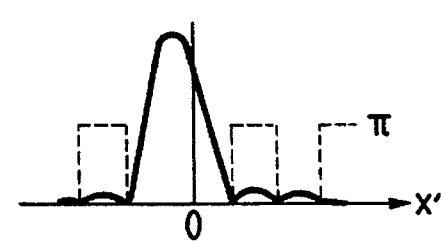
Figure 51G:
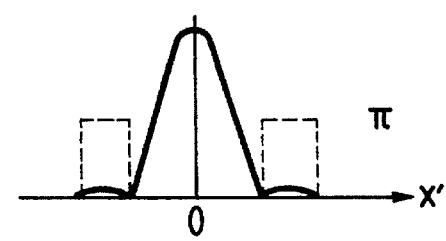

As in the embodiment described above, a case will be examined below wherein no phase compensation plate 430 is arranged, and the Kerr ellipticity is 0. FIGS. 51A to 51G show wavefronts of s-polarized light of a spot on the re-imaging planes of the sensor lenses 431 and 432 when a diffraction limit spot is scanned on the magnetooptical disk 409. FIGS. 51A to 51G show differences in units of spot positions normalized by the spot size. In FIGS. 51A to 51G, a solid curve represents the amplitude distribution, and a broken curve represents the phase distribution. Note that the phase distribution is a relative value obtained when the uniform phase distribution of p-polarized light is defined as a reference value 0. As can be understood from these figures, a change in wavefront on the re-imaging plane is considerably different from a change in diffraction wavefront on the pupil plane shown in FIGS. 45A to 45G. When the spot is not present on the edge, i.e., in FIGS. 51A and 51G, a basically Gaussian type amplitude distribution is obtained, and its phase is $\pi$ or 0 depending on the direction of a domain at that time. In this embodiment, since the pupil of each of the sensor lenses 431 and 432 is set to be smaller than that of the pickup lens 408 to eliminate the influence of an axial shift due to tracking, the diffraction pattern of a zone becomes very small, and the phase difference between zones is $\pi$. When the edge enters the spot, as shown in FIGS. 51B to 51F, the amplitude distribution becomes asymmetrical, a valley corresponding to an amplitude=0 moves, and the edge is located at the center of the spot. In FIG. 51D, the valley is located at the center, and consequently, the amplitude distribution becomes symmetrical. Since the edge enters the spot, the phase distribution assumes a value 0 or $\pi$, and these values replace one another in units of zones. In FIG. 51D, the phase assumes a value 0/$\pi$ at the center. Therefore, when the s-polarized light wavefront is wave-mixing interfered with a p-polarized light wavefront which is not influenced by diffraction (i.e., the same wavefront as that obtained by amplifying the amplitude of FIG. 51G), the intensity distribution can have asymmetricity. At this time, since s-polarized light assumes a value 0 or $\pi$ with respect to p-polarized light, asymmetricity of the phase distribution on the re-imaging plane is maximized like $\cos 0=1$ and $\cos \pi=-1$ by two diffraction effects, i.e., diffraction (corresponding to FIGS. 45A to 45G) from the magnetooptical disk to the pupil plane of the pickup lens, and diffraction from the pupil plane of the sensor lens to the re-imaging plane, thus obtaining the maximum edge signal amplitude. However, in practice, due to the presence of the Kerr ellipticity $\delta_k$ and the phase difference $\delta_o$ between p-polarized light and s-polarized light caused by reflection of a mirror, a beam splitter, and the like, a decrease in degree of modulation of $\cos(\delta_k+\delta_o)$ and $\cos(\pi+\delta_k+\delta_o)$ occurs.

Since the present invention improves the degree of modulation by setting the phase distribution as a total of the Kerr ellipticity, a phase change caused by diffraction, a phase change caused by an optical system, and the like to be an integer multiple of $\pi$ even partially with respect to the phase distribution of a reference wavefront, the maximum amplitude can be achieved by correcting the phase $\delta_k+\delta_o$ according to this embodiment. Therefore, in FIG. 50, as the phase compensation plate 430 has a phase difference $\delta_k+\delta_o$ (or an integer multiple of $\pi$ of addition) between the fast and slow axes, and its fast axis is caused to coincide with the direction of p-polarized light. Thus, the phase distributions of s-polarized light wavefronts on the re-imaging planes of the sensor lenses 431 and 432 can be set to be an integer multiple of π with respect to p-polarized light, as shown in FIGS. 51A to 51G. In this manner, differential outputs from the differential amplifiers 345 and 346 can be maximized.

Figure 52:
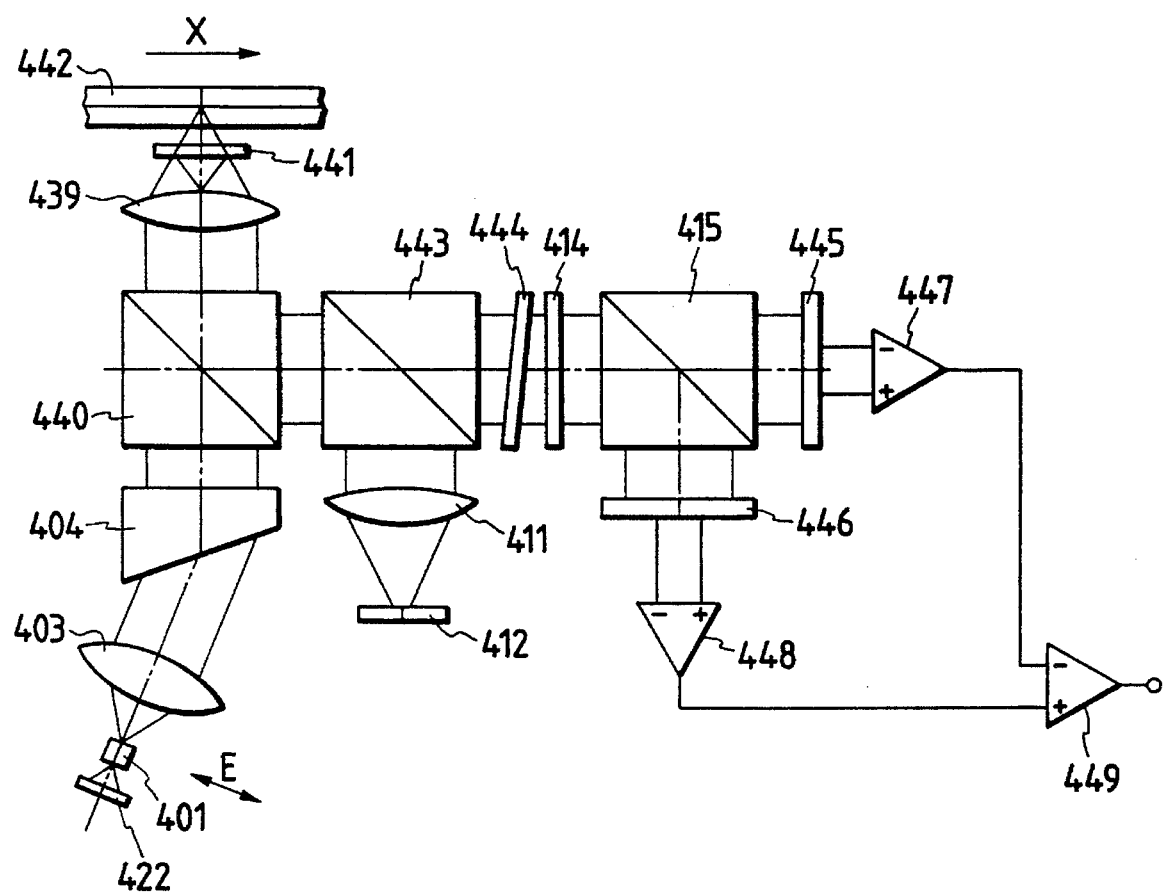
FIG. 52 is a diagram showing an embodiment of an optical disk recording/reproduction apparatus.
Figure 53:
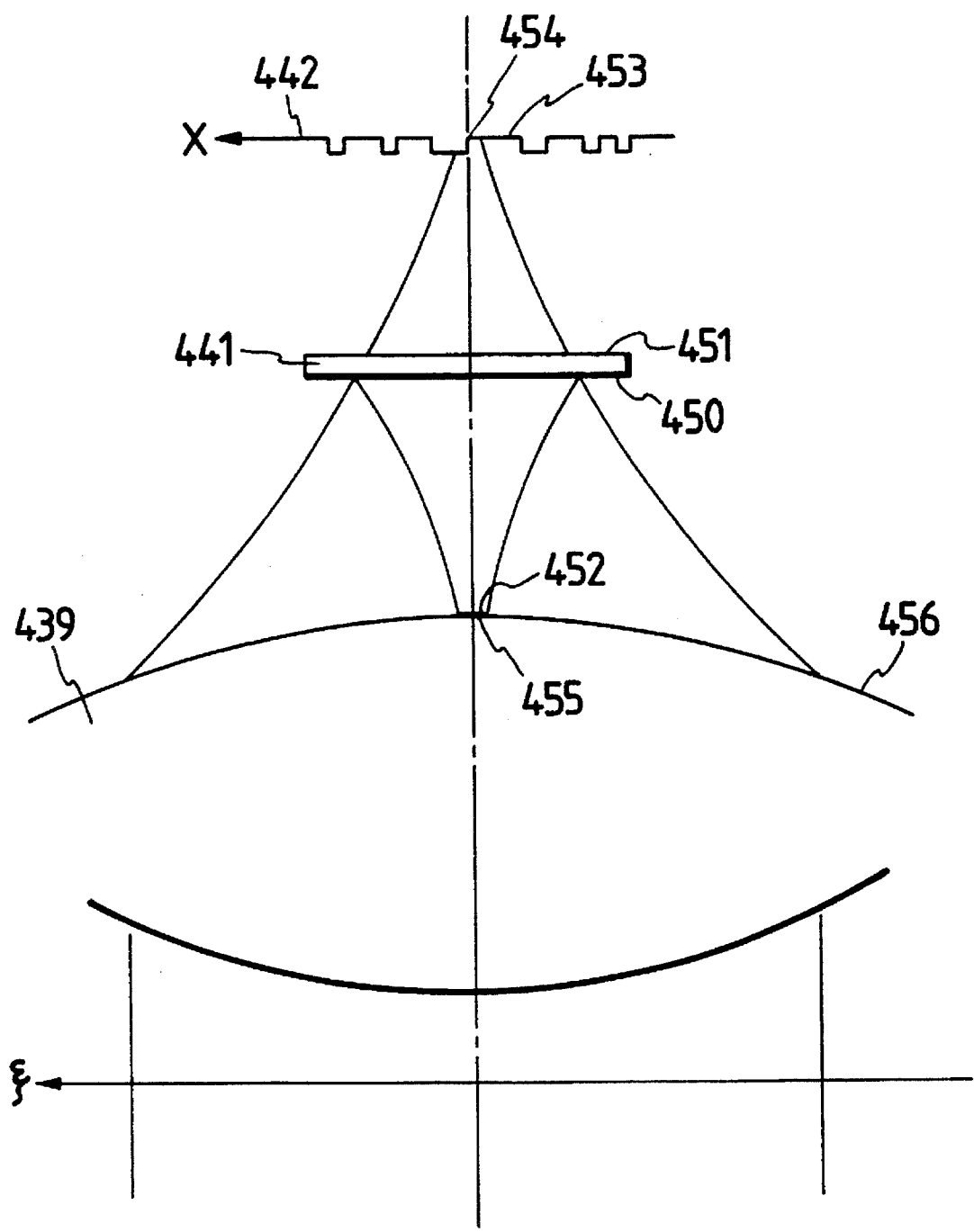
FIG. 53 is a view showing an optical head.
Figure 54A:
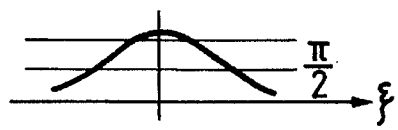
FIGS. 54A to 54G are explanatory views of diffraction patterns.
Figure 54B:
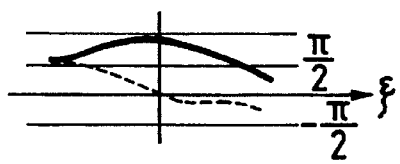
Figure 54C:
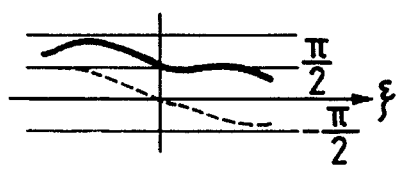
Figure 54D:
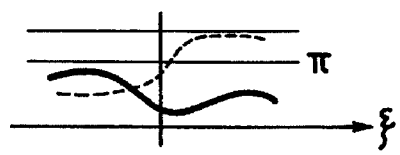
Figure 54E:
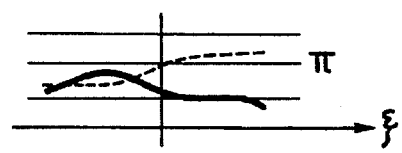
Figure 54F:
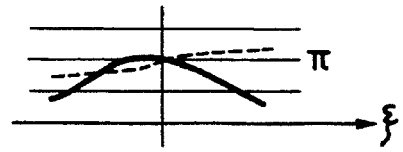
Figure 54G:
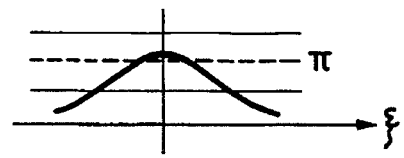

Still another embodiment of the present invention will be described below. FIG. 52 shows the arrangement of an optical head of an optical disk recording/reproduction apparatus according to the present invention. The same reference numerals in FIG. 52 denote the same parts as in FIG. 42. In this embodiment, the present invention is applied to a case wherein a mark recorded on an optical disk is not a magnetooptical domain but a three-dimensional pit unlike in the embodiments described above. The optical head includes a pickup lens 439, a first polarization beam splitter 440 which transmits 50% of p-polarized light components, reflects 50% of p-polarized light components, and reflects 100% of s-polarized light components, a quarterwave half mirror 441 which is mechanically integrated with the pickup lens 439, an optical disk 442 on which three-dimensional pits are recorded, a third polarization beam splitter 443 which transmits 100% of p-polarized light components, transmits 80% of s-polarized light components, and reflects 20% of s-polarized light components, a phase compensation plate 444, two-divided RF sensors 445 and 446, and differential amplifiers 447, 448, and 449. The pickup lens 439 radiates a diffraction limit spot on the optical disk 442. FIG. 53 is an enlarged view of the spot radiated on the disk. For the sake of simplicity, the lens surface and the optical disk surface are partially omitted. Light emerging from a surface 456, opposing the optical disk, of the pickup lens 439 is incident on the quarterwave half mirror 441, which transmits 60% of incident light components, and reflects 40% of the incident light components. Light transmitted through a reflection multi-layered film surface 450 is transmitted through a quarterwave substrate 451 to be converted into right-handed circularly polarized light, and forms a light spot 454 on a three-dimensional pit surface 453 on the optical disk 442. The light diffraction-reflected by the surface 453 is converted into substantially left-handed circularly polarized light, and passes through the quarterwave substrate 451 again to be converted into substantially s-polarized light. 60% of the s-polarized light components are transmitted through the reflection multi-layered surface 450, and returns to the pickup lens 439. On the other hand, incident light reflected by the reflection multi-layered surface 450 forms a light spot 455 equivalent to the light spot 454 on the optical disk 442 on the vertex, along the optical axis, of a pickup lens surface 456. The lens surface 456 on the optical disk side is a flat surface or a surface having a very large radius of curvature, and the light spot is as small as about 1 μm. Thus, light regularly reflected by the lens surface 456 returns to the quarterwave half mirror 441 again, and 40% of the light components are re-reflected toward the pickup lens. This light is p-polarized light, and is used as a reference wavefront. Note that utilization efficiency of light can be improved by forming a high-reflection film 452 on a portion having a diameter of several μm around the vertex, along the optical axis, of the lens surface.

In FIG. 52, when s-polarized signal light and p-polarized reference light are set to have a substantially equal fixed optical path length, noise caused by a surface vibration of a disk, and movement of an actuator (not shown) corresponding to auto-focusing control can be removed. P- and s-polarized light components which are restored to a parallel beam by the pickup lens 439 are reflected toward a detection system by the first polarization beam splitter 440. Some of s-polarized light components including auto-tracking and auto-focusing signals of the disk are reflected by the third polarization beam splitter 443, and are guided to a servo optical system. FIGS. 54A to 54G show wavefronts of s-polarized light transmitted through the third polarization beam splitter 443. FIGS. 54A to 54G show diffracted wavefronts from an edge, i.e., a stepped edge, of a three-dimensional pit when the diffraction limit spot 454 is scanned, and show differences in units of spot positions normalized by the spot size. In FIGS. 54A to 54G, a solid curve represents the amplitude distribution of diffracted wavefronts, and a broken curve represents the phase distribution. Unlike the phase edge shown in FIGS. 45A to 45G, the diffracted wavefronts of the stepped edge have an asymmetrical amplitude distribution, and a non-odd-functional phase distribution. This is because diffracted waves from stepped portions vary depending on right and left steps. In this case, the step is a vertical step having a height of λ/4, i.e., has a height of 0 when ξ<0, and has a height of λ/4 when ξ>0. Although diffracted wavefronts normally change depending on the height or inclination of the stepped portion, an asymmetrical tendency remains the same, and this example will be described below. The asymmetrical direction of the amplitude depends on the direction of a step, and the unbalance direction of the magnitude of the amplitude distribution is left unchanged even when the spot is moved. The position of a dip having a small amplitude is shifted from the optical axis, and its shift amount is almost left unchanged even when the spot is moved. The central position of the curvature of the phase distribution coincides with the dip position of the amplitude distribution, and a spatial change is slower than that obtained by the phase edge. Even in the case shown in FIG. 46D wherein the optical axis coincides with the center of the edge, a change from +π/2 to +3 π/2 is slow. In this case, since no Kerr effect exists, a phase change $\delta_d$ due to diffraction occurs, and in a reference wave to be wave-mixing interfered, i.e., in p-polarized light having a phase of 0 rad, only nonuniformity of a light quantity caused by asymmetricity of the amplitude distribution of s-polarized light occurs as in FIGS. 45A to 45G and FIGS. 46A to 46I. Therefore, the interference term is erased, and the amplitude of the edge detection signal becomes very small. As shown in FIG. 53, although the optical path length difference between p-polarized light and s-polarized light is very small and is fixed, it is difficult to mechanically set the optical path length difference to be 0 in initial adjustment, and there are also the influences of a difference in thermal expansion coefficient, temperature characteristics of the refractive index of the quarterwave plate, a residual auto-focusing offset, their changes over time, and the like. In addition, since there is a phase shift caused by optical elements, as described above, if such a phase shift value including the optical path length difference between p-polarized light and s-polarized light is represented by $\delta_o$, a total phase difference $\delta=\delta_d+\delta_o$ occurs. Therefore, when this phase difference is corrected by the phase compensation plate 444 so as to increase portions in which the phase difference between p-polarized light and s-polarized light becomes an integer multiple of π, the amplitude of the edge detection signal can be increased, and the degree of modulation can also be increased. In the case of FIGS. 54A to 54G, as can be understood from FIG. 54D, when the phase compensation plate 444 provides a phase difference of $3\pi/2-\delta_o$, a required amplitude is realized. However, as is apparent from FIG. 54D, the phase distribution has a small constant portion and a small curvature, and when the next edge is reached, the phase distribution of wavefronts is reversed about the axis ξ=0. In this case, the phase compensation amount to be given by the phase compensation plate 444 can be finely adjusted while monitoring the edge detection signal waveform so as to maximize the edge detection signal amplitude. Also, the phase compensation amount can be corrected to ordinarily obtain a stable signal amplitude in consideration of errors, fluctuations, and aging of optical elements described above. For this purpose, a method of inclining the phase compensation plate 444 by a small amount with respect to the optical axis, as shown in FIG. 52, or a method of rotating the fast axis from the direction of p-polarized light by a small amount may be adopted.

In this manner, polarized light on the pupil plane when the edge is present on the optical axis is corrected. The corrected polarized light is rotated through 45° by the halfwave plate, and is detected by a differential detection optical system including the second polarization beam splitter, and the two-divided sensors 445 and 446. The detection signals from the differential detection optical system are differentially detected by the differential amplifiers 447 and 448, and the outputs from these amplifiers are further differentially detected by the differential amplifier 449 to remove in-phase noise, thereby obtaining a high-quality edge detection signal.

FIG. 55 shows still another embodiment of the present invention. In this embodiment, the present invention is applied to a position detection apparatus. The apparatus shown in FIG. 55 includes a frequency-stabilized He—Ne laser 460, a beam expander 461, a non-polarization beam splitter 462, pickup lenses 463 and 466, a phase compensation plate 465, an object 464, a mirror 467, a halfwave plate 468, a polarization beam splitter 469, two-divided sensors 470 and 471, differential amplifiers 472, 473, and 474, and a phase compensation plate controller 475. A light beam from the laser 460 is expanded by the beam expander 461, is split by the non-polarization beam splitter 462, and forms a diffraction limit spot on the object 464 such as a silicon wafer, a reticle, or the like by the pickup lens 463. The spot is diffracted by edges of three-dimensional structures having various shapes, and diffracted wavefronts are guided to a detection system via the pickup lens 463 and the non-polarization beam splitter 462. On the other hand, reference wavefronts are returned by the pickup lens 466 and the mirror 467, and are reciprocally transmitted through the phase compensation plate 465. Thus, a phase shift $\delta_d$ caused by diffraction of the stepped edge (e.g., see FIGS. 54A to 54G) and a phase shift $\delta_o$ caused by an optical path length difference and optical elements as in the embodiment shown in FIG. 52 are corrected, so that a partial phase difference between the diffracted wavefronts from the object and the reference wavefronts becomes an integer multiple of π. Thus, when an edge is located on the optical axis of the spot, the edge detection signal has a maximum amplitude. More specifically, the diffracted wavefronts shown in FIGS. 54A to 54G correspond to s-polarized light components obtained upon diffraction of circularly polarized light by the stepped edge having a height of λ/4, and as has been described in the above embodiment, the step height and the edge shape are not particularly limited. In addition, three-dimensional pits recorded as data on the optical disk as in the above embodiment have almost constant step heights and shapes, and correction can be performed using a fixed phase compensation plate corresponding to these pits. However, in the embodiment shown in FIG. 55, the edge height and shape of the object 464 are not always constant. Thus, in this embodiment, the detected edge detection signal is analyzed, and a phase compensation plate optimized to the detected edge is used, thus providing a position detection apparatus which can correspond to various edge heights and shapes. More specifically, the output from the differential amplifier 474 is input to the phase compensation plate controller 475 to obtain the peak value of the amplitude of the edge detection signal. The peak value is compared with a preset value, and an error signal between the two values is fed back to the compensation amount of the phase compensation plate 465, thus executing control to increase the peak value. In this case, in order to detect the correction direction of the compensation amount, a wobbling method for wobbling the phase compensation amount by a small amount at a frequency $f_w$ higher by 10 times or more (if possible) than the highest frequency $f_c$ of edge position detection so as to detect a control error signal in the frequency range of $f_w$, and controlling the phase compensation amount in the frequency range of $f_c$ is preferably adopted. Note that control of the compensation amount of the phase compensation plate 465 normally adopts a method of tilting or rotating the compensation plate 465. However, the present invention is not limited to specific control means, and various other control means such as refractive index control using an electro-optical effect, variable thickness control, control of the optical path length of reference light using a piezo element, and the like, can be adopted.

In this manner, even in the position detection apparatus, since a conventional apparatus does not correspond to, in particular, the phase shift $\delta_d$ caused by diffraction, a difference between interference intensities among a plurality of states is increased in consideration of only predetermined heights without any edges or phase differences among phase regions of an object, and an edge can only be detected as an intermediate value of the difference. However, according to the present invention, by utilizing a phenomenon in that a phase shift of diffracted waves by the edge is modulated in the positive or negative direction with respect to the phases of these unit regions, the intensity obtained by wave-mixing interference of diffracted wavefronts by the edge is optimized, thereby remarkably improving quality of the edge detection signal and reliability of the position detection apparatus.

Figure 56:
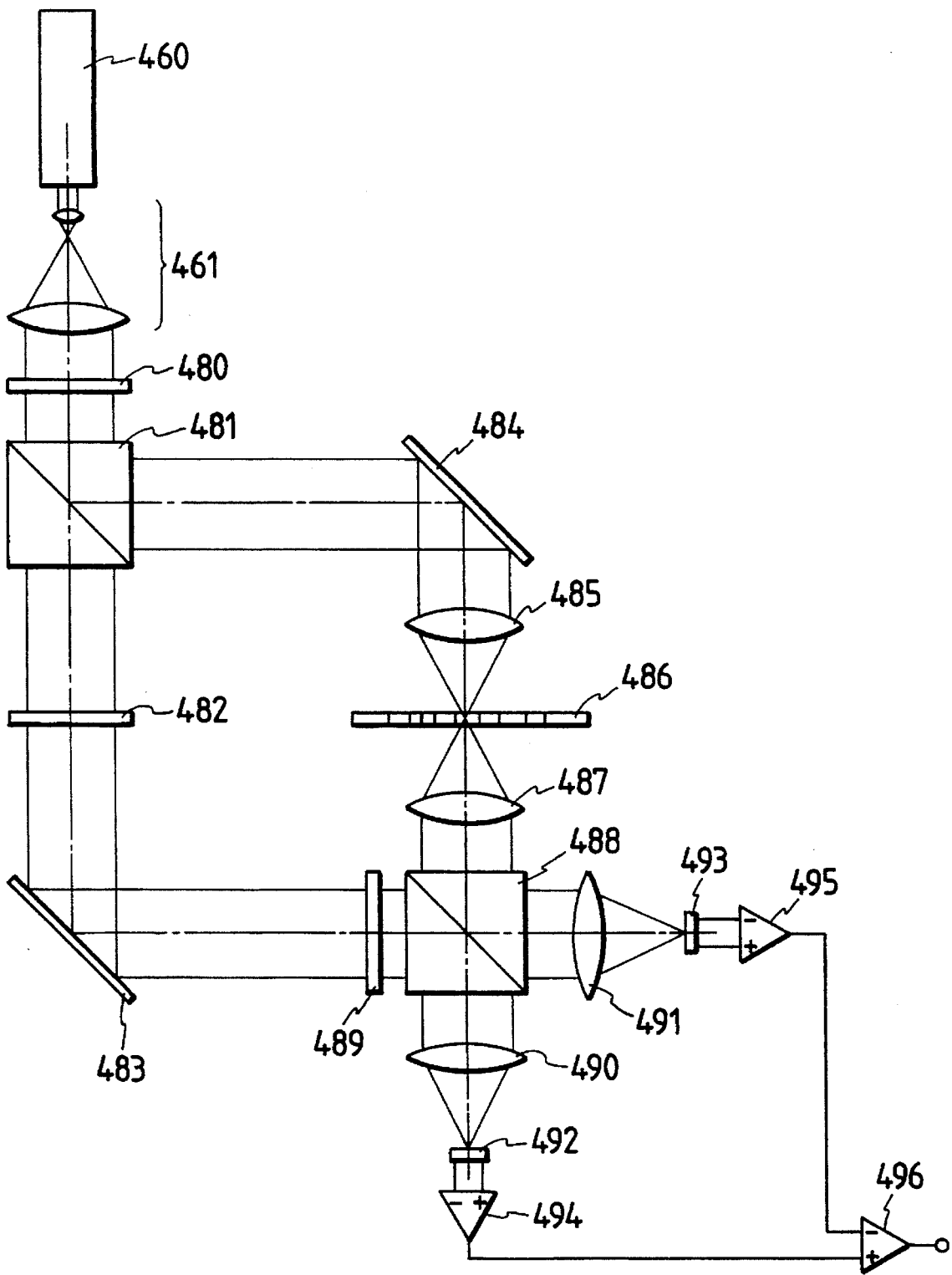
FIG. 56 is a diagram showing an embodiment of an optical encoder.

FIG. 56 shows still another embodiment of the present invention. In this embodiment, the present invention is applied to an encoder using a holographic phase grating. The encoder shown in FIG. 56 includes the laser 460 and the expander 461, which are the same as those in the embodiment shown in FIG. 55, a halfwave plate 480 for rotating polarized light through 45°, a polarization beam splitter 481, a phase compensation plate 482, mirrors 483 and 484, pickup lenses 485 and 487, a holographic phase grating 486, a beam splitter 488, a halfwave plate 489 for rotating polarized light through 90°, sensor lenses 490 and 491, two-divided sensors 492 and 493, and differential amplifiers 494, 495, and 496. S-polarized light reflected by the polarization beam splitter 481 forms a spot on the phase grating 486 via the mirror 484 and the pickup lens 485. Light diffracted by the edge of the phase grating 486 is guided to the beam splitter 488 by the pickup lens 487, and is wave-mixing interfered with a reference wave. P-polarized light transmitted through the polarization beam splitter 481 is subjected to phase compensation of the phase compensation plate 482 to correct a phase $\delta_o$ as a total of a phase shift $\delta_d$ of s-polarized light diffracted by the phase grating 486, a phase shift caused by the optical path length difference from s-polarized light, and a phase shift caused by reflection of optical elements, so that a phase difference of light from s-polarized light side on the sensors 492 and 493 on the re-imaging planes partially becomes an integer multiple of π. Reflected light transmitted through the polarization beam splitter 481 is converted into s-polarized light by the half-wave plate 489 via the mirror 483, and is wave-mixing interfered with s-polarized light as diffracted waves from the phase grating 486. In this case, since the beam splitter 488 constitutes a film for causing a phase shift of πrad in transmitted light upon reflection of reflected s-polarized light the two emerging light beams from the beam splitter 488 are wave-mixing interference waves having a relative phase difference of π therebetween, and a differential detection arrangement is realized. The wavefronts on re-imaging planes of diffracted wavefronts by the phase grating on the sensors 492 and 493 are those shown in FIGS. 51A to 51G, and those which are phase-shifted by π. In this case, the phase difference of the edge portion of the phase grating 486 corresponds to an integer multiple of π as in the previous embodiment. However, the application of the present invention is not disturbed by the phase difference of the phase grating 486, as has been described above. In this manner, conventionally, if the grating pitch of the encoder is decreased to increase the resolution, signal quality is deteriorated due to the diffraction phenomenon of light, and it is impossible to achieve a high-resolution encoder. However, according to the present invention, a high-resolution encoder can be realized by positively utilizing the diffraction phenomenon of the edge.

Figure 57:
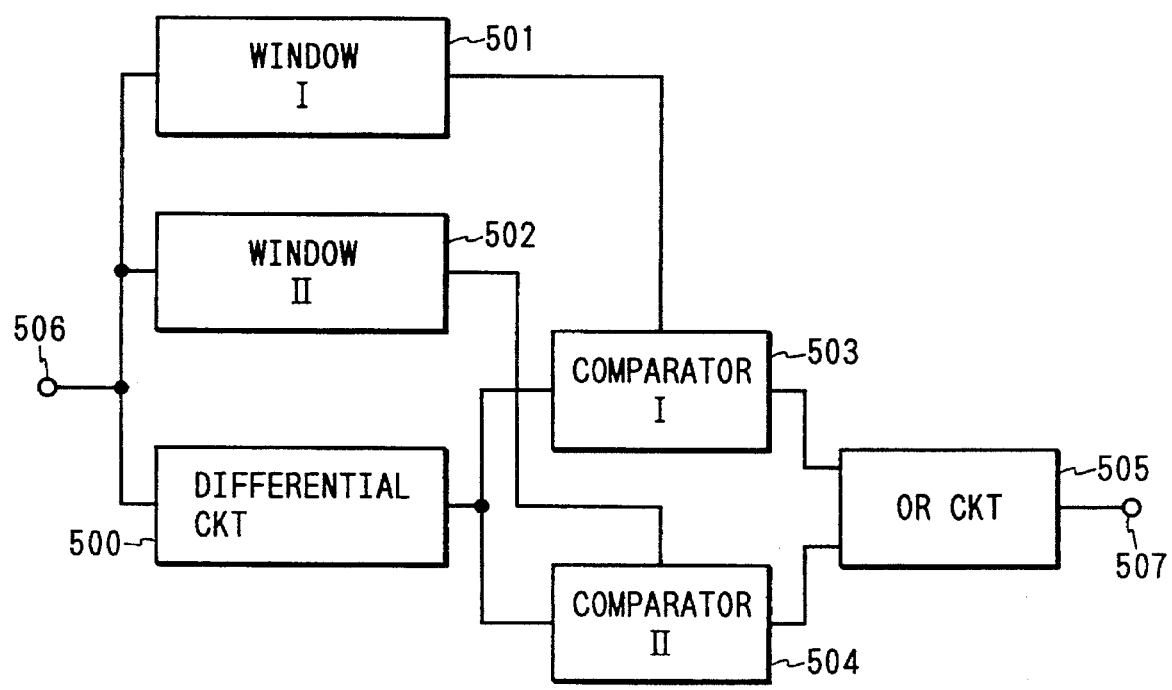
FIG. 57 is a block diagram of a processing circuit.

Processing of an edge detection signal waveform obtained by the present invention will be explained below. FIG. 57 is a block diagram for explaining the signal processing. An apparatus shown in FIG. 57 includes an input terminal 506 for receiving an edge detection signal obtained by each of the above-mentioned plurality of embodiments, a differential circuit 500, an upward waveform window circuit I 501, a downward waveform window circuit II 502, comparators I 503 and II 504 corresponding to these window circuits, and an OR circuit 505 for logically ORing pulse trains. FIGS. 58A to 58G show waveforms in the respective circuits.

Figure 58:
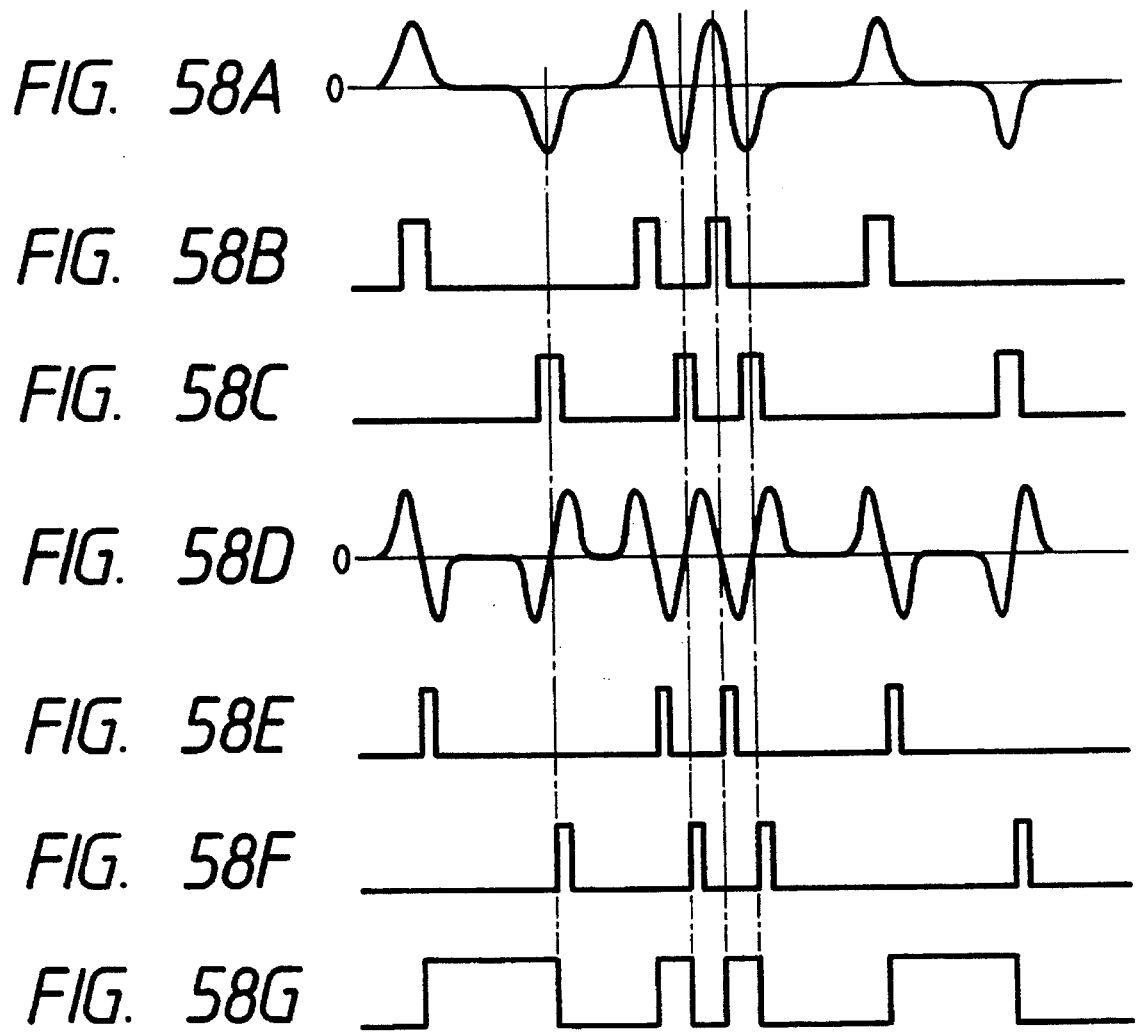
FIGS. 58A to 58G are charts showing signal waveforms.

FIG. 58A shows an edge detection signal. At edge portions, upward and downward pulses are generated. If the edge interval is large, these pulses become isolated pulses, and if the edge interval is small, these pulses become sinusoidally coupled pulses. When the edge interval is further decreased, these pulses are modulated (e.g., the pulse height is decreased) by inter-code interference. From the edge detection signal, the window circuits 501 and 502, which respectively have positive and negative threshold values, obtain window waveforms shown in FIGS. 58B and 58C respectively corresponding to the upward and downward pulses. The window width is decreased when edges appear at a high density as compared to isolated pulses. The differential circuit 500 obtains a differential waveform shown in FIG. 58D, i.e., an S-shaped pattern having zero-crossing points corresponding to the edge portions. The comparators 503 and 504 detect the zero-crossing points from the differential waveform shown in FIG. 58D respectively using the upward and downward window waveforms shown in FIGS. 58B and 58C, thus obtaining pulse trains shown in FIGS. 58E and 58F, which indicate the edge positions by one-shot pulses. These pulse trains are logically ORed by the OR circuit 505 to obtain a waveform shown in, e.g., FIG. 58G, in which L and H levels are inverted in correspondence with the edge positions. In this manner, the edge positions are detected.

In the plurality of embodiments described above, the present invention is applied to apparatuses of different applications. As described above, even when an edge where light is diffracted is defined by either a difference in refractive index or a step, since diffracted wavefronts are demodulated, and the phase distribution changes as long as the phase difference is not 0, detection according to the present invention can be applied in principle. Therefore, for example, the grating in the embodiment shown in FIG. 56 may have three-dimensional edges (concave-convex type). As information represented by phase edges, digital data in an optical memory and position data in an encoder have been exemplified. However, the present invention is not particularly limited to these, but may be applied to analog data or two-dimensional image data. For example, in the embodiment shown in FIG. 52, the present invention can be applied to image data by two-dimensionally scanning the light spot.

Furthermore, the two-divided sensor is always arranged on the pupil plane or the re-imaging plane in the above descriptions. Of course, a place for detecting a change in diffracted wavefront is not limited to these two points. For example, the change in diffracted wavefront can be detected in a convergent or divergent light beam. Of course, to use the two-divided sensor is not the concept of the present invention, and an example of detecting asymmetricity by differential detection of the two-divided sensor is explained as the simplest means for correcting a phase distribution including diffraction, emphasizing nonuniformity of the interference intensity distribution, and detecting the nonuniformity. Therefore, an optimal spatial divided method for detecting nonuniformity can also be adopted. In addition, a detection method for calculating outputs from a sensor unit, which is divided into three or more portions is also available. Furthermore, in the embodiments shown in FIGS. 55 and 56, a two-dimensional CCD camera may be placed at the two-divided sensor to detect the interference fringe intensity distribution and the formed spot as two-dimensional images, and a change in intensity distribution may be detected by combining various image processing operations so as to obtain three-dimensional information such as the edge position, depth, and the like.

As described above, according to the present invention, in an optical detection apparatus for radiating a laser beam onto a phase object, guiding light transmitted through/reflected by the phase object to a photodetector, and detecting a characteristic of the phase object, the photodetector detects an interference intensity distribution obtained by causing a diffracted wavefront from the phase object to be wave-mixing interfered with a reference wavefront, and the apparatus has a phase compensation plate for setting a relative phase difference between a total phase obtained by superposing phase modulation caused by polarization characteristics of the phase object and spatial phase modulation by the diffracted wavefront from the phase object, and a phase of the reference wavefront to be substantially equal to an integer multiple of π in a spatial partial region.

According to the present invention, as described above, diffracted wavefronts from various edges and other phase changes due to optical elements are phase-corrected to optimize a phase difference from reference wavefronts so as to emphasize nonuniformity of the interference intensity distribution, and to improve the degree of modulation of a detection signal, thereby improving reliability of detection precision.

The total phase includes phase modulation by optical elements in an optical path from the phase object to the photodetector.

The phase object is a magnetooptical domain, the characteristic of the phase object is a magnetic wall of the magnetooptical domain, the total phase is a Kerr component phase, and the reference wavefront is a Fresnel component.

Still another embodiment of the present invention will be described hereinafter.

According to an embodiment of the present invention to be described below, a light spot focused to a substantially diffraction limit by an objective lens is used, some light components from diffracted light from a recording domain equal to or smaller than the size of the light spot are converted to a new diffraction pattern at a position substantially conjugate with the light spot via the objective lens, a polarization element, and a re-imaging lens, the new diffraction pattern is photoelectrically converted by a sensor unit obtained by integrating a wavefront splitting element, an image duplicating element, and a photodetector having a plurality of light-receiving regions, and outputs from the sensor unit are calculated to obtain a good spatial differential signal, thereby detecting the edge of a recording domain equal to or smaller than the size of the light spot.

According to the present invention, in an optical information reproduction apparatus for radiating linearly polarized light onto an information recording medium, and optically detecting a boundary portion of an information pit from light reflected by the medium when information is recorded and/or reproduced on and/or from the information recording medium, which has a plurality of tracks, and records information pits according to a difference in direction of magnetization, by utilizing an interaction among light, heat, and magnetism, a wavefront splitting element and a circularly polarized light splitting element are arranged in an optical path of the reflected light, the reflected light is split into two light beams in a direction parallel to the track by the wavefront splitting element, each of the two light beams is split into right- and left-handed circularly polarized light beams by the circularly polarized light splitting elements, and the boundary portion of the information pit is detected from a change in light quantity of these four light beams, thereby reproducing information.

In a similar magnetooptical information recording/reproduction apparatus, a halfwave plate for influencing an almost half light beam, and a circularly polarized light splitting element are arranged in an optical path of the reflected light, and the boundary portion of the information pit is detected by a change in light quantity of two light beams, i.e., right- and left-handed circularly polarized light beams transmitted through these elements.

Figure 59:
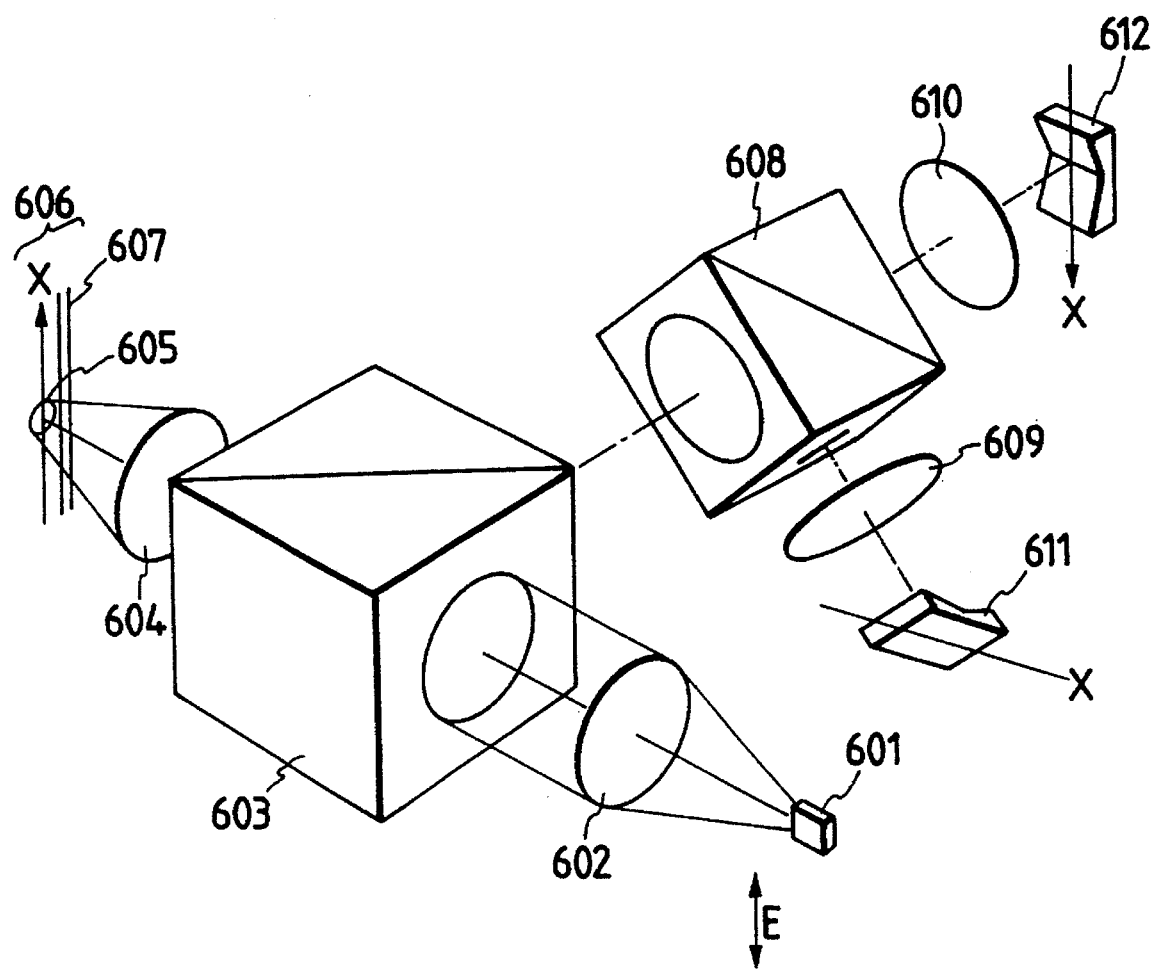
FIG. 59 is a perspective view of an optical head according to still another embodiment of the present invention.

The embodiment of the present invention will be described in detail below with reference to the accompanying drawings. FIG. 59 schematically shows an optical head of an optical information reproduction apparatus for reproducing information from a magnetooptical recording medium according to the present invention. Referring to FIG. 59, the optical head comprises a semiconductor laser 601 for emitting linearly polarized light (the direction of its electric field vector is indicated by E) of a wavelength λ (λ=830 nm), a collimator lens 602 for collimating the light beam into a parallel light beam, a first polarization beam splitter 603 for transmitting most of polarized light components (s-polarized light) in the E direction, and reflecting 100% of polarized light components (p-polarized light) in a direction perpendicular to the E direction, and an objective lens 604. These elements constitute a projection optical system. A projected light spot 605 focused to a diffraction limit by the objective lens 604 is formed on a magnetooptical disk. The magnetooptical disk has an information track 606, and a guide groove 607 for tracking the projected light spot 605. The information track 606 extends in an X direction, and the edge of an information magnetic domain (to be simply referred to as a domain hereinafter) to be detected extends in a direction perpendicular to the X direction. A second polarization beam splitter 608 originally transmits 100% of p-polarized light, and reflects 100% of s-polarized light. In this embodiment, however, the second polarization beam splitter 608 is arranged to be inclined through 45° about the transmission optical axis in the E direction so as to attain differential detection. A sensor lens 609 focuses light reflected by the second polarization beam splitter to form a light spot, and a sensor lens 610 focuses light transmitted through the second polarization beam splitter. These sensor lenses are aberration-corrected with a precision as high as that of the objective lens 604. Prism-integrated split sensors 611 and 612 have division lines extending in the X direction of the domain edge.

A linearly polarized light beam (s-polarized light) emitted from the semiconductor laser 601 is collimated into a parallel beam by the collimator lens 602, and the parallel beam is transmitted through the first polarization beam splitter 603. The parallel beam is then focused as the light spot 605 on the information track 606 formed on a magnetooptical recording film (e.g., TbFeCo) by the objective lens 604 via a transparent substrate (not shown) of the magnetooptical disk. Note that a beam shaping prism for converting an elliptic light quantity distribution of the laser 601 into a circular light quantity distribution is normally inserted after the collimator lens. However, the beam shaping prism is omitted from FIG. 59.

Reflected light, which receives the magnetic Kerr effect (rotation of the direction of polarization) by the magnetooptical recording film, also has polarized light components (p-polarized light) in a direction perpendicular to the E direction. These polarized light components are reflected by the first polarization beam splitter 603. On the other hand, some of the polarized light components (s-polarized light) in the E direction are reflected by the first polarization beam splitter 603, and propagate toward the second polarization beam splitter 608. Note that a beam splitter is normally inserted between the first and second polarization beam splitters, and a light beam reflected by the beam splitter is guided to a focus error detection optical system for auto-focusing control and a tracking error detection optical system for auto-tracking control. However, in this embodiment, a description thereof will be omitted.

Light incident on the second polarization beam splitter selects the same direction of polarization as that obtained when the angle of an analyzer is set at ±45° with respect to the E direction, and is split into reflected light and transmitted light. As a result, relative phases of magnetooptical signals included in the reflected light and transmitted light are shifted by 180°, and the signals having opposite phases are obtained. When these signals are differentially detected, a double magnetooptical signal from which in-phase components such as light source noise of the laser 601 and medium noise such as a variation in Fresnel reflectance of the medium are removed can be obtained.

The edge detection principle utilizing a diffraction phenomenon according to the present invention is the same as that described above with reference to FIGS. 43A to 45G, and a detailed description thereof will be omitted.

When changes in intensity distribution of the transmitted light and reflected light of the second polarization beam splitter 608 are differentially detected by, e.g., two-divided sensors on the far field planes, a differential signal becomes zero in a region without any edges (in FIGS. 45A and 45G). When an edge is present, the light intensity distribution of interfered and synthesized wavefronts has asymmetricity due to a phase difference between elliptically polarized light components. When an edge is present on the optical axis (FIG. 45D), the differential signal becomes maximum or minimum, thus allowing edge detection.

According to the present invention, as shown in FIG. 59, the transmitted light and reflected light of the second polarization beam splitter 608 are further focused by the sensor lenses 609 and 610 to form light spots. In this case as well, since a diffraction phenomenon occurs according to the present invention, far field detection is not the same as re-imaging detection.

Figure 60A:
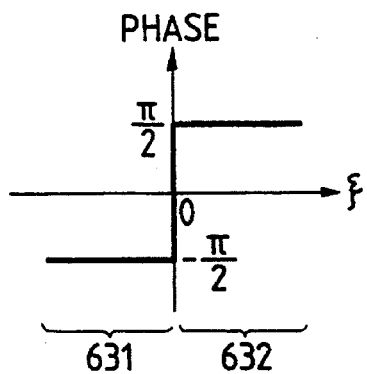
FIGS. 60A to 60F are graphs for explaining a polarization distribution according to the present invention.
Figure 60B:
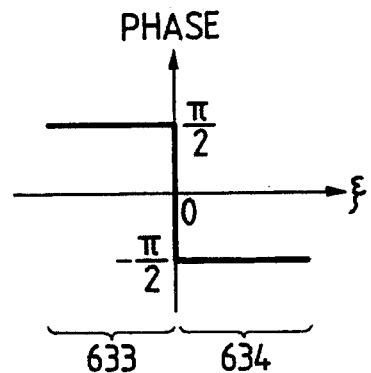
Figure 60C:
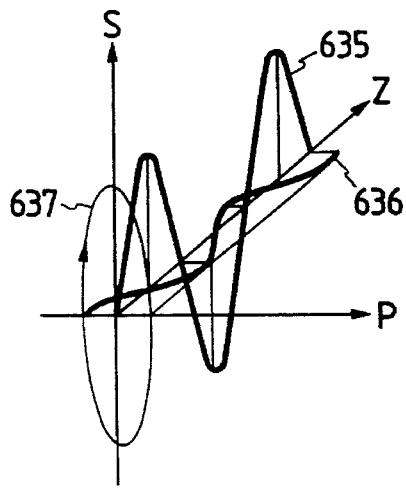
Figure 60D:
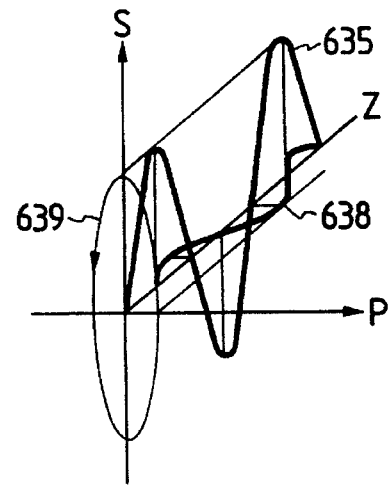

A model in that Fourier transform images of orthogonal linearly polarized light components after projection and synthesis of p-polarized light and Gaussian s-polarized light on ±45° planes of polarization are formed at spot positions of the sensor lenses 609 and 610 will be examined below. Since a wavefront obtained by synthesizing p-polarized light having a uniform phase distribution (e.g., FIG. 45A or 45G) and similar s-polarized light also has a uniform phase distribution and a Gaussian amplitude distribution, its Fourier transform image has a uniform phase distribution and a Gaussian amplitude distribution, and its intensity distribution becomes a Gaussian distribution. When linearly polarized light components to be synthesized have asymmetrical phase distributions due to the presence of an edge, as shown in FIGS. 45B to 45F, the distribution of synthesized linearly polarized light also becomes asymmetrical. For example, in the case of FIG. 45D, elliptic conversion due to the Kerr effect is ignored for the sake of simplicity, and examination will be made using models shown in FIGS. 43B and 43C in which only the plane of polarization is rotated. As described above, the intensity of synthesized light becomes a gray level. As for wavefronts incident on the second polarization beam splitter 608, refer to FIGS. 60A and 60B. FIGS. 60A and 60B respectively show the phase distributions of diffracted wavefronts by a 0/π edge and a π/0 edge as in those showing the phase distributions in FIGS. 45A to 45G. FIGS. 60C and 60D disclose polarization states by p-polarized light having these phase distributions, and s-polarized light having uniform phase distributions (0 rad). A region 631 wherein the phase of p-polarized light is −π/2 in FIG. 60A is expressed by a waveform 636 in FIG. 60C, and when this waveform is synthesized with an s-polarized light waveform 635, right-handed elliptically polarized light whose major axis coincides with the direction of s-polarized light is obtained. Similarly, p-polarized light in a region 632 is expressed by a waveform 638 in FIG. 60D, and when this waveform is synthesized with the s-polarized light waveform 635, left-handed elliptically polarized light 639 is obtained although it has an elliptic shape as in FIG. 60C. Similarly, polarized light in a region 633 for another edge in FIG. 60B is expressed by FIG. 60D, and polarized light in a region 634 is expressed by FIG. 60C. Although the influence of an amplitude is not described in FIGS. 60A to 60F, since the amplitude of p-polarized light on the optical axis is 0, as shown in FIG. 45D, linearly polarized light, i.e., s-polarized light is obtained. However, as the position is separated away from the optical axis, and approaches a peripheral portion, the amplitude of s-polarized light of the Gaussian distribution becomes small. Also, as shown in FIG. 45D, since the amplitude of p-polarized light is large due to diffraction, the ellipticities of elliptically polarized light beams shown in FIGS. 60C and 60D change. For this reason, at the edge of a pupil in the ξ direction, if the amplitude of s-polarized light is sufficiently smaller than that of p-polarized light, the s-polarized light has a polarization state almost approximate to the p-polarized light.

Figure 60E:
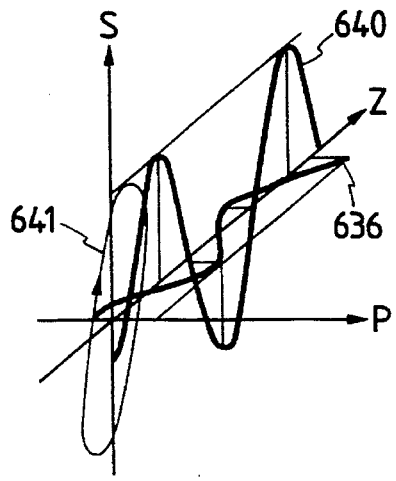
Figure 60F:
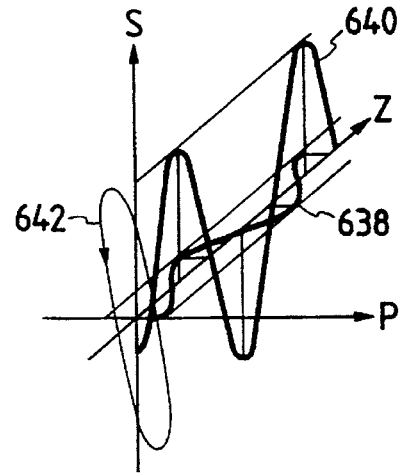

In the above description, elliptic conversion due to the Kerr effect is ignored for the sake of simplicity (the models in FIGS. 43B and 43C). In edge detection utilizing diffraction, elliptic conversion due to the Kerr effect, and the phase difference between s-polarized light and p-polarized light are very significant, and cannot be ignored. FIGS. 60E and 60F show vibrations of polarized light corresponding to FIGS. 60C and 60D in consideration of an effect of forming elliptically polarized light since the phase of p-polarized light is slightly shifted from that of s-polarized light due to the Kerr effect. FIGS. 60E and 60F show models obtained by equivalently giving the phase difference to s-polarized light 640. However, as can be understood from the above description, elliptically polarized light waveforms 641 and 642 having different Kerr rotational angles and different Kerr ellipticities are obtained. In an intermediate state shown in FIGS. 45B, 45C, 45E, and 45F, since the phase and amplitude distributions are more complicated, the spatial distribution of a wavefront obtained by synthesizing such p-polarized light and s-polarized light becomes further complicated. Therefore, a polarization state in which the Kerr rotational angle and the Kerr ellipticity are nonuniformly distributed is obtained.

More specifically, in domain edge detection using a diffraction limit spot according to the present invention, the polarization state is spatially nonuniform in the far field region due to the Kerr effect and the diffraction effect, and has a distribution, which cannot be described by only the Kerr effect of the domain, unlike in the case of the geometric and geometrical optical reproduction principle. The wavefronts of such a polarization state after transmission and reflection by the second polarization beam splitter 608 will be examined below. Linearly polarized light obtained by projecting light onto an analyzer (±45°) becomes a wave obtained by respectively multiplying s- and p-polarized light components with cos(±45°) and sin(±45°), and superposing the product waveforms. For example, in the case of polarized light 637 in FIG. 60C, linearly polarized light becomes a synthesized wave of a projection component a·sinωt from s-polarized light and a projection component b·sin{ωt−(π/2)}=−b·cosωt from p-polarized light having a phase of −π/2 rad, and is expressed by $(a^2+b^2)^{-2} \cdot \sin\{\omega t - \tan(b/a)\}$. In this case, a and b are respectively the amplitudes of s- and p-polarized light components projected onto the analyzer, and ω is the angular frequency of light. In the case of FIG. 60D, linearly polarized light becomes a synthesized wave $(a^2+b^2)^{-2} \cdot \sin\{\omega t - \tan(b/a)\}$ of the projection component a·sinωt from s-polarized light 635 and a contribution component b{sinωt+(π/2)}=b·cosωt from p-polarized light 638. More specifically, the amplitude and phase of a synthesized wave are determined by the amplitudes to be synthesized, and in regions whose polarization states are expressed by FIGS. 60C and 60D, their phases are inverted from each other.

In general cases as shown in FIGS. 45B, 45C, 45E, and 45F, linearly polarized light becomes a synthesized wave $(a^2+2ab\cos\theta+b^2)^{-2}\sin[\omega t-\tan^{-1}\{b\cdot\sin\theta/(a+b\cdot\cos\theta)\}]$ of the projection component a·sinωt from s-polarized light and a projection component b·sin(ωt+θ) of p-polarized light having an arbitrary phase shift θ. More specifically, the amplitude and phase of synthesized linearly polarized light at each point change depending on the amplitudes and phases of two linearly polarized light components to be synthesized at the corresponding point, thus forming a linearly polarized light wavefront having further complicated spatial amplitude and phase distributions.

The above description can also be established for the strict Kerr effect examined in FIGS. 60E and 60F if the elliptic conversion effect is included in the phase θ of the normalized projection component of p-polarized light, and the phase shift of s-polarized light is returned to an original state. When orthogonal linearly polarized light wavefronts obtained as described above are focused again by the lenses 609 and 610 to form spots, the patterns further change due to diffraction. For example, upon examination of FIGS. 60A, 60C, and 60D corresponding to FIG. 45D described above, the focused wavefronts are far field wavefronts having wavefront distributions expressed by $(a^2+b^2)^{-2}\sin\{\omega t-\tan(b/a)\}$ and $(a^2+b^2)^{-2}\sin\{\omega t-\tan^{-1}(b/a)\}$ to have the optical axis as a boundary as in the above-mentioned calculations. More specifically, when the phases are $\pm\tan^{-1}(b/a)$, since the Kerr effect is very small, the absolute value of the phase difference is small when b<<a. As can be seen from the distribution of the amplitude $\underline{a}$ roughly expressed by FIG. 45G and the distribution of the amplitude b roughly expressed by FIG. 45D, the absolute value of the phase increases as the position is separated away from the optical axis, and the positive and negative levels are inverted to have the optical axis as the center. In addition, the amplitude distribution is symmetrical since it is an average of square sums. The re-imaging plane pattern of the wavefront can be calculated by, e.g., Fourier transform. In this case, a scaler model will be examined for the sake of simplicity. That is, the amplitudes of s- and p-polarized light components on the far field are spatially uniformly attenuated by the analyzer, and a pattern obtained by superposing Fourier transform images by the sensor lens becomes a diffraction pattern of each re-imaging spot. A change in re-imaging diffraction pattern in the present invention is the same as that described above with reference to FIGS. 51A to 51G, and a detailed description thereof will be omitted.

Figure 61:
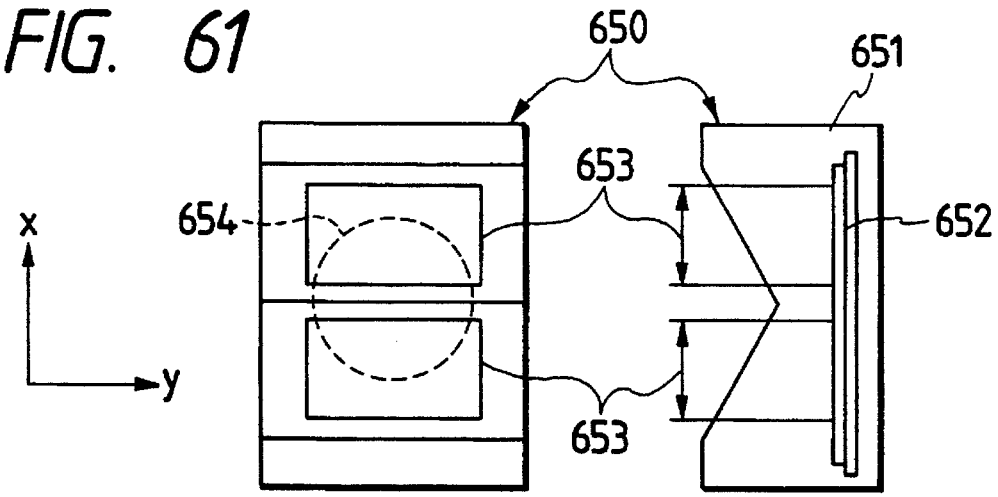
FIG. 61 is a view showing a sensor unit according to still another embodiment of the present invention.
Figure 62:
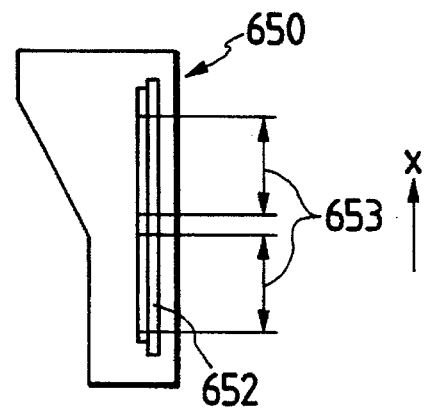
FIG. 62 is a view showing a sensor unit according to still another embodiment of the present invention.

FIG. 61 shows an arrangement of the prism-integrated split sensor 611 or 612 of the embodiment shown in FIG. 59. A prism-integrated split sensor 650 is formed by mold-packaging an Si-PIN photodiode 652 on an Al frame with an optically transparent polycarbonate resin. Note that a gap is formed between two-divided light-receiving regions 653 so that optical, electrical, and thermal crosstalks between the regions can be ignored. A mold 651 has a prism shape. Since two triangular prisms are coupled, an incident light beam 654 is split into two wavefronts, and the split light beams are guided to the corresponding light-receiving regions 653. With this arrangement, the above-mentioned spatial differential detection of the re-imaging spot can be performed. As for crosstalks between the light-receiving regions, when the gap is as small as about several tens of μm, an electrical crosstalk due to diffusion of generated carriers is dominant, and can be eliminated by, e.g., a reverse bias voltage. However, if the crosstalk is eliminated by this means alone, a power supply of several tens of V is required, and a dark current is undesirably increased.

According to the present invention, when a light beam is spatially split by the optical wavefront splitting means, and signals photoelectrically converted by the light-receiving regions 653 with a small crosstalk can be obtained, a differential amplifier can output a differential signal with a small crosstalk from these signals. According to the present invention, since the re-imaging lenses 609 and 610 are sufficiently aberration-corrected, the re-focusing diffraction pattern is as small as several to several tens of μm. In normal detection using a divided sensor, since a practical gap of the sensor is as large as 5 to 15 μm, a good differential signal with a small crosstalk can be obtained according to the present invention. The focal length of each of the re-imaging lenses 609 and 610 may be prolonged to form a re-imaging diffraction pattern in an enlarged scale. However, with this method, when a re-imaging diffraction pattern of about 100 μm is to be obtained with the objective lens 604 having a focal length of 4 to 5 mm, the focal length of each of the re-imaging lenses 609 and 610 must be set to be several hundreds of mm, and the apparatus becomes large in size. For this reason, this method is not practical.

In optical spatial splitting according to the present invention, the wavefront splitting portion of the prism 651 of the sensor 650 is preferably arranged at the re-imaging position, i.e., the focal point position of the re-imaging lens 609 or 610. With this arrangement, the influence of additional diffraction caused by the split line of the prism 651 can be avoided as much as possible, and the light-receiving regions 653 which can sufficiently cover spread of patterns due to the diffraction can be arranged at the above-mentioned crosstalk-reduced relative positions. In other words, after spatial splitting, the total split light quantities need only be independently detected, and the light quantity distribution due to the diffraction pattern in the light quantity need not be detected. This is another feature of the present invention. Therefore, the split line position of the prism 651 can be moved in the optical axis direction within a range free from a change in pattern, which causes a large change in differentially detected signal waveform such as reversal of asymmetricity of the re-imaging diffraction pattern. Furthermore, according to the present invention, since the prism 651 portion for splitting a light beam into wavefronts and the light-receiving regions 653 are integrated, the position adjustment can be facilitated. In the Y-axis direction in the focal plane of the entire sensor 650, adjustment is made to maximize the sum signal of the two sensor outputs, and in the X-axis direction, temporary adjustment is made to cause the two sensor outputs to be equal to each other, and to minimize a difference signal therebetween. Thereafter, fine adjustment including adjustment in the optical axis direction, and in the rotational direction about the split line can be performed.

FIGS. 62 to 67 show other embodiments of the present invention. In the embodiment shown in FIG. 62, a prism portion for splitting a light beam into wavefronts is arranged on one side portion of the sensor. With this arrangement, adjustment can be simplified. In the embodiment shown in FIG. 61, the relative moving amount of the two split beams is large with respect to movement, in the X-direction, of the sensor main body 650, and to rotation thereof about the split line. However, in the embodiment shown in FIG. 62, the moving amount of a portion without the prism effect is small, and a crosstalk between movements of the two light-receiving regions is small, resulting in easy adjustment.

Figure 63:
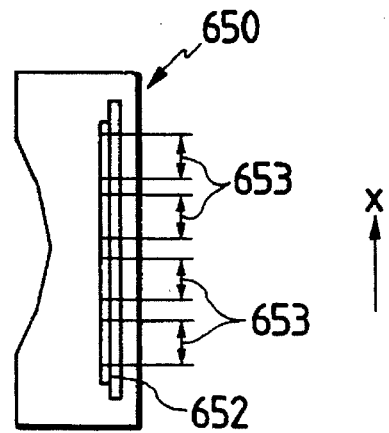
FIG. 63 is a view showing a sensor unit according to still another embodiment of the present invention.

FIG. 63 shows an embodiment wherein the sensor 650 is split into four regions in the edge directions. According to this embodiment, the present invention can be applied to a case wherein a corrected edge signal is obtained not only by calculating a difference between simply spatially two split light beams but also by calculating signals from multi-split light-receiving regions (a wavefront splitting prism is constituted by combining four triangular prisms to guide a light beam to the corresponding light-receiving regions).

Figure 64:
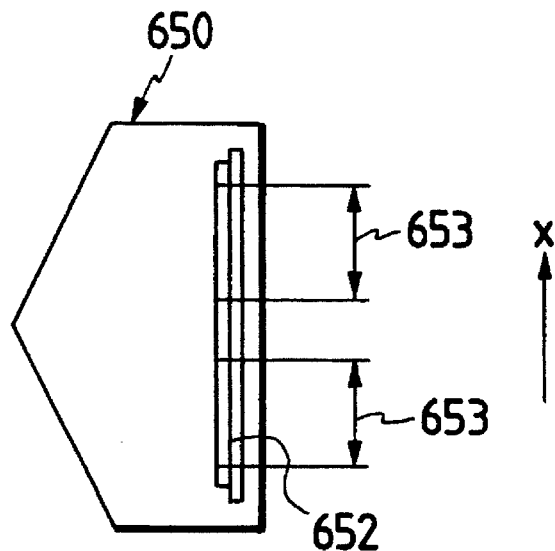
FIG. 64 is a view showing a sensor unit according to still another embodiment of the present invention.

In the embodiment shown in FIG. 64, light beams split by a prism are guided to corresponding light-receiving regions to cross each other. When this prism is formed by resin molding, since molds are used, both convex and concave prism shapes can be selected, as shown in FIG. 64, according to the molding precision of the molds and easiness of mold release. In particular, according to the present invention, since the split line and a portion near the split line require high precision, a glass encapsulation method, a method of processing and polishing the prism shape using another dielectric, or a method of additionally processing and polishing a mold may also be available. For this reason, the degree of freedom of selection of the concave and convex shapes is important.

Figure 65:
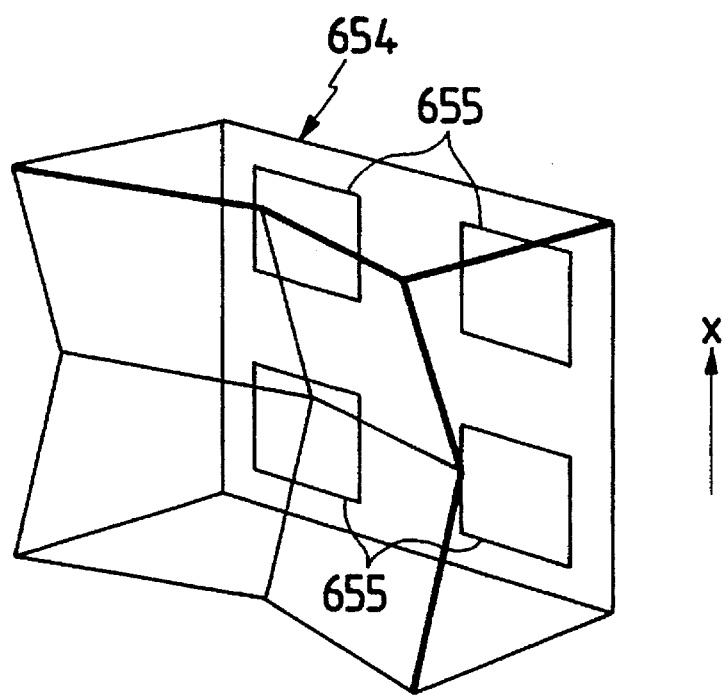
FIG. 65 is a view showing a sensor unit according to still another embodiment of the present invention.

In the embodiment shown in FIG. 65, the present invention is applied to, e.g., edge detection using a matrix-shaped four-divided sensor called "four-leaf clover detection" disclosed in Japanese Patent Application No. 4-47789. In this embodiment, the prism for splitting a light beam into wavefronts is formed, so that normal vectors of the four surfaces of the prism are directed in different directions. With this prism, a light beam incident at the center of the prism is split into wavefronts by the four prism surfaces, and are guided to the corresponding light-receiving regions 655.

Figure 66A:
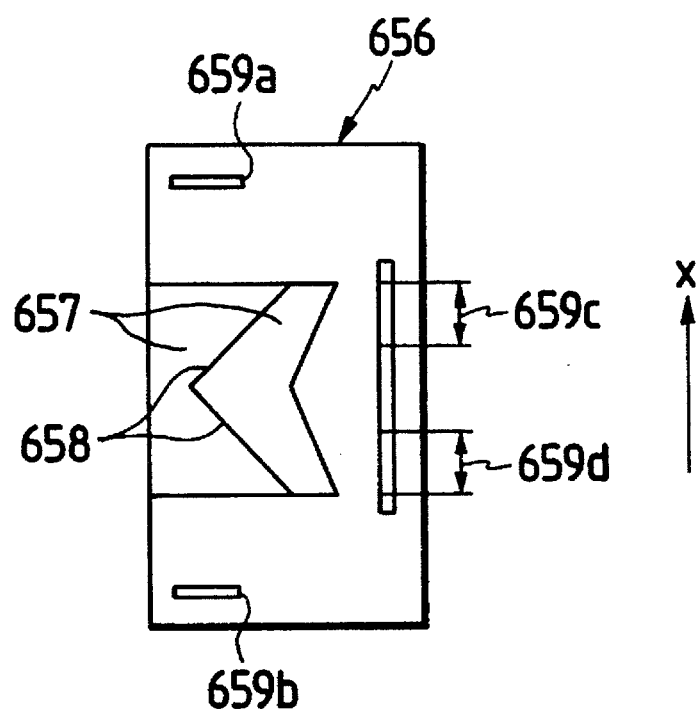
FIGS. 66A and 66B are views showing a sensor unit according to still another embodiment of the present invention.
Figure 66B:
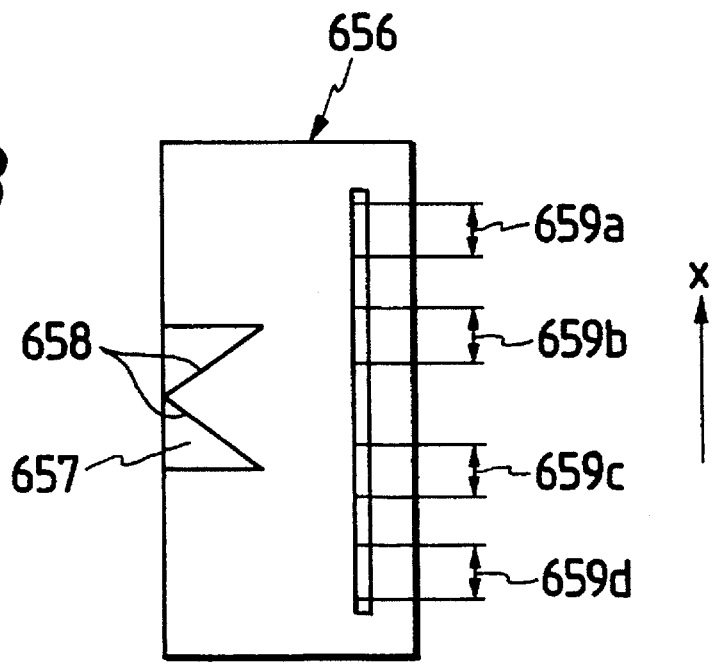

In the embodiment shown in FIGS. 66A and 66B, in an optical system of the same optical head as that shown in FIG. 59, particularly, the second polarization beam splitter 608, and the split sensors 611 and 612 are integrated. In this case, the number of re-imaging lenses can be reduced to one, and a light beam focused by the re-imaging lens is caused to be incident on a sensor unit 656. The arrangement for rotating the second polarization beam splitter 608 about the optical axis as in the embodiment shown in FIG. 59 can also be realized in this embodiment. However, for the sake of simplicity, a halfwave plate is inserted in an optical path of a light beam guided to a detection optical system by the first polarization beam splitter to rotate the direction of polarization through 45°, and thereafter, the light beam is guided to the sensor unit 656 via the re-imaging lens. Such an arrangement will be described below. Referring to FIG. 66A, a prism 657 serves as both the second polarization beam splitter and a wavefront splitting prism. Each of polarization/splitting surfaces 658 of the prism 657 transmits polarized light in the plane of drawing of FIG. 66A, and reflects polarized light in a direction perpendicular to the plane of drawing of FIG. 66A. In this case, a re-imaging diffraction pattern is incident on each polarization/splitting surface 658 from the left side in FIG. 66A. The optical axis is caused to coincide with the center of the sensor unit 656, i.e., the split line of the polarization/splitting surfaces 658. Polarized light components in the direction perpendicular to the plane of drawing of FIG. 66A are spatially split into two beams by the polarization/splitting surfaces 658, and these two beams are respectively guided to light-receiving regions 659a and 659b. On the other hand, polarized light components in the direction parallel to the plane of drawing of FIG. 66A are transmitted through the polarization/splitting surfaces 658, are spatially split into two light beams by other splitting surfaces of the wavefront splitting prism 657, and are guided to light-receiving regions 659c and 659d. When the outputs from the light-receiving regions 659a and 659c are differentially amplified, a differential signal from which in-phase components are removed can be obtained, and a differential signal is similarly obtained from the outputs from the light-receiving regions 659b and 659d. Furthermore, when these differential signals are differentially amplified, a spatial differential signal can be obtained.

FIG. 66B shows an embodiment of a further simplified sensor unit 656. In this embodiment, split light-receiving regions are realized by split photodiodes on a single Si substrate. In this embodiment, light beams reflected and split by the polarization/splitting surfaces 658 are guided to the light-receiving regions 659a and 659d, and light beams transmitted through the surfaces 658 are guided to the light-receiving regions 659b and 659c. In this embodiment, the incident angle to each polarization/splitting surface 658 is different from that in a normal polarization beam splitter, and problems of a refractive index difference from the resin mold, film formation on the mold, and the like are posed. Thus, the polarization/splitting characteristics of the polarization/splitting surfaces 658 may be deteriorated, and sensitivity may be lowered due to an increase in light beam incident angle onto the light-receiving regions 659a and 659d.

In the embodiment shown in FIGS. 66A and 66B, the number of re-imaging lenses can be reduced to one as compared to the embodiment shown in FIG. 59, and the re-imaging lens 609 and an optical splitting system on the side of the sensor 611 in FIG. 59 can be omitted. Therefore, an arrangement in a single plane can be adopted, and the size of the optical head can be greatly reduced.

Figure 67A:
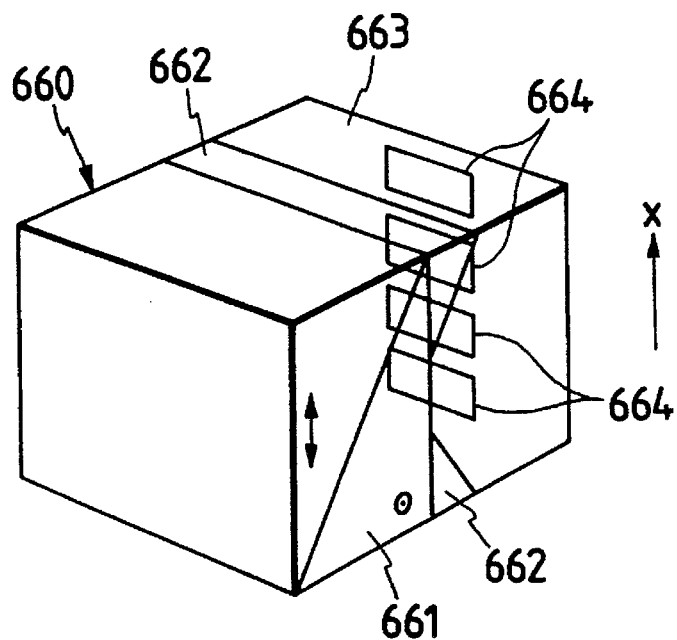
FIGS. 67A and 67B are views showing a sensor unit according to still another embodiment of the present invention.
Figure 67B:
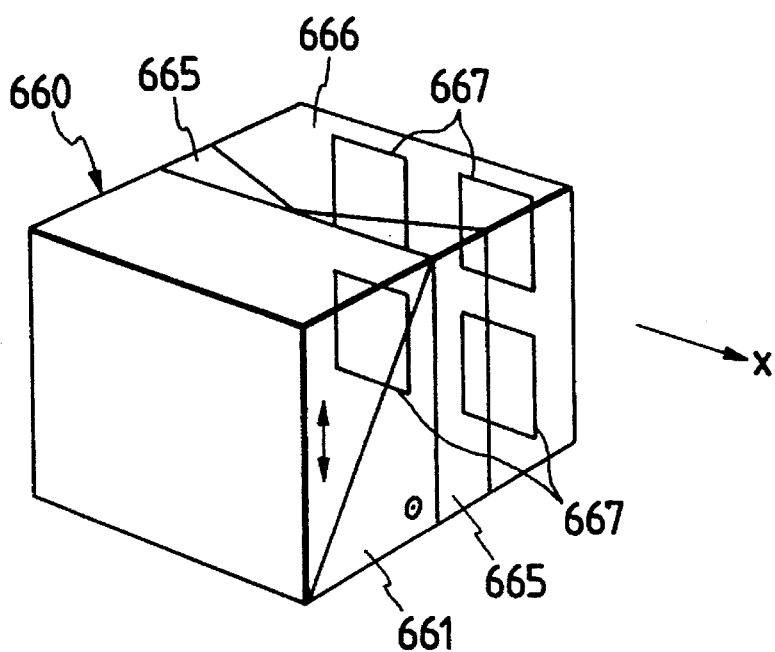

In the embodiment shown in FIGS. 67A and 67B, the second polarization splitter 608, and the split sensors 611 and 612 are integrated in the optical system of the optical head shown in FIG. 59 as in the embodiment shown in FIGS. 66A and 66B. In this embodiment, the number of re-imaging lenses can be reduced to one, and no halfwave plate is required. However, in this embodiment, for the sake of simplicity, the halfwave plate is inserted to rotate the plane of polarization through 45°. In this embodiment, an image duplicating element (a Wollaston prism, a Rochon prism, or the like) is used in place of the second polarization beam splitter 608. Referring to FIG. 67A, a sensor unit 660 has an integrated structure including a Wollaston prism 661, a wavefront splitting prism 662, a mold portion 663, and divided light-receiving regions 664. A re-imaging light beam incident on the Wollaston prism is split into two light beams along an ordinary ray and an extraordinary ray, and when these two light beams emerge from the Wollaston prism, they are split as two orthogonal polarized light beams with respect to the X direction, i.e., the direction parallel to the track. Furthermore, each of these light beams is spatially split into two beams by the wavefront splitting prism 662 to obtain a total of four light beams, and the four light beams are guided to the four light-receiving regions 664 divided in the X direction.

In this embodiment, signals are obtained from the two pairs of upper and lower light-receiving regions. When these signals are differentially amplified within one pair, a spatial differential signal is obtained. When the two spatial differential signals are further differentially amplified, a differential edge signal from which in-phase components are removed can be obtained. Of course, after in-phase components are removed by differentially amplifying signals from odd-numbered light-receiving regions in the X direction, and signals from the even-numbered light-receiving regions in the X direction, a differential signal may be obtained by differentially amplifying the two differential signals. In this embodiment, since the light-receiving regions can be arranged in a single plane as compared to the embodiment shown in FIG. 66A, the light-receiving regions can be constituted by a single multi-divided Si-PIN photodiode, thus achieving a compact structure. However, it should be noted that the Wollaston prism is more expensive than the polarization beam splitter.

The sensor unit 660 shown in FIG. 67B is also constituted by the Wollaston prism 661, a wavefront splitting prism 665, a mold portion 666, and a photodiode having four light-receiving regions 667. In this arrangement, the Wollaston prism is rotated through 90° from the arrangement shown in FIG. 67A with respect to the X direction parallel to the track, and guides four split light beams to four matrix-shaped regions. A light beam incident on the Wollaston prism is split into two orthogonal polarized light beams with respect to a direction perpendicular to the X direction by the exit surface of the Wollaston prism. Each of these polarized light beams is spatially split into two beams in the X direction by the wavefront splitting prism 665, and a total of four light beams are respectively guided to the four light-receiving regions 667. When signals from two pairs of upper and lower light-receiving regions 667 are differentially amplified each other, differentially detected signals for removing in-phase components are obtained, and when the signals obtained from the two pairs are differentially amplified, a differentially detected signal is obtained. The order of these calculations is not particularly limited. This embodiment is advantageous for formation of an integrated structure since the prism 665 need only have one wavefront split line, as compared to the embodiment shown in FIG. 67A. However, since the matrix-shaped, four-divided light-receiving regions are adopted, precision and adjustment become more strict not only in the X direction but also in the direction perpendicular thereto.

In the above-mentioned embodiments, only one edge is assumed to be present in a light spot 399 on the recording medium, as shown in FIG. 44, for the sake of convenience. However, the present invention detects an interaction between a recorded domain and a spot by utilizing the diffraction phenomenon, and can be applied to a case wherein a plurality of edges are present in the light spot.

In the above description, it is assumed that λ=0.83 μm and NA=about 0.5. Of course, when these parameters, the spot size, and the domain size are changed, the illustrated diffraction patterns change. However, the present invention can cope with these changes. In the above embodiments, in order to explain a difference in detection principle from the prior art, Fourier transform is used for the sake of convenience. However, the above-mentioned regions are non-applicable regions under the Kirchhoff's boundary conditions and should be analyzed strictly, and the Fourier transform results are different from results calculated by a numerical calculation such as a boundary element method using the Helmholtz's wave equation. However, no practical problem is particularly posed in explaining the information reproduction apparatus of the present invention.

Figure 68:
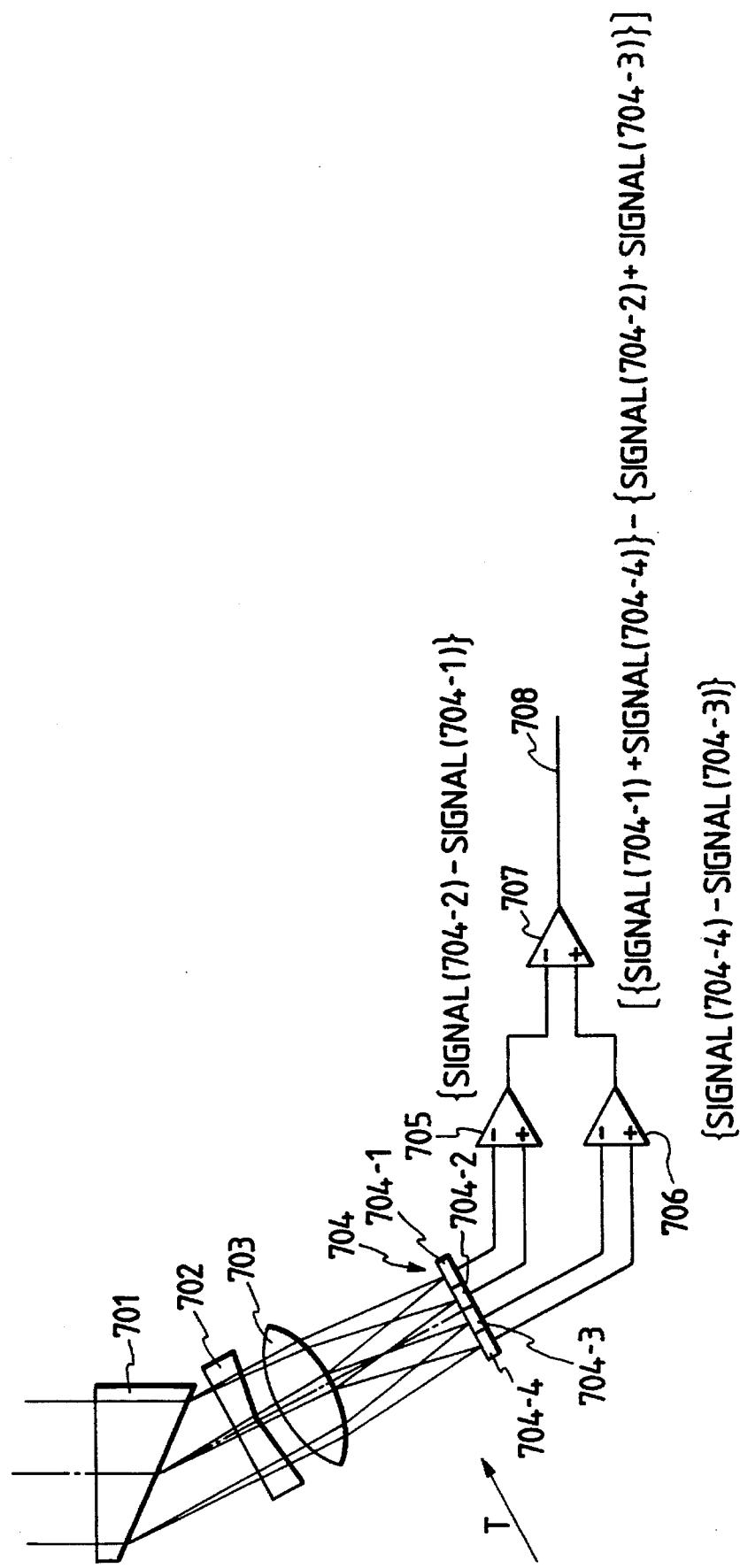
FIG. 68 is a diagram showing a reproduction optical system of an optical head used in a magnetooptical information recording/reproduction apparatus according to the present invention.

FIG. 68 shows an embodiment wherein the present invention is used in a reproduction optical system of an optical head of a magnetooptical information reproduction apparatus. Referring to FIG. 68, an optical rotatory power prism 701 serves as a circularly polarized light splitting element. Since the optical rotatory power prism 701 has different refractive indices for right- and left-handed circularly polarized light components, the right- and left-handed circularly polarized light components emerge from the prism at different refraction angles when a light beam reflected by a magnetooptical recording medium passes therethrough. A wavefront splitting element 702 splits a light beam in a direction (direction of an arrow T) parallel to a track. Furthermore, the optical system includes a condenser lens 703, and a four-divided photodetector 704. More specifically, of two light beams split in the direction parallel to the track, for example, left-handed circularly polarized light components of the right-side light beam are incident on a light-receiving surface 704-1 of the photodetector, and right-handed circularly polarized light components thereof are incident on a light-receiving surface 704-2. Left-handed circularly polarized light components of the left-side light beam are incident on a light-receiving surface 704-3, and right-handed circularly polarized light components thereof are incident on a light-receiving surface 704-4.

If detection signals obtained from these light-receiving surfaces are represented by signals (704-1), (704-2), (704-3), and (704-4), differential amplifiers 705 and 706 respectively output {signal (704-2)–signal (704-1)} and {signal (704-4)–signal (704-3)}. Furthermore, a differential amplifier 707 differentially detects [{signal (704-1)+signal (704-4)}–{signal (704-2)+signal (704-3)}], thereby obtaining an edge detection signal 708.

Figure 69:
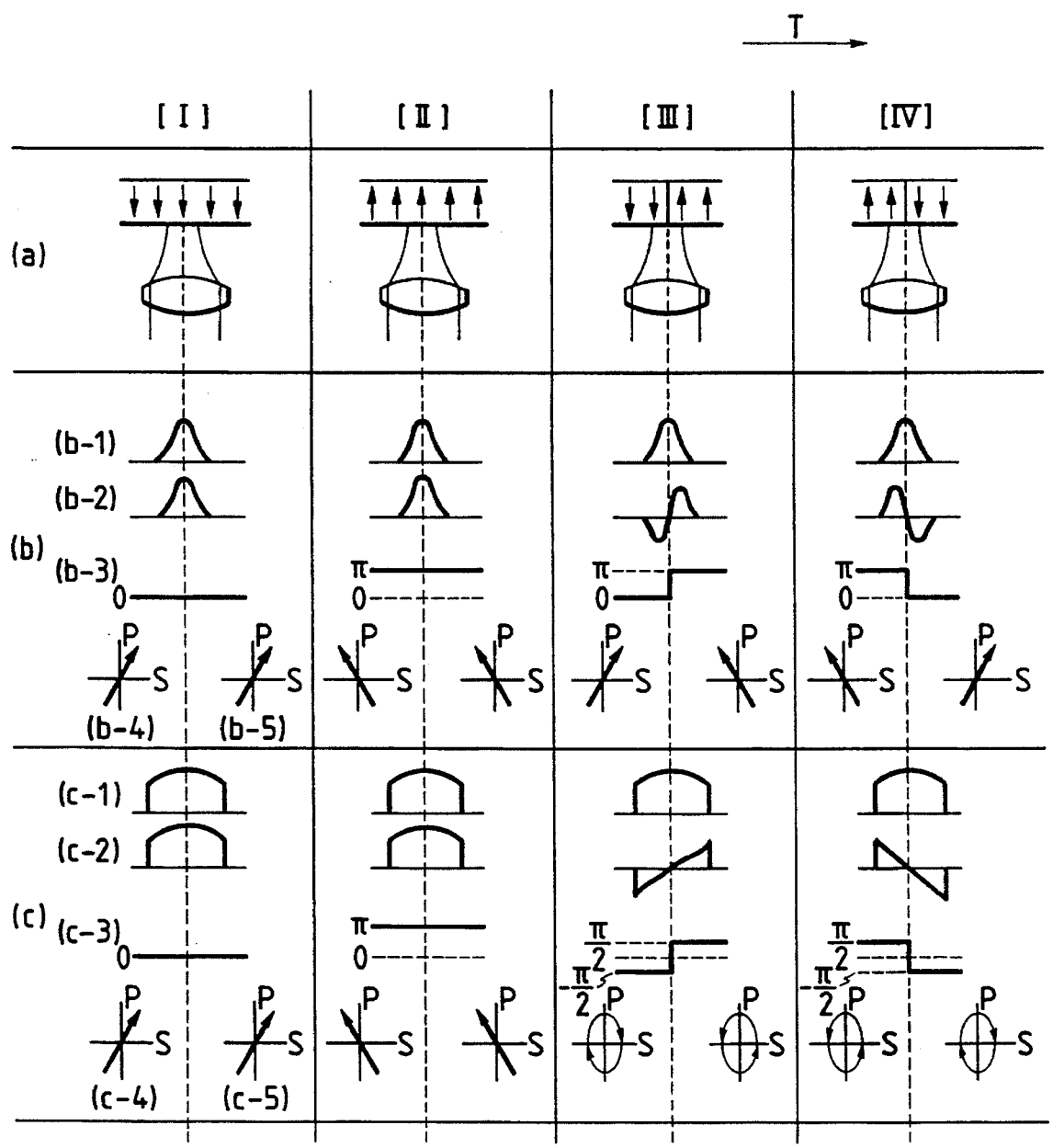
FIG. 69 is a view for explaining the principle of reproduction in the reproduction optical system shown in FIG. 68.

The detection principle will be described in more detail below with reference to FIG. 69. Referring to FIG. 69, (a) in FIG. 69 shows reproduction positions of a light spot by an objective lens. In (a) of FIG. 69, a case [I] shows a state wherein a downward magnetization pit is reproduced; a case [II] shows a state wherein an upward magnetization pit is reproduced; a case [III] shows a state wherein a pit edge having downward magnetization pits on its left side is reproduced; and a case [IV] shows a state wherein a pit edge having upward magnetization pits on its left side is reproduced. In (a) of FIG. 69, T indicates the scanning direction of a light spot in the direction parallel to the track.

(b) of FIG. 69 shows the distributions of a light beam immediately after it is reflected by the magnetooptical recording medium in correspondence with the cases [I] to [IV]. (c) of FIG. 69 similarly shows the distributions on the far field plane. In this case, assume that incident light is linearly polarized light in the P-axis direction (p-polarized light), as shown in FIG. 22. (b-1) and (c-1) in FIG. 69 show the amplitude distributions of p-polarized light, (b-2) and (c-2) in FIG. 69 show the s-polarized light distributions (their magnitudes are ignored), (b-3) and (c-3) in FIG. 69 show the phase distribution of s-polarized light with reference to p-polarized light, (b-4) and (c-4) in FIG. 69 show the polarization states of a left-side light beam, and (b-5) and (c-5) in FIG. 69 show the polarization states of a right-side light beam.

In the case [I] wherein a downward magnetization pit is reproduced, the amplitude distributions of p- and s-polarized light components at a position immediately after they are reflected by the magnetooptical recording medium in (b) in FIG. 69 are symmetrical. Although the polarization distributions are also symmetrical, linearly polarized light in this case is assumed to be linearly polarized light $(R_+)$ which is rotated clockwise. Also, assume that the phase difference between p- and s-polarized light components at that time is 0. On the far field plane as well, the amplitude distributions of the p- and s-polarized light components are symmetrical, the phase of s-polarized light remains 0, and the right and left polarization states are left unchanged.

In the case [II] wherein an upward magnetization pit is reproduced, the amplitude distributions of p- and and s-polarized light components at a position immediately after they are reflected by the magnetooptical recording medium in (b) in FIG. 69 are symmetrical as in the case [I]. However, the phase of s-polarized light is shifted by $\pi$ as compared to the case [I], and the right and left polarization states become linearly polarized states $(R_-)$ which are rotated counterclockwise, contrary to the case [I]. On the far field plane ((c) in FIG. 69) as well, the amplitude distributions of the p- and s-polarized light components are symmetrical, the phase of s-polarized light is $\pi$, and the right and left polarization states are linearly polarized states which is rotated counterclockwise.

In the case [III] wherein a pit edge having downward magnetization pits on its left side is reproduced, the amplitude distribution of p-polarized light at a position immediately after it is reflected by the magnetooptical recording medium ((b) in FIG. 69) is symmetrical as in the cases [I] and [II]. However, the amplitude distribution of s-polarized light is divided into two regions. The phase distribution of s-polarized light in the left region becomes 0, and that in the right region becomes π. At this time, the left polarization state becomes a linearly polarized state ($R_+$) which is rotated clockwise, and the right polarization state becomes a linearly polarized state which is rotated counterclockwise. On the far field plane ((c) in FIG. 69), although the amplitude distribution of p-polarized light is symmetrical, and that of s-polarized light remains divided into two regions, the phase distribution of s-polarized light changes. That is, the phase distribution of s-polarized light in the left region becomes $-\pi/2$, and that in the right region becomes $+\pi/2$. More specifically, the left polarization state becomes a right-handed elliptically polarized state, and the right polarization state becomes a left-handed elliptically polarized state. These right- and left-handed elliptically polarized light components have the same ellipticity and magnitude, and their major axes coincide with the direction of p-polarized light.

In the case [IV] wherein a pit edge having upward magnetization pits on its left side is reproduced, the right and left distribution states are reversed to those in the case [III].

Figure 70A:
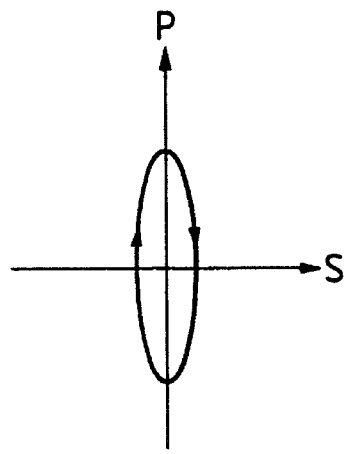
FIGS. 70A and 70B are graphs for explaining the relationship between elliptically polarized light and circularly polarized light.

In FIG. 68, the optical rotatory power prism 701 is arranged on the far field plane shown in (c) in FIG. 69. When the polarization state is a linearly polarized state (the cases [I] and [II]), since linearly polarized light is generated by synthesizing right- and left-handed circularly polarized light components having the same magnitude, the output signals (704-1) and (704-2), and the output signals (704-3) and (704-4) have the same magnitude, and the edge detection signal 708 becomes 0. On the other hand, when the polarization state is an elliptically polarized state (the cases [III] and [IV]), each elliptically polarized light is generated by synthesizing right- and left-handed circularly polarized light components having different magnitudes, as shown in FIGS. 70A and 71B. In the case [III], {signal (704-2)–signal (704-1)}<0 and {signal (704-4)–signal (704-3)}>0 are satisfied, and as the edge detection signal 708, a positive signal of [{signal (704-1)+signal (704-4)}–{signal (704-2)+signal (704-3)}]>0 is obtained. In the case [IV], conversely, {signal (704-2)–signal (704-1)}<0 and {signal (704-4)–signal (704-3)}<0 are satisfied, and as the edge detection signal 708, a negative signal of [{signal (704-1)+signal (704-4)}–{signal (704-2)+signal (704-3)}]<0 is obtained.

Figure 70B:
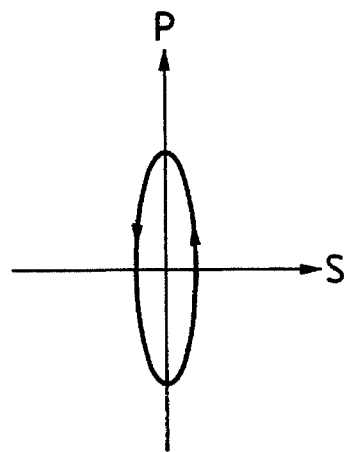
Figure 71A:
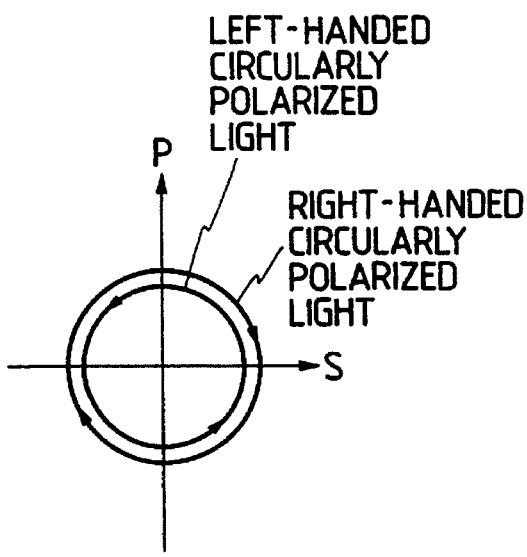
FIGS. 71A and 71B are graphs for explaining the relationship between elliptically polarized light and circularly polarized light.
Figure 71B:
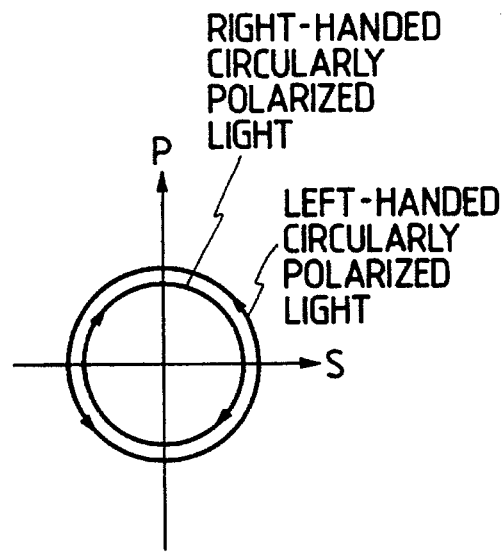

Polarized light components $R_+$ and $R_-$ shown in FIG. 22 are respectively converted into right- and left-handed elliptically polarized light components shown in FIGS. 70A and 70B using a quarterwave plate, and these polarized light components can be split into right- and left-handed circularly polarized light components, as shown in FIGS. 71A and 71B, using the optical rotatory power prism.

FIGS. 26A and 26B show an edge detection signal obtained when a magnetooptical pit recorded by the magnetic field modulation method is detected by the reproduction system shown in FIG. 68. FIG. 26A shows a state wherein a magnetooptical pit array is recorded on a magnetooptical medium by the pit edge recording method. In FIG. 26A, a hatched portion has an upward magnetization. The arrow indicates the moving direction of the light spot in the direction parallel to the track. The reproduction optical system shown in FIG. 68 can obtain an edge detection signal shown in FIG. 26B.

Figure 72:
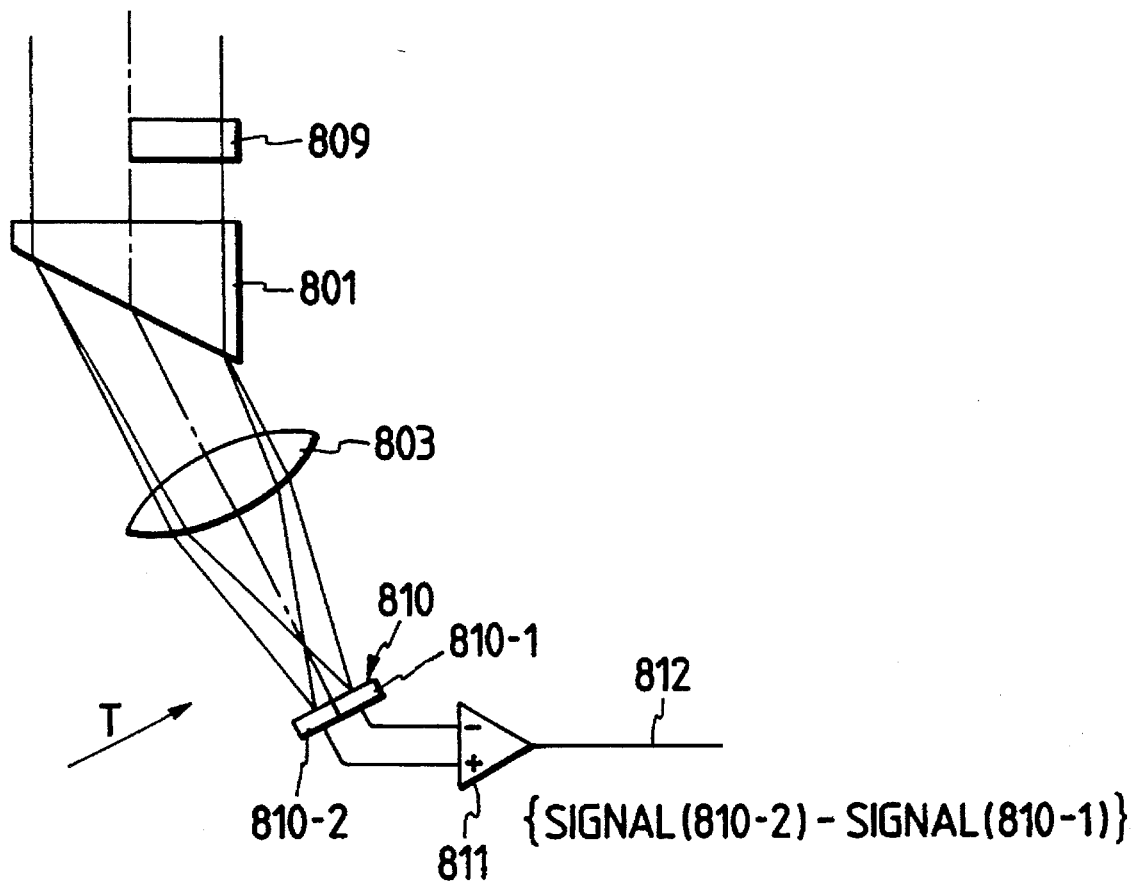
FIG. 72 is a diagram showing another reproduction optical system.
Figure 73:
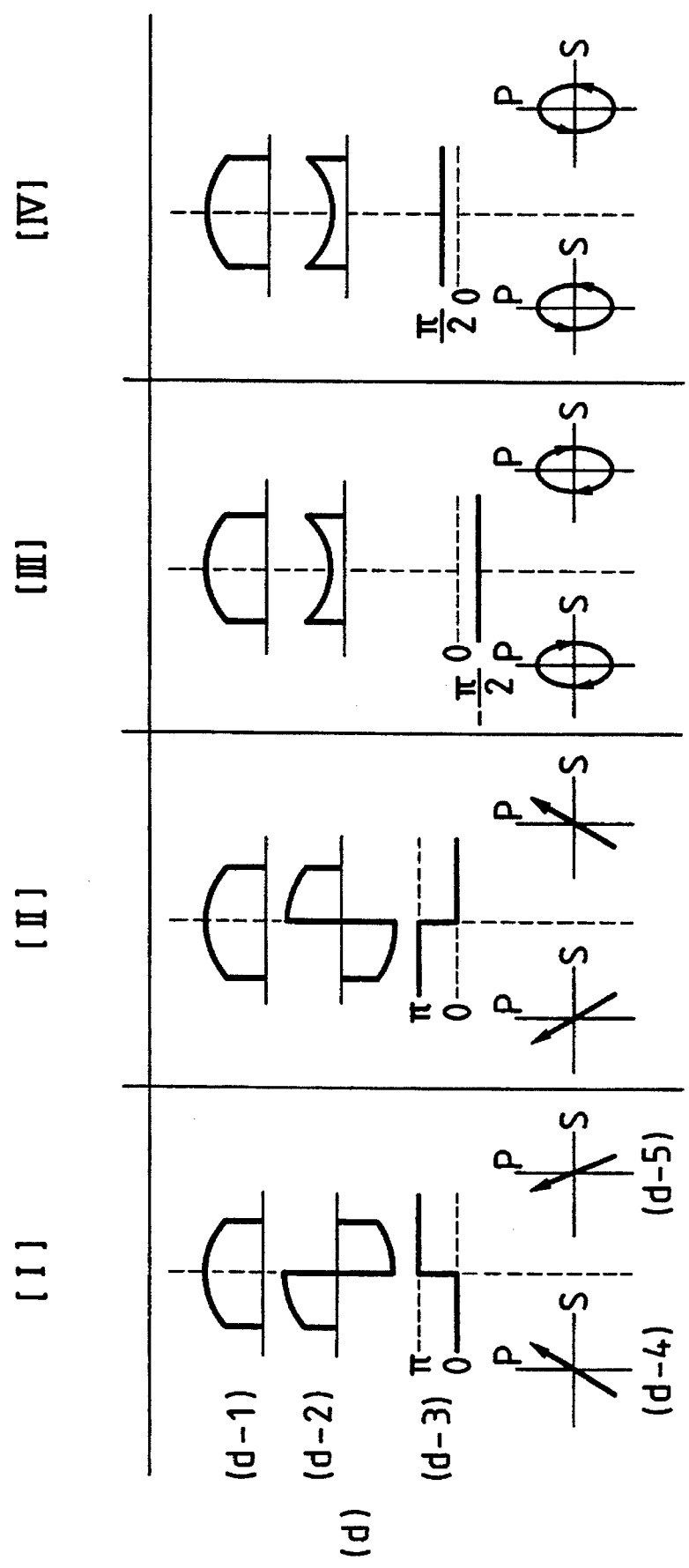
FIG. 73 is a view for explaining the principle of reproduction in the reproduction optical system shown in FIG. 72.

FIG. 72 shows another reproduction optical system of an optical head used in a magnetooptical information recording/reproduction apparatus according to the present invention. Referring to FIG. 72, the optical system includes an optical rotatory power prism 801 and a condenser lens 803 as in FIG. 68. The optical system also includes a halfwave plate 809 for influencing almost half of a light beam in a direction (direction of an arrow T) parallel to a track. In this case, the fast or slow axis of the halfwave plate 809 coincides with the direction of incident linearly polarized light. When light is transmitted through the halfwave plate 809, the light beam state is converted from (c) of FIG. 69 to (d) of FIG. 73. In this case, the phase of s-polarized light with respect to p-polarized light of the right-side light beam is advanced by π by the halfwave plate 809. As a result, the right and left polarization states upon reproduction of downward and upward magnetization pits in the cases [I] and [II] are converted from linearly polarized states in the same direction to linearly polarized states in different directions. In this case, since the linearly polarized state remains, the light quantities of right- and left-handed circularly polarized light components split by the optical rotatory power prism 801 are equal to each other. On the other hand, the right and left polarization states at the edge positions in the cases [III] and [IV] are converted from elliptically polarized states having different rotational directions into elliptically polarized states having the same rotational direction. In the case [III], both the right and left polarization states become right-handed elliptically polarized states, and after these light components are transmitted through the optical rotatory power prism 801, the light quantity of right-handed circularly polarized light becomes larger. Conversely, in the case [IV], both the right and left polarization states become left-handed elliptically polarized states, and after these light components are transmitted through the optical rotatory power prism 801, the light quantity of left-handed circularly polarized light becomes larger. A two-divided detector 810 detects left-handed circularly polarized light split by the optical rotatory power prism 801 by a light-receiving surface 810-1, and detects right-handed circularly polarized light by a light-receiving surface 810-2. If detection signals from these light-receiving surfaces are represented by signals (810-1) and (810-2), a pit edge detection signal 812 obtained by a differential amplifier 811 is {signal (810-2)–signal (810-1)}. The signal 812 is 0 in the cases [I] and [II], is a positive signal in the case [III], and is a negative signal in the case [IV]. Thus, an edge detection signal equivalent to that in FIG. 26B can be obtained.

As described above, according to the present invention, a diffraction limit spot is used, some light components of diffracted light from a small recording domain are converted as a new diffraction pattern at a position conjugate with the spot using an objective lens, a polarization element, and a re-imaging lens, the diffraction pattern is photoelectrically converted by an integrated photodetector having a wavefront splitting element, an image duplicating element, and a plurality of light-receiving regions, and the output from the photodetector is calculated to obtain a good spatial differential detection signal. Therefore, edge detection with a small jitter can be realized, and information reproduction when a plurality of edges are present in a spot can be performed. For this reason, the density of a recording medium can be increased to realize a large-capacity memory, and a compact information reproduction apparatus with high reliability can be realized.

The edge portion of a magnetooptical pit can be optically detected by detecting changes in light quantity of four light beams split by a wavefront splitting element and a circularly polarized light splitting element, which are arranged in an optical path of light reflected by a magnetooptical medium, or by detecting changes in light quantity of two light beams split by a halfwave plate for influencing almost half of a light beam, and a circularly polarized light splitting element, which are arranged in an optical path of light reflected by the magnetooptical medium, thereby obtaining a reproduction signal with a small fluctuation of DC components.

As described above, according to the present invention, in an optical information reproduction apparatus which focuses light emitted from a laser on an information recording surface via an objective lens to form a light spot, and guiding light reflected by the information recording surface to a photodetector arranged at a position optically conjugate with the light spot via the objective lens and a re-imaging lens so as to reproduce information recorded on the information recording surface, the light spot is focused to a substantially diffraction limit, some light components of diffracted light from an information recording domain equal to or smaller than the size of the light spot are converted into a diffraction pattern using the objective lens, a polarization element, and the re-imaging lens, the diffraction pattern is spatially split into a plurality of wavefronts by wavefront splitting means, and the light intensities of the split wavefronts are guided to and detected by a plurality of light-receiving regions in the photodetector.

The wavefront splitting means is constituted by combining a plurality of prisms having different polarization angles, and is integrated with the light-receiving regions.

Of the plurality of light-receiving regions, a differential signal is obtained by electrical calculation processing on the basis of signals of a plurality of light-receiving regions which have a spatial differential relationship therebetween, thereby detecting the edge of the information recording domain.

Also, according to the present invention, in an optical information reproduction apparatus which focuses light emitted from a laser on an information recording surface via an objective lens to form a light spot, and guiding light reflected by the information recording surface to a photodetector arranged at a position optically conjugate with the light spot via the objective lens and a re-imaging lens so as to reproduce information recorded on the information recording surface, the light spot is focused to a substantially diffraction limit, some light components of diffracted light from an information recording domain equal to or smaller than the size of the light spot are converted into a diffraction pattern using the objective lens, a polarization element, and the re-imaging lens, the diffraction pattern is spatially split into a plurality of wavefronts by an image duplicating element and wavefront splitting means, and the light intensities of the split wavefronts are guided to and detected by a plurality of light-receiving regions in the photodetector.

The image duplicating element comprises a Wollaston prism or a Rochon prism, and the wavefront splitting means is constituted by combining a plurality of prisms having different polarization angles, and is integrated with the light-receiving regions.

Of the plurality of light-receiving regions, a differential signal is obtained by electrical calculation processing on the basis of signals of a plurality of light-receiving regions which have a spatial differential relationship therebetween, thereby detecting the edge of the information recording domain.

Furthermore, according to the present invention, in an optical information reproduction apparatus for radiating linearly polarized light onto an information recording medium, and optically detecting a boundary portion of an information pit from light reflected by the medium when information is recorded and/or reproduced on and/or from the information recording medium, which has a plurality of tracks, and records information pits according to a difference in direction of magnetization, by utilizing an interaction among light, heat, and magnetism, a wavefront splitting element and a circularly polarized light splitting element are arranged in an optical path of the reflected light, the reflected light is split into two light beams in a direction parallel to the track by the wavefront splitting element, each of the two light beams is split into right- and left-handed circularly polarized light beams by the circularly polarized light splitting elements, and the boundary portion of the information pit is detected from a change in light quantity of these four light beams, thereby reproducing information.

Moreover, according to the present invention, in an optical information reproduction apparatus for radiating linearly polarized light onto an information recording medium, and optically detecting a boundary portion of an information pit from light reflected by the medium when information is recorded and/or reproduced on and/or from the information recording medium, which has a plurality of tracks, and records information pits according to a difference in direction of magnetization, by utilizing an interaction among light, heat, and magnetism, a wavefront splitting element and a circularly polarized light splitting element are arranged in an optical path of the reflected light, a halfwave plate for influencing almost half of a light beam and a circularly polarized light splitting elements are arranged in an optical path of the reflected light, and a boundary portion of an information pit is detected based on changes in light quantity of two right- and left-handed circularly polarized light beams transmitted through these elements, thereby reproducing information.

What is claimed is:

1. An optical information reproducing apparatus for reproducing information recorded, on a recording medium, such that the phase of a light reflected from a region other than a micro region which is an information pit is different from the phase of a light reflected from the micro region, said apparatus comprising:

irradiating means for irradiating the recording medium with a light spot;

dividing means for dividing a light beam via the recording medium into a first light beam and a second light beam;

converging means for converging the first and second light beams;

first detection means for detecting the first light beam converged by said converging means, said first detection means detecting a leading edge of the information pit in a scanning direction of the light spot;

second detection means for detecting the second light beam converged by said converging means, said second detection means detecting a trailing edge of the information pit in the scanning direction of the light spot, each of said first and second detection means comprising photodetectors for detecting the first and second light beams, respectively, and said first and second detection means being positioned on opposite sides of an optical axis in the scanning direction of the light spot; and information reproducing means for reproducing information by synthesizing output signals from said first and second detection means.

2. An apparatus according to claim 1, wherein said first detection means is arranged to be deviated from the optical axis by a first predetermined distance and wherein said second detection means is arranged to be deviated from the optical axis by a second predetermined distance which is slightly different from said first predetermined distance.

3. An apparatus according to claim 1, wherein the phase difference of the reflected light is about $\pi$.

4. An apparatus according to claim 1, wherein the information pit is smaller than the light spot.

5. An optical information reproducing apparatus for reproducing an information pit formed on an optical recording medium comprising:

irradiating means for irradiating the recording medium with a light spot;

dividing means for dividing a light beam via the recording medium into a first light beam and a second light beam;

first detection means for detecting the first light beam, said first detection means detecting a leading edge of the information pit in a scanning direction of the light spot;

second detection means for detecting the second light beam, said second detection means detecting a trailing edge of the information pit in the scanning direction of the light spot, each of said first and second detection means comprising photodetectors for detecting the first and second light beams, respectively, and said first and second detection means being positioned on opposite sides of an optical axis in the scanning direction of the light spot; and information reproducing means for reproducing information by synthesizing output signals from said first and second detection means.

6. An apparatus according to claim 5, wherein the information pit is smaller than the light spot.

7. An apparatus according to claim 5, wherein said first detection means is arranged to be deviated from the optical axis by a first predetermined distance and wherein said second detection means is arranged to be deviated from the optical axis by a second predetermined distance which is slightly different from the first predetermined distance.

8. An apparatus according to claim 5, wherein the phase of light reflected from a region of the information pit on the recording medium is different from the phase of a light reflected from a region on the recording medium other than the region of the information pit.

9. An apparatus according to claim 8, wherein the phase difference is about $\pi$.

10. A method of reproducing an information pit formed on an optical recording medium, comprising the steps of:

irradiating the recording medium with a light spot;

dividing a light beam via the recording medium into a first light beam and a second light beam;

detecting the first light beam by first detection means so as to detect a leading edge of the information pit in a scanning direction of the light spot;

detecting the second light beam by second detection means so as to detect a trailing edge of the information pit in the scanning direction of the light spot, each of the first and second detection means including photodetectors for detecting the first and second light beams, respectively, and the first and second detection means being positioned on opposite sides of an optical axis in the scanning direction of the light spot; and synthesizing an output signal from the first and second detection means to reproduce information.

11. A method according to claim 10, wherein the information pit is smaller than the light spot.

12. A method according to claim 10, wherein the first detection means is arranged to be deviated from the optical axis by a first predetermined distance and wherein the second detection means is arranged to be deviated from the optical axis by a second predetermined distance which is slightly different from the first predetermined distance.

13. A method according to claim 10, wherein the phase of light reflected from a region of the information pit on the recording medium is different from the phase of a light reflected from a region on the recording medium other than the region of the information pit.

14. A method according to claim 13, wherein the phase difference is about $\pi$.

15. An optical information reproducing apparatus for reproducing information recorded, on a recording medium, such that the phase of a light reflected from a region other than a micro region which is an information pit is different from the phase of a light reflected from the micro region, said apparatus comprising:

irradiating means for irradiating the recording medium with a light spot;

dividing means for dividing a light beam via the recording medium into a first light beam and a second light beam;

converging means for converging the first and second light beams;

first detection means for detecting the first light beam converged by said converging means, said first detection means detecting a leading edge of the information pit in a scanning direction of the light spot;

second detection means for detecting the second light beam converged by said converging means, said second detection means detecting a trailing edge of the information pit in the scanning direction of the light spot, each of said first and second detection means comprising two-divided photodetectors each having a division line at a position deviated from an optical axis in the scanning direction of the light spot, such that the respective division lines of the photodetectors of said first and second detection means are opposite each other with respect to the optical axis; and information reproducing means for reproducing information by synthesizing output signals from said first and second detection means.

16. An apparatus according to claim 15, wherein said first detection means is arranged to be deviated from the optical axis by a first predetermined distance and wherein said second detection means is arranged to be deviated from the optical axis by a second predetermined distance which is slightly different from the first predetermined distance.

17. An apparatus according to claim 15, wherein the phase difference of the reflected light is about $\pi$.

18. An apparatus according to claim 15, wherein the information pit is smaller than the light spot.

19. An optical information reproducing apparatus for reproducing an information pit formed on an optical recording medium comprising:

irradiating means for irradiating the recording medium with a light spot;

dividing means for dividing a light beam via the recording medium into a first light beam and a second light beam;

first detection means for detecting the first light beam, said first detection means detecting a leading edge of the information pit in a scanning direction of the light spot;

second detection means for detecting the second light beam, said second detection means detecting a trailing edge of the information pit in the scanning direction of the light spot, each of said first and second detection means comprising two-divided photodetectors each having a division line at a position deviated from an optical axis in the scanning direction of the light spot, such that the respective division lines of the photodetectors of said first and second detection means are opposite each other with respect to the optical axis; and information reproducing means for reproducing information by synthesizing output signals from said first and second detection means.

20. Am apparatus according to claim 19, wherein the information pit is smaller than the light spot.

21. An apparatus according to claim 19, wherein said first detection means is arranged to be deviated from the optical axis by a first predetermined distance and wherein said second detection means is arranged to be deviated from the optical axis by a second predetermined distance which is slightly different from the first predetermined distance.

22. An apparatus according to claim 19, wherein the phase of light reflected from a region of the information pit on the recording medium is different from the phase of a light reflected from a region on the recording medium other than the region of the information pit.

23. An apparatus according to claim 22, wherein the phase difference is about π.

24. A method of reproducing an information pit formed on an optical recording medium, comprising the steps of:

irradiating the recording medium with a light spot;

dividing a light beam via the recording medium into a first light beam and a second light beam;

detecting the first light beam by first detection means so as to detect a leading edge of the information pit in a scanning direction of the light spot;

detecting the second light beam by second detection means so as to detect a trailing edge of the information pit in the scanning direction of the light spot, each of the first and second detection means including two-divided photodetectors each having a division line at a position deviated from an optical axis in the scanning direction of the light spot, such that the respective division lines of the photodetectors of the first and second detection means are opposite each other with respect to the optical axis; and synthesizing an output signal from the first and second detection means to reproduce information.

25. A method according to claim 24, wherein the information pit is smaller than the light spot.

26. A method according to claim 24, wherein the first detection means is arranged to be deviated from the optical axis by a first predetermined distance and wherein the second detection means is arranged to be deviated from the optical axis by a second predetermined distance which is slightly different the first predetermined distance.

27. A method according to claim 24, wherein the phase of light reflected from a region of the information pit on the recording medium is different from the phase of a light reflected from a region on the recording medium other than the region of the information pit.

28. A method according to claim 27, wherein the phase difference is about π.

* * * * *

UNITED STATES PATENT AND TRADEMARK OFFICE
CERTIFICATE OF CORRECTION

PATENT NO. : 5,610,897
DATED : March 11, 1997
INVENTOR(S) : MASAKUNI YAMAMOTO, ET AL.

It is certified that error appears in the above-indentified patent and that said Letters Patent is hereby corrected as shown below: Title page,

At [56] References Cited - FOREIGN PATENT DOCUMENTS

```
"246544     2/1990   Japan
 3120645    5/1991   Japan
 3268252   11/1991   Japan
 4155640    5/1992   Japan"
``` should read

```
--2-46544    2/1990   Japan
  3-120645   5/1991   Japan
  3-268252  11/1991   Japan
  4-155640   5/1992   Japan--.
```

At [57] ABSTRACT

Line 2, "as" should read --in the--.

COLUMN 1

Line 4, "continuation" should read --continuation of--.

COLUMN 2

Line 24, "a" should read --showing a--.
Line 41, "an" should read --an information pit;--.
Line 42, "information" should be deleted.
Line 43, "pit;" should be deleted.

UNITED STATES PATENT AND TRADEMARK OFFICE
CERTIFICATE OF CORRECTION

PATENT NO. : 5,610,897

DATED : March 11, 1997

INVENTOR(S) : MASAKUNI YAMAMOTO, ET AL.

It is certified that error appears in the above-identified patent and that said Letters Patent is hereby corrected as shown below:

COLUMN 8

Line 67, "s" should read --a--.

COLUMN 9

Line 8, "s" should read --a--.

COLUMN 22

Line 60, "its" should be deleted.

COLUMN 28

Line 2, "Generating" should read --generating--.
Line 8, "Generating" should read --generating--.
Line 17, "Generating" should read --generating--.
Line 51, "Generating" should read --generating--.

COLUMN 34

Line 62, "that-having" should read --that having--.

COLUMN 35

Line 30, "Show" should read --show--.

UNITED STATES PATENT AND TRADEMARK OFFICE
CERTIFICATE OF CORRECTION

PATENT NO. : 5,610,897
DATED : March 11, 1997
INVENTOR(S) : MASAKUNI YAMAMOTO, ET AL.

It is certified that error appears in the above-identified patent and that said Letters Patent is hereby corrected as shown below:

COLUMN 56

Line 66, "is" should read --are--.

COLUMN 60

Line 30, "elements" should read --element--.

COLUMN 61

Line 6, "said" should read --the--.

COLUMN 63

Line 14, "Am" should read --An--.

COLUMN 64

Line 24, "different" should read --different from--.

Signed and Sealed this

Sixteenth Day of December, 1997

Attest:

BRUCE LEHMAN

*Attesting Officer*  *Commissioner of Patents and Trademarks*